(12) United States Patent
Sato

(10) Patent No.: US 7,940,472 B2
(45) Date of Patent: May 10, 2011

(54) ZOOM LENS AND OPTICAL APPARATUS EQUIPPED THEREWITH

(75) Inventor: Susumu Sato, Yotsukaido (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/545,846

(22) Filed: Aug. 23, 2009

(65) Prior Publication Data
US 2009/0310226 A1 Dec. 17, 2009

Related U.S. Application Data

(63) Continuation of application No. PCT/JP2008/052588, filed on Feb. 8, 2008.

(30) Foreign Application Priority Data

Feb. 27, 2007 (JP) ................................. 2007-047440
Feb. 27, 2007 (JP) ................................. 2007-047444

(51) Int. Cl.
  *G02B 15/14* (2006.01)
(52) U.S. Cl. ....................... 359/687; 359/686
(58) Field of Classification Search .................. 359/683, 359/684, 686, 687
See application file for complete search history.

(56) References Cited

U.S. PATENT DOCUMENTS

| | | | |
|---|---|---|---|
| 5,638,216 A | 6/1997 | Horiuchi et al. | |
| 6,414,800 B1 | 7/2002 | Hamano | |
| 2002/0024732 A1 | 2/2002 | Hamano et al. | |
| 2002/0063961 A1 | 5/2002 | Hamano et al. | |
| 2005/0007480 A1 | 1/2005 | Hamano et al. | |
| 2005/0099700 A1 | 5/2005 | Ohtake | |
| 2005/0190458 A1 | 9/2005 | Hamano et al. | |
| 2005/0270661 A1 | 12/2005 | Nanba et al. | |
| 2010/0033840 A1* | 2/2010 | Sato .............................. | 359/687 |

FOREIGN PATENT DOCUMENTS

| | | |
|---|---|---|
| JP | 10-260356 A | 9/1998 |
| JP | 11-295594 A | 10/1999 |
| JP | 2001-042213 A | 2/2001 |
| JP | 2005-134548 A | 5/2005 |
| JP | 2005-148437 A | 6/2005 |
| JP | 2006-189913 A | 7/2006 |

* cited by examiner

*Primary Examiner* — David N Spector
(74) *Attorney, Agent, or Firm* — Miles & Stockbridge P.C

(57) ABSTRACT

A zoom lens is provided with comprising a plurality of lens groups including, in order from an object side, a first lens group G1 having positive refractive power, a second lens group G2 having negative refractive power, a third lens group G3, and a fourth lens group G4, the third lens group G3 including, in order from the object side, a first positive lens of the third lens group, a negative lens of the third lens group, and a second positive lens of the third lens group, and a given conditional expression being satisfied, thereby excellently correcting chromatic aberration in a farther away shooting range, capable of having excellent optical performance with being compact.

27 Claims, 26 Drawing Sheets

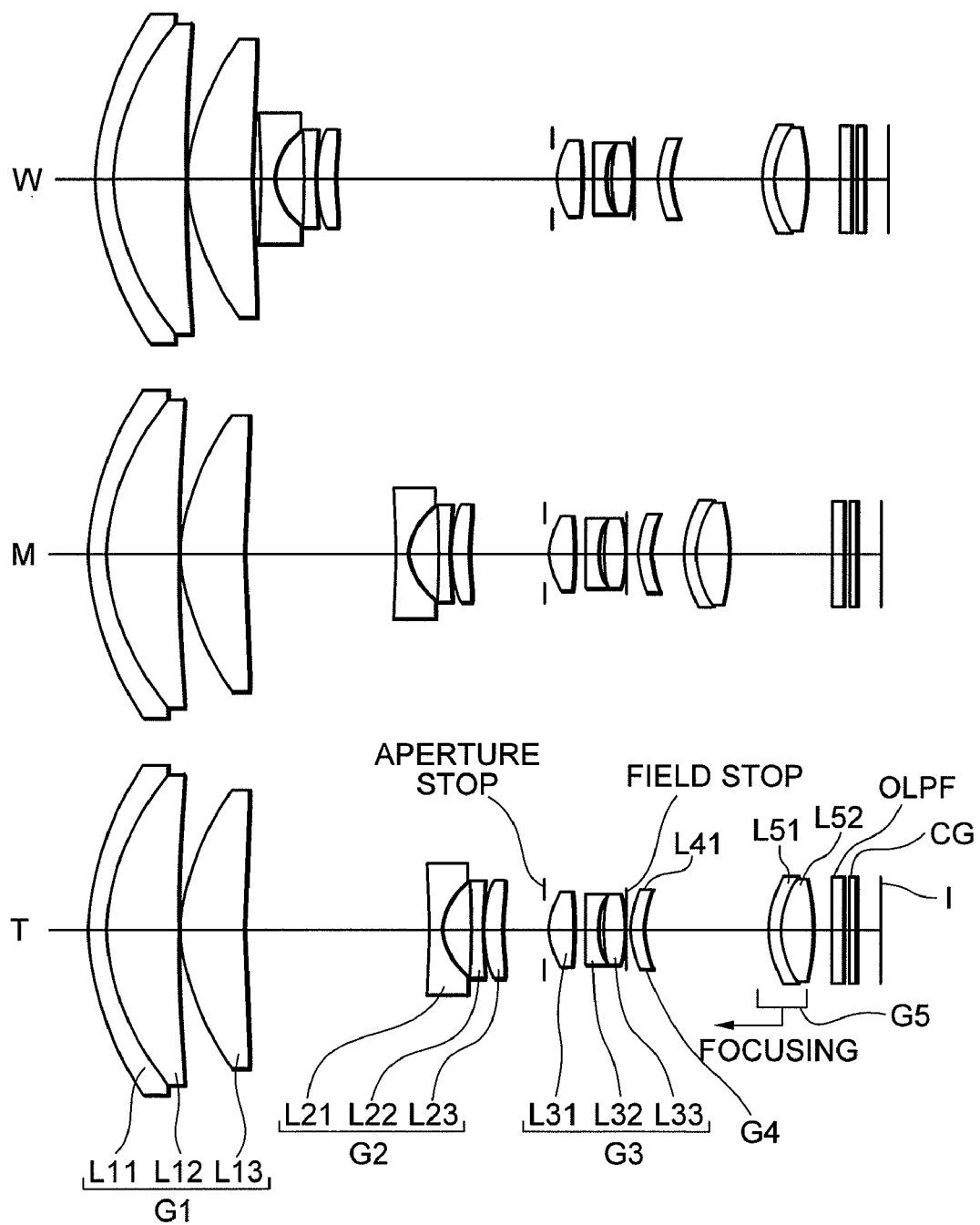

ZOOM LENS AND OPTICAL APPARATUS EQUIPPED THEREWITH

CROSS-REFERENCE TO RELATED APPLICATION

This application is a continuation of International Application No. PCT/JP2008/052588 filed Feb. 8, 2008.

TECHNICAL FIELD

The present invention relates to a zoom lens and an optical apparatus equipped therewith.

BACKGROUND ART

There have been proposed zoom lenses used for an electronic still camera such as Japanese Patent Application Laid-Open Nos. 2001-042213, 2006-189913, 10-260356, and 11-295594.

However, the conventional zoom lenses have had problems that a telephoto ratio in the telephoto end state is large, the total lens length is large, and chromatic aberration in the telephotographic range is large.

DISCLOSURE OF THE INVENTION

In order to solve the above-described problems, according to a first aspect of the present invention, there is provided a zoom lens comprising a plurality of lens groups including, in order from an object side: a first lens group having positive refractive power; a second lens group having negative refractive power; a third lens group; and a fourth lens group; the third lens group including, in order from the object side, a first positive lens of the third lens group, a negative lens of the third lens group, and a second positive lens of the third lens group, and the following conditional expression (1) being satisfied:

$$0.700 < D30 \times N3133/Fw < 1.435 \tag{1}$$

where Fw denotes a focal length of the zoom lens in a wide-angle end state, D30 denotes a thickness of the third lens group, and N3133 denotes an average refractive index of the first positive lens of the third lens group and the second positive lens of the third lens group.

In the first aspect of the present invention, it is preferable that the third lens group has positive refractive power, and the fourth lens group has positive refractive power.

In the first aspect of the present invention, it is preferable that upon zooming from the wide-angle end state to a telephoto end state, a distance between the first lens group and the second lens group increases, a distance between the second lens group and the third lens group decreases, and the most image side lens group among the plurality of lens groups is moved along an optical axis with a trajectory having a convex shape facing the object side.

In the first aspect of the present invention, it is preferable that the third lens group is fixed upon zooming from the wide-angle end state to the telephoto end state.

In the first aspect of the present invention, it is preferable that the following conditional expression (2) is satisfied:

$$1.00 < F3/Fw < 3.40 \tag{2}$$

where F3 denotes a focal length of the third lens group.

In the first aspect of the present invention, it is preferable that the most image side lens group among the plurality of lens groups includes a positive lens element.

In the first aspect of the present invention, it is preferable that the following conditional expression (3) is satisfied:

$$0.10 < D30 \times Ne/Fe < 0.50 \tag{3}$$

where Fe denotes a focal length of the most image side lens group among the plurality of lens groups, and Ne denotes a refractive index of the positive lens element.

In the first aspect of the present invention, it is preferable that the positive lens element has an aspherical surface on the image side surface, and the following conditional expressions (7) and (8) are satisfied:

$$Ne < 1.550 \tag{7}$$

$$75.00 < \nu e \tag{8}$$

where Ne denotes a refractive index of the positive lens element, and $\nu e$ denotes an Abbe number of the positive lens element.

In the first aspect of the present invention, it is preferable that the first positive lens of the third lens group has a convex surface facing the object side, the negative lens of the third lens group has an absolute value of a radius of curvature of the image side surface smaller than that of the object side surface, and the second positive lens of the third lens group has an absolute value of a radius of curvature of the image side surface smaller than that of the object side surface.

In the first aspect of the present invention, it is preferable that an aspherical surface is formed on at least one lens surface of the third lens group.

In the first aspect of the present invention, it is preferable that each of lenses in the third lens group is disposed between air spaces.

In the first aspect of the present invention, it is preferable that the following conditional expression (4) is satisfied:

$$-2.00 < F3/F32 < -0.98 \tag{4}$$

where F32 denotes a focal length of the negative lens of the third lens group.

In the first aspect of the present invention, it is preferable that the first positive lens of the third lens group has an aspherical surface on the object side surface thereof.

In the first aspect of the present invention, it is preferable that the following conditional expressions (5) and (6) are satisfied:

$$N3133 < 1.500 \tag{5}$$

$$70.00 < \nu 3133 \tag{6}$$

where N3133 denotes an average refractive index of the first positive lens of the third lens group and the second positive lens of the third lens group, and $\nu 3133$ denotes an average Abbe number of the first positive lens of the third lens group and the second positive lens of the third lens group.

In the first aspect of the present invention, it is preferable that at least one portion of the third lens group is moved in a direction perpendicular to an optical axis.

According to a second aspect of the present invention, there is provided a method for forming an image by a zoom lens that comprises a plurality of lens groups including, in order from an object side, a first lens group having positive refractive power, a second lens group having negative refractive power, a third lens group, and a fourth lens group, the method comprising steps of: providing the third lens group including, in order from the object side, a first positive lens of the third lens group, a negative lens of the third lens group, and a second positive lens of the third lens group; satisfying the following conditional expression (1):

$$0.700 < D30 \times N3133/Fw < 1.435 \quad (1)$$

where Fw denotes a focal length of the zoom lens in a wide-angle end state, D30 denotes a thickness of the third lens group, and N3133 denotes an average refractive index of the first positive lens of the third lens group and the second positive lens of the third lens group; and forming an image of the object by the zoom lens.

According to a third aspect of the present invention, there is provided a zoom lens comprising a plurality of lens groups including, in order from an object side: a first lens group having positive refractive power; a second lens group having negative refractive power; a third lens group; and a fourth lens group; the third lens group including a first positive lens of the third lens group, a negative lens of the third lens group, and a second positive lens of the third lens group, and the following conditional expression (9) being satisfied:

$$0.098 < \{Fw \times (N32 - N3133)\}/F3 < 0.200 \quad (9)$$

where Fw denotes a focal length of the zoom lens in a wide-angle end state, F3 denotes a focal length of the third lens group, N3133 denotes an average refractive index of the first positive lens of the third lens group and the second positive lens of the third lens group, and N32 denotes a refractive index of the negative lens of the third lens group.

In the third aspect of the present invention, it is preferable that the following conditional expression (11) is satisfied:

$$0.340 < \{Fw \times (N32 - N3133)\}/D30 < 0.500 \quad (11)$$

where D30 denotes a thickness of the third lens group.

In the third aspect of the present invention, it is preferable that the most image side lens group among the plurality of lens groups includes, in order from the object side, a negative meniscus lens having a convex surface facing the object side, and a double convex positive lens.

In the third aspect of the present invention, it is preferable that the following conditional expression (12) is satisfied:

$$0.10 < Fw/\{Fe \times (Nen - Nep)\} < 0.85 \quad (12)$$

where Fe denotes a focal length of the most image side lens group among the plurality of lens groups, Nen denotes a refractive index of the negative meniscus lens, and Nep denotes a refractive index of the double convex positive lens.

In the third aspect of the present invention, it is preferable that the following conditional expression (13) is satisfied:

$$0.0005 < Fw/\{Fe \times (vep - ven)\} < 0.0063 \quad (13)$$

where ven denotes an Abbe number of the negative meniscus lens, and vep denotes an Abbe number of the double convex positive lens.

In the third aspect of the present invention, it is preferable that upon focusing on an object locating at a finite distance, the most image side lens group among the plurality of lens groups is moved along an optical axis to the object side.

According to a fourth aspect of the present invention, there is provided a method for forming an image by a zoom lens that comprises a plurality of lens groups including, in order from an object side, a first lens group having positive refractive power, a second lens group having negative refractive power, a third lens group, and a fourth lens group, the method comprising steps of: providing the third lens group with a first positive lens of the third lens group, a negative lens of the third lens group, and a second positive lens of the third lens group; satisfying the following conditional expression (9):

$$0.098 < \{Fw \times (N32 - N3133)\}/F3 < 0.200 \quad (9)$$

where Fw denotes a focal length of the zoom lens in a wide-angle end state, F3 denotes a focal length of the third lens group, N3133 denotes an average refractive index of the first positive lens of the third lens group and the second positive lens of the third lens group, and N32 denotes a refractive index of the negative lens of the third lens group; and forming the image of the object by the zoom lens.

The present invention makes it possible to provide a zoom lens being compact having high optical performance with excellently correcting chromatic aberration in the telephotographic range, and an optical apparatus equipped therewith.

BRIEF DESCRIPTION OF THE DRAWINGS

FIGS. 2A, 2B, 2C are graphs showing various aberrations and coma upon vibration reduction upon focusing on infinity of the zoom lens according to Example 1 and 9, in which FIG. 2A shows in the wide-angle end state, FIG. 2B shows in the intermediate focal length state, and FIG. 2C shows in the telephoto end state.

FIGS. 3A, 3B, 3C are graphs showing various aberrations and coma upon vibration reduction upon focusing on the closest shooting range of the zoom lens according to Example 1 and 9, in which FIG. 3A shows the shooting range Rw=205 mm, FIG. 3B shows the shooting range Rm=749 mm, and FIG. 3C shows the shooting range Rt=538 mm.

FIGS. 5A, 5B, 5C are graphs showing various aberrations upon focusing on infinity of the zoom lens according to Example 2 and 10, in which FIG. 5A shows in the wide-angle end state, FIG. 5B shows in the intermediate focal length state, and FIG. 5C shows in the telephoto end state.

FIGS. 6A, 6B, 6C are graphs showing various aberrations upon focusing on the closest shooting range of the zoom lens according to Example 2 and 10, in which FIG. 6A shows the shooting range Rw=204 mm, FIG. 6B shows the shooting range Rm=737 mm, and FIG. 6C shows the shooting range Rt=515 mm.

FIGS. 8A, 8B, 8C are graphs showing various aberrations upon focusing on infinity of the zoom lens according to Example 3 and 11, in which FIG. 8A shows in the wide-angle end state, FIG. 8B shows in the intermediate focal length state, and FIG. 8C shows in the telephoto end state.

FIGS. 9A, 9B, 9C are graphs showing various aberrations upon focusing on the closest shooting range of the zoom lens according to Example 3 and 11, in which FIG. 9A shows the shooting range Rw=202 mm, FIG. 9B shows the shooting range Rm=738 mm, and FIG. 9C shows the shooting range Rt=513 mm.

FIGS. 11A, 11B, 11C are graphs showing various aberrations upon focusing on infinity of the zoom lens according to Example 4 and 12, in which FIG. 11A shows in the wide-angle end state, FIG. 11B shows in the intermediate focal length state, and FIG. 11C shows in the telephoto end state.

FIGS. 12A, 12B, 12C are graphs showing various aberrations upon focusing on the closest shooting range of the zoom lens according to Example 4 and 12, in which FIG. 12A shows the shooting range Rw=201 mm, FIG. 12B shows the shooting range Rm=728 mm, and FIG. 12C shows the shooting range Rt=487 mm.

FIGS. 14A, 14B, 14C are graphs showing various aberrations upon focusing on infinity of the zoom lens according to Example 5 and 13, in which FIG. 14A shows in the wide-angle end state, FIG. 14B shows in the intermediate focal length state, and FIG. 14C shows in the telephoto end state.

FIGS. 15A, 15B, 15C are graphs showing various aberrations upon focusing on the closest shooting range of the zoom lens according to Example 5 and 13, in which FIG. 15A shows the shooting range Rw=204 mm, FIG. 15B shows the shooting range Rm=737 mm, and FIG. 15C shows state and the shooting range Rt=515 mm.

FIGS. 17A, 17B, 17C are graphs showing various aberrations upon focusing on infinity of the zoom lens according to Example 6 and 14, in which FIG. 17A shows in the wide-angle end state, FIG. 17B shows in the intermediate focal length state, and FIG. 17C shows in the telephoto end state.

FIGS. 18A, 18B, 18C are graphs showing various aberrations upon focusing on the closest shooting range of the zoom lens according to Example 6 and 14, in which FIG. 18A shows the shooting range Rw=205 mm, FIG. 18B shows the shooting range Rm=748 mm, and FIG. 18C shows the shooting range Rt=538 mm.

FIGS. 20A, 20B, 20C are graphs showing various aberrations upon focusing on infinity of the zoom lens according to Example 7 and 15, in which FIG. 20A shows in the wide-angle end state, FIG. 20B shows in the intermediate focal length state, and FIG. 20C shows in the telephoto end state.

FIGS. 21A, 21B, 21C are graphs showing various aberrations upon focusing on the closest shooting range of the zoom lens according to Example 7 and 15, in which FIG. 21A shows the shooting range Rw=204 mm, FIG. 21B shows the shooting range Rm=737 mm, and FIG. 21C shows the shooting range Rt=516 mm.

FIG. 22 is a diagram showing a lens configuration of a zoom lens according Example 8 and 16 in which W denotes a wide-angle end state, M denotes an intermediate focal length state, and T denotes a telephoto end state.

FIGS. 23A, 23B, 23C are graphs showing various aberrations upon focusing on infinity of the zoom lens according to Example 8 and 16, in which FIG. 23A shows in the wide-angle end state, FIG. 23B shows in the intermediate focal length state, and FIG. 23C shows in the telephoto end state.

FIGS. 24A, 24B, 24C are graphs showing various aberrations upon focusing on the closest shooting range of the zoom lens according to Example 8 and 16, in which FIG. 24A shows the shooting range Rw=206 mm, FIG. 24B shows the shooting range Rm=732 mm, and FIG. 24C shows the shooting range Rt=500 mm.

FIGS. 25A, 25B are diagrams showing an electronic still camera equipped with the zoom lens according to the first or second embodiment, in which FIG. 25A is a front view, and FIG. 25B is a rear view.

EMBODIMENTS FOR CARRYING OUT THE INVENTION

First Embodiment

Figure 1:
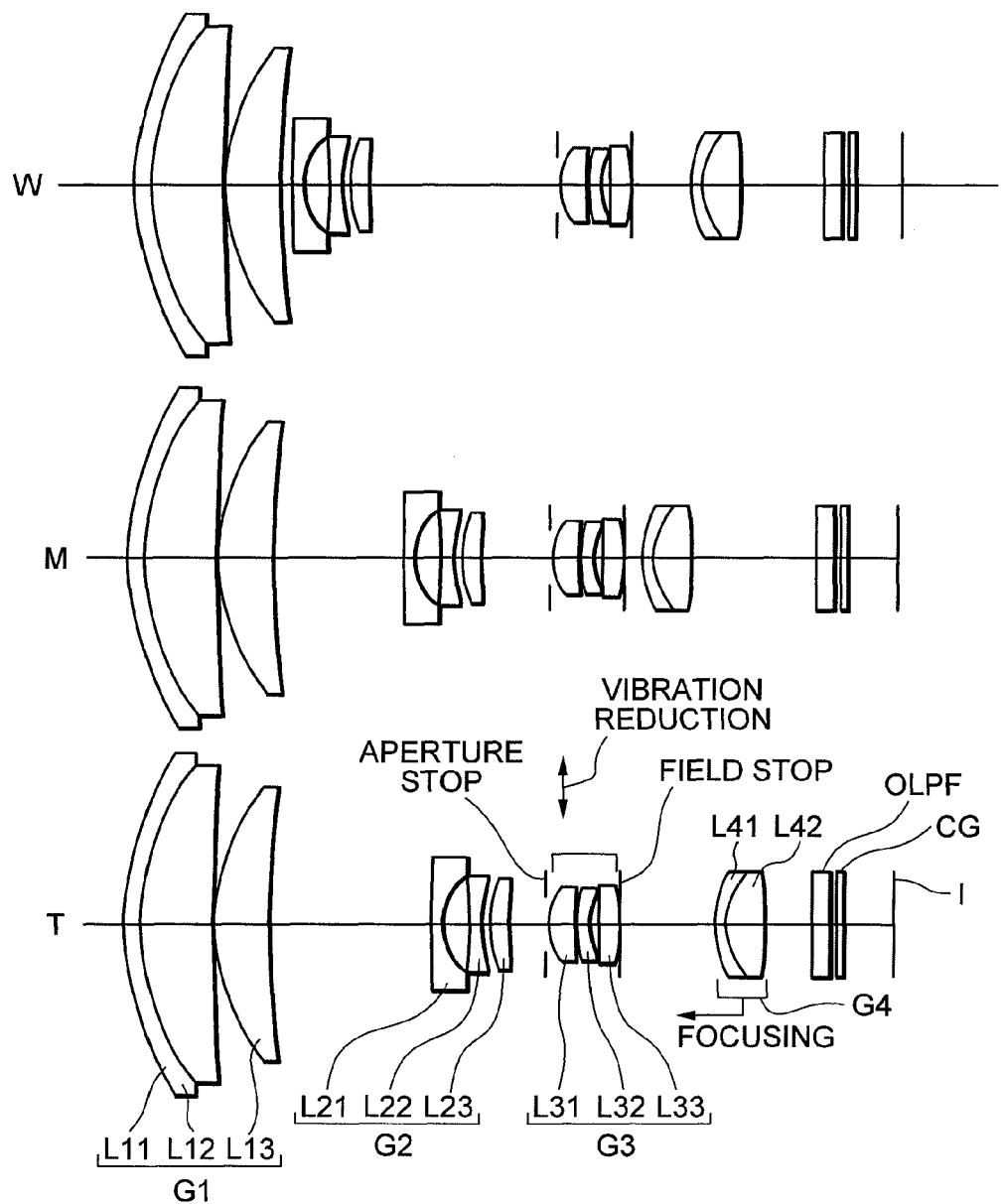
FIG. 1 is a diagram showing a lens configuration of a zoom lens according Example 1 and 9, in which W denotes a wide-angle end state, M denotes an intermediate focal length state, and T denotes a telephoto end state.

A zoom lens according to a first embodiment of the present invention is explained.

A zoom lens according to the present embodiment includes a plurality of lens groups including, in order from an object, a first lens group having positive refractive power, a second lens group having negative refractive power, a third lens group, and a fourth lens group.

When the lens configuration is explained from an optical viewpoint, the first lens group is a converging lens group, the second lens group is a zooming lens group, the third lens group is an imaging lens group, and the most image side lens group is a field lens group.

Since the height of incident light and the angle of incident light vary largely in the first lens group and the second lens group upon zooming, the first lens group and the second lens group greatly contribute to variation in spherical aberration and curvature of field upon zooming.

An aperture stop is preferably disposed in the third lens group or in the vicinity of the third lens group. In the third lens group, since variations in the angle of incident light and the height of incident light are small, so that the third lens group has small contribution to variations in various aberrations. However, since the third lens group further converges bundle of rays converged by the first lens group, the third lens group has to have strong refractive power, so that the radius of curvature of each lens tends to become small.

Accordingly, high order spherical aberration tends to be generated excessively.

The diameter of the bundle of rays incident on the most image side lens group with respect to each image height is small, so that the lens group largely contributes to variation in curvature of field rather than spherical aberration. Moreover, the lens group has a function that makes the exit pupil away from the image plane to the object side in order to make the imaging optical system match the solid-state imaging device, which is typical of shading.

In order to excellently correct aberrations with keeping the total lens length small, the third lens group preferably includes, in order from the object, a first positive lens of the third lens group, a negative lens of the third lens group, and a second positive lens of the third lens group, and the following conditional expression (1) is preferably satisfied:

$$0.700 < D30 \times N3133 / Fw < 1.435 \qquad (1)$$

where Fw denotes a focal length of the zoom lens in a wide-angle end state, D30 denotes a thickness of the third lens group, and N3133 denotes an average refractive index of the first positive lens of the third lens group and the second positive lens of the third lens group.

When the value of conditional expression (1) is equal to or falls below the lower limit thereof, high order spherical aberration is excessively generated, so that it is undesirable. When the value of conditional expression (1) is equal to or exceeds the upper limit thereof, a distance between the second lens group and the third lens group in the telephoto end state becomes small. In order to avoid the situation, a position of a secondary principal point of the second lens group is necessary to locate closer to the image plane side, as a result, variation in curvature of field upon zooming becomes large, so that it is undesirable.

In order to secure the effect of the present embodiment, it is preferable to set the lower limit of conditional expression (1) to 0.800. In order to secure the effect of the present embodiment, it is preferable to set the upper limit of conditional expression (1) to 1.430.

In a zoom lens according to the present embodiment, it is preferable that the third lens group has positive refractive power, and the fourth lens group has positive refractive power. With this lens configuration, it becomes possible to excellently correct various aberrations to realize high optical performance.

In a zoom lens according to the present embodiment, upon zooming from the wide-angle end state to the telephoto end state upon focusing on infinity, it is preferable that a distance between the first lens group and the second lens group increases, a distance between the second lens group and the third lens group decreases, and the most image side lens group among the plurality of lens groups moves along an optical axis with a trajectory having a convex shape facing the object.

When the first lens group is fixed upon zooming, deterioration in flatness of the image plane caused by decentering is hardly generated, so that it is preferable.

In a zoom lens according to the present embodiment, upon zooming from the wide-angle end state to the telephoto end state, the third lens group is preferably fixed. When the third lens group is fixed upon zooming, even if the third lens group is made to be a vibration reduction lens group, since zooming mechanism for the third lens group is not required, vibration reduction mechanism can be independent from the zooming mechanism. Moreover, an outer diameter of the optical system can be smaller.

In a zoom lens according to the present embodiment, the following conditional expression (2) is preferably satisfied:

$$1.00 < F3/Fw < 3.40 \quad (2)$$

where F3 denotes a focal length of the third lens group.

Conditional expression (2) is for accomplishing to be compact with excellently correcting various aberrations. With satisfying conditional expression (2), it becomes possible to excellently correct aberrations such as spherical aberration and curvature of field, keep the total lens length of the zoom lens short, and realize the zoom lens to be compact.

When the value of conditional expression (2) is equal to or falls below the lower limit thereof, high order spherical aberration is excessively generated, so that it is undesirable. When the value of conditional expression (2) is equal to or exceeds the upper limit thereof, in order to keep the total lens length short a focal length of the fourth lens group has to be short. As a result, curvature of field is excessively generated so that it is undesirable.

In order to secure the effect of the present embodiment, it is preferable to set the lower limit of conditional expression (2) to 1.50. In order to secure the effect of the present embodiment, it is preferable to set the upper limit of conditional expression (2) to 3.00.

In a zoom lens according to present embodiment, the most image side lens group among the plurality of lens groups preferably includes one positive lens element. With this lens configuration, it becomes possible to excellently correct chromatic aberration with keeping the lens system to be compact.

In a zoom lens according to the present embodiment, the following conditional expression (3) is preferably satisfied:

$$0.10 < D30 \times Ne/Fe < 0.50 \quad (3)$$

where Fe denotes a focal length of the most image side lens group among the plurality of lens groups, Ne denotes a refractive index of the positive lens.

Conditional expression (3) is for excellently correct aberrations. With satisfying conditional expression (3), it becomes possible to excellently correct lateral chromatic aberration and curvature of field to realize high optical performance.

When the value of conditional expression (3) is equal to or falls below the lower limit thereof, lateral chromatic aberration becomes large, so that it is undesirable. When the value of conditional expression (3) is equal to or exceeds the upper limit thereof, variation in curvature of field upon zooming becomes large, so that it is undesirable.

In order to secure the effect of the present embodiment, it is preferable to set the lower limit of conditional expression (3) to 0.15. In order to secure the effect of the present embodiment, it is preferable to set the upper limit of conditional expression (3) to 0.52.

In a zoom lens according to the present embodiment, it is preferable that the first positive lens of the third lens group has a convex surface facing the object side, the negative lens of the third lens group has an absolute value of a radius of curvature of the image side surface smaller than that of the object side surface, the second positive lens of the third lens group has an absolute value of a radius of curvature of the image side surface smaller than that of the object side surface, and an aspherical surface is formed on at least one lens surface of the third lens group.

With this lens configuration, it becomes possible to excellently correct various aberrations to realize a compact zoom lens having high optical performance.

In a zoom lens according to the present embodiment, each lens in the third lens group is preferably disposed between air spaces.

With this lens configuration, it becomes possible to excellently correct various aberrations to realize a compact zoom lens having high optical performance.

In a zoom lens according to the present embodiment, the following conditional expression (4) is preferably satisfied:

$$2.00 < F3/F32 < -0.98 \quad (4)$$

where F32 denotes a focal length of the negative lens of the third lens group.

Conditional expression (4) is for excellently correcting various aberrations. With satisfying conditional expression (4), it becomes possible to excellently correct spherical aberration and coma to realize high optical performance.

When the value of conditional expression (4) is equal to or falls below the lower limit thereof, spherical aberration becomes excessively generated, so that it is undesirable. When the value of conditional expression (4) is equal to or exceeds the upper limit thereof, coma becomes large, so that it is undesirable.

In order to secure the effect of the present embodiment, it is preferable to set the lower limit of conditional expression (4) to −1.80. In order to secure the effect of the present embodiment, it is preferable to set the upper limit of conditional expression (4) to −1.03.

In a zoom lens according to the present embodiment, with the above-described lens configuration, it becomes possible to obtain excellent monochromatic aberration with keeping the total lens length short. However, since the third lens group has strong refractive power so as to shorten the back focal length of the whole optical system, chromatic aberration tends to be generated. In order to avoid this, it is preferable to adopt low dispersion glass to the positive lens of the third lens group. Since low dispersion glass tends to have a small refractive index, in order to have a given refractive power, the radius of curvature of the lens surface is necessary to be small, so that spherical aberration is excessively generated.

Then, in a zoom lens according to the present embodiment, it is preferable that the object side surface of the first positive lens of the third lens group has an aspherical surface, and the following conditional expressions (5) and (6) are preferably satisfied:

$$N3133 < 1.500 \quad (5)$$

$$70.00 < \nu3133 \quad (6)$$

where N3133 denotes an average refractive index of the first positive lens of the third lens group and the second positive lens of the third lens group, and ν3133 denotes an average Abbe number of the first positive lens of the third lens group and the second positive lens of the third lens group.

In this manner, with forming an aspherical surface on the object side surface of the first positive lens of the third lens group, it becomes possible to excellently correct spherical aberration.

With satisfying conditional expressions (5) and (6), it becomes possible to excellently correct longitudinal chromatic aberration upon zooming. When coming off conditional expressions (5) or (6), variation in longitudinal chromatic aberration upon zooming becomes large, so that it is undesirable.

In order to secure the effect of the present embodiment, it is preferable to set the upper limit of conditional expression (5) to 1.495. In order to secure the effect of the present embodiment, it is preferable to set the lower limit of conditional expression (6) to 75.00.

In a zoom lens according to the present embodiment, the positive lens element of the most image side lens group among the plurality of lens groups has an aspherical surface on the image side surface thereof, and the following conditional expressions (7) and (8) are preferably satisfied:

$$Ne < 1.550 \quad (7)$$

$$75.00 < \nu e \quad (8)$$

where Ne denotes a refractive index of the positive lens element, and νe denotes an Abbe number of the positive lens element.

Conditional expressions (7) and (8) are for excellently correcting chromatic aberration. With satisfying conditional expressions (7) and (8), it becomes possible to excellently correct aberrations such as lateral chromatic aberration to accomplish high optical performance.

When coming off conditional expression (7) or (8), variation in lateral chromatic aberration upon zooming becomes large, so that it is undesirable. In order to secure the effect of the present embodiment, it is preferable to set the upper limit of conditional expression (7) to 1.500. In order to secure the effect of the present embodiment, it is preferable to set the lower limit of conditional expression (8) to 80.00.

In order to excellently correct chromatic aberration with keeping the lens system compact, the most image side lens group is constructed by a single positive lens element, and the image side surface of the positive lens element is preferably an aspherical surface so as to correct spherical aberration.

In a zoom lens according to the present embodiment, vibration reduction is preferably carried out by moving at least a portion of the third lens group in a direction perpendicular to the optical axis.

Since the third lens group has small variations in the height and the angle of incident light upon zooming, aberration correction upon vibration reduction can be effectively carried out. When the third lens group, which is fixed upon zooming and focusing, is used as a vibration reduction lens group, vibration reduction mechanism of the third lens group can be independent from the focusing mechanism. Since both of the mechanisms are disposed independently, the outer diameter of the optical system can be small.

EXAMPLE

Each example of a zoom lens according to the first embodiment is explained below with reference to drawings.

Each of zoom lenses according to Example 1 through 7 is composed of, in order from an object side, a first lens group G1 having positive refractive power, a second lens group G2 having negative refractive power, an aperture stop, a third lens group G3 having positive refractive power, a field stop, a fourth lens group G4 having positive refractive power, an optical low-pass filter OLPF, and a cover glass CG for a solid-state imaging device disposed on an image plane I.

The first lens group G1 is composed of, in order from the object side, a cemented lens constructed by a negative meniscus lens L11 having a convex surface facing the object side cemented with a positive meniscus lens L12 having a convex surface facing the object side, and a positive lens L13 having a radius of curvature of the object side surface being ⅙ or less of the absolute value of a radius of curvature of the image side surface.

The second lens group G2 is composed of, in order from the object side, a negative lens L21 having a concave surface facing the image side, a negative lens L22 having a concave surface facing the image side, and a positive meniscus lens L23 having a convex surface facing the object side.

The third lens group G3 is composed of, in order from the object side, a positive lens L31 having a convex surface facing the object side, a negative lens L32 having a concave surface facing the image side, and a positive lens L33 having a convex surface facing the image side.

The fourth lens group G4 is composed of a cemented lens constructed by, in order from the object side, a negative meniscus lens L41 having a convex surface facing the object side cemented with a double convex positive lens L42.

An aspherical surface is formed on each of the object side surface of the positive meniscus lens L13, the image side surface of the negative lens L21 having a concave surface facing the image side, the object side surface of the positive lens L31 having a convex surface facing the object side, and the image side surface of the double convex positive lens L42.

Upon zooming from a wide-angle end state W to a telephoto end state T, the first lens group G1 is fixed, the second lens group G2 is moved to the image plane I side, the third lens group G3 is fixed, and the fourth lens group G4 is moved along an optical axis with a trajectory having convex shape facing the object side.

Upon focusing on an object to be shot locating at a finite distance, the fourth lens group G4 is moved along the optical axis. In the solid-state imaging device according to the first embodiment, a diagonal length IH that is a distance between the center and a corner is 3.75 mm.

Example 1

FIG. 1 is a diagram showing a lens configuration of a zoom lens according Example 1 in which W denotes a wide-angle end state, M denotes an intermediate focal length state, and T denotes a telephoto end state. Symbols denoting lenses used for the following explanation are attached only to the telephoto end state T, and omitted in the other states. The above-described rule is to be the same in the other Examples.

In the zoom lens according to Example 1, the third lens group G3 carries out vibration reduction by moving in a direction perpendicular to the optical axis.

Various values associated with the zoom lens according to Example 1 are listed in Table 1.

In [Specifications], f denotes a focal length of the zoom lens, FNO denotes an f-number.

In [Lens Data], the left most column shows the lens surface number counted in order from the object side, the second column "r" shows a radius of curvature of the lens surface, the third column "d" shows a distance to the next surface, the fourth column "vd" shows Abbe number of the medium at d-line (wavelength λ=587.6 nm), and the fifth column "Nd" shows refractive index of the medium at d-line (wavelength λ=587.6 nm). "r=0.0000" denotes a plane surface. Refractive index of the air nd=1.000000 is omitted.

In [Aspherical Coefficient], when "y" denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere (paraxial radius of curvature), κ denotes a conical coefficient, and Cn denotes an aspherical coefficient of n-th order, the aspherical surface is exhibited by the following expression:

$$X(y)=y^2/[r\times\{1+(1-\kappa\times y^2/r^2)^{1/2}\}]+C4\times y^4+C6\times y^6+C8\times y^8+C10\times y^{10}$$

In [Aspherical coefficient], "E-n" denotes "×10$^{-n}$", in which "n" is an integer.

In [Variable Distances upon Focusing], variable distance values, a focal length f, and a magnification β with respect to wide-angle end state W, intermediate focal length state M, and telephoto end state T upon focusing on infinity or closest distance are shown. "D0" denotes a distance between the object and the most object side lens surface, Bf denotes a back focal length, and TL denotes a total lens length. In [Moving Amounts of VR Lens Group and Image Plane], a moving amount of the image plane with respect to a moving amount of the Vibration Reduction lens group upon focusing on infinity and closest distance are respectively shown. In [Values for Conditional Expressions], values for respective conditional expressions are shown.

In respective tables for various values, "mm" is generally used for the unit of length such as the focal length f, the radius of curvature r and the distance to the next lens surface d. However, since similar optical performance can be obtained by an optical system proportionally enlarged or reduced its dimension, the unit is not necessarily to be limited to "mm", and any other suitable unit can be used. The explanation of reference symbols is the same in the other Examples, so that duplicated explanations are omitted.

TABLE 1

[Specifications]

| | W | M | T |
|---|---|---|---|
| f = | 6.50 | 30.00 | 61.00 |
| FNO = | 3.8 | 4.1 | 3.7 |

[Lens Data]

| | r | d | vd | Nd |
|---|---|---|---|---|
| 1) | 25.9603 | 1.4000 | 17.98 | 1.945950 |
| 2) | 21.0289 | 6.1000 | 82.56 | 1.497820 |
| 3) | 327.6951 | 0.1000 | | |
| 4) | 17.2279 | 4.7000 | 82.56 | 1.497820 |
| 5) | 129.9432 | (d5 = var.) | | |
| 6) | −2681.7744 | 1.0000 | 40.19 | 1.850490 |
| 7) | 4.9916 | 2.2000 | | |
| 8) | −38.8019 | 1.0000 | 40.77 | 1.883000 |
| 9) | 11.1696 | 0.9000 | | |
| 10) | 11.6255 | 1.6000 | 17.98 | 1.945950 |
| 11) | 92.2561 | (d11 = var.) | | |
| 12) | 0.0000 | 0.5000 | Aperture Stop | |
| 13) | 5.3318 | 2.1000 | 64.06 | 1.516330 |
| 14) | 41.8200 | 0.1000 | | |
| 15) | 12.6924 | 1.0000 | 42.72 | 1.834810 |
| 16) | 5.7137 | 0.8000 | | |
| 17) | −114.0651 | 2.0000 | 91.20 | 1.456000 |
| 18) | −12.1743 | 0.0000 | | |
| 19) | 0.0000 | (d19 = var.) | Field Stop | |
| 20) | 9.2880 | 1.0000 | 25.46 | 2.000690 |
| 21) | 6.4169 | 3.5000 | 91.20 | 1.456000 |
| 22) | −19.3341 | (d22 = var.) | | |
| 23) | 0.0000 | 1.6000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Coefficient]

| surface | K | C 4 | C 6 | C 8 |
|---|---|---|---|---|
| 4: | 0.4808 | 5.42353E−06 | 3.74245E−09 | 0.00000E+00 |
| 7: | 0.2537 | 3.70121E−04 | 8.82513E−06 | 6.13778E−10 |
| 13: | 0.1321 | 1.00826E−04 | 1.60307E−05 | −9.89080E−07 |
| 22: | 1.0000 | −8.66901E−05 | 0.00000E+00 | 0.00000E+00 |

[Variable Distance upon Focusing]

| | W | M | T |
|---|---|---|---|
| | Infinity | | |
| f | 6.50000 | 30.00000 | 61.00000 |
| D0 | ∞ | ∞ | ∞ |
| d5 | 0.90000 | 10.93565 | 13.96348 |
| d11 | 15.40831 | 5.37266 | 2.34483 |
| d20 | 5.02154 | 1.42306 | 8.06457 |
| d22 | 6.51775 | 10.11623 | 3.47472 |
| Bf | 4.20934 | 4.20934 | 4.20934 |
| TL | 64.65693 | 64.65693 | 64.65693 |
| | Closest Distance | | |
| β | −0.04000 | −0.04000 | −0.10000 |
| D0 | 140.9181 | 683.8795 | 473.4833 |
| d5 | 0.90000 | 10.93565 | 13.96348 |
| d11 | 15.40831 | 5.37266 | 2.34483 |
| d20 | 4.74165 | 0.21801 | 1.66443 |
| d22 | 6.79764 | 11.32128 | 9.87486 |

TABLE 1-continued

| | | | |
|---|---|---|---|
| Bf | 4.20934 | 4.20934 | 4.20914 |
| TL | 64.65693 | 64.65693 | 64.65693 |

[Moving Amounts of VR Lens Group and Image Plane]

| | W | M | T |
|---|---|---|---|
| | | Infinity | |
| f | 6.50000 | 30.00000 | 61.00000 |
| VR Lens | ±0.124 | ±0.248 | ±0.383 |
| Image Plane | ±0.118 | ±0.253 | ±0.361 |
| | | Closest Distance | |
| β | −0.04000 | −0.04000 | −0.10000 |
| VR Lens | ±0.123 | ±0.239 | ±0.355 |
| Image Plane | ±0.118 | ±0.253 | ±0.361 |

[Values for Conditional Expressions]

| | |
|---|---|
| (1) D30 × N3133/Fw = | 1.371 |
| (2) F3/Fw = | 2.923 |
| (3) D30 × Ne/Fe = | 0.421 |
| (4) F3/F32 = | −1.427 |
| (5) N3133 = | 1.485 |
| (6) ν3133 = | 77.59 |
| (7) Ne = | 1.46 |
| (8) νe = | 91.20 |

Figure 2A:
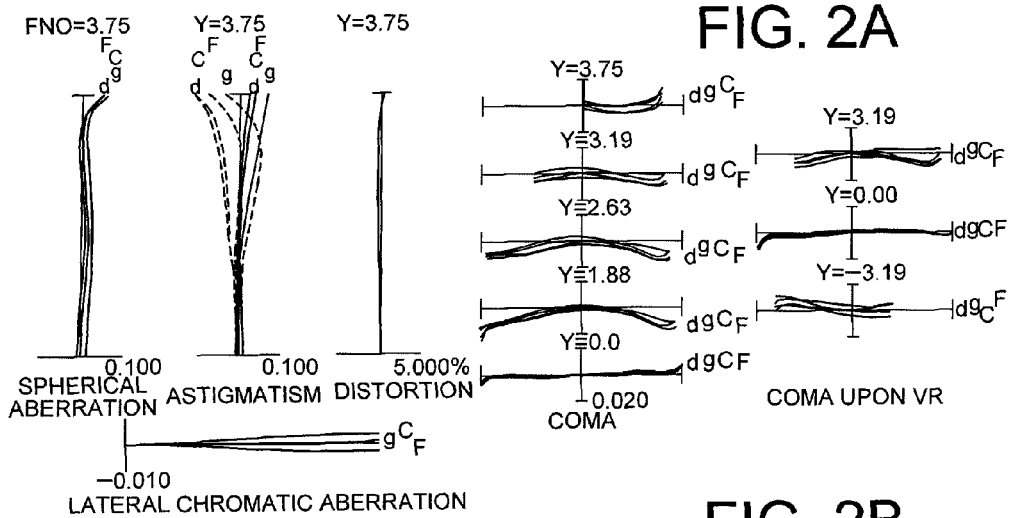
Figure 2B:
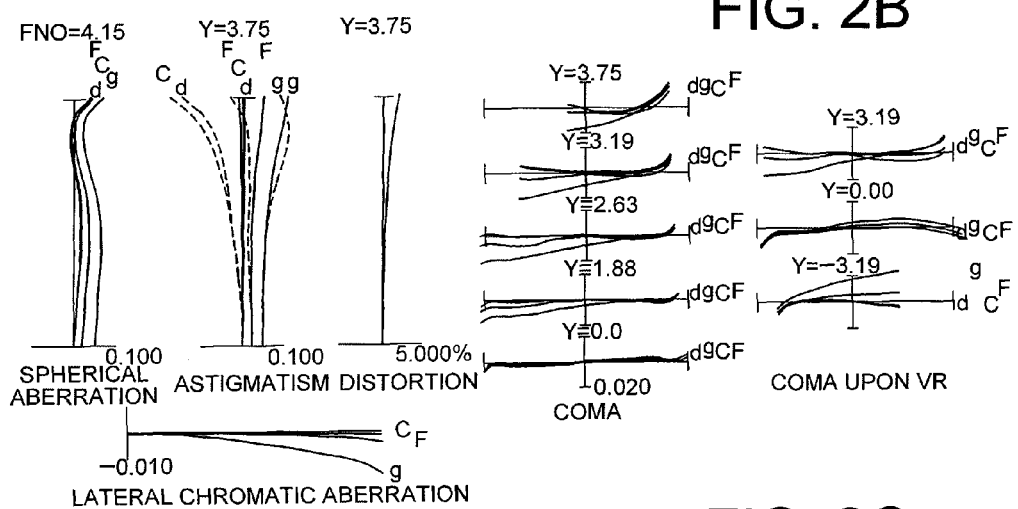
Figure 2C:
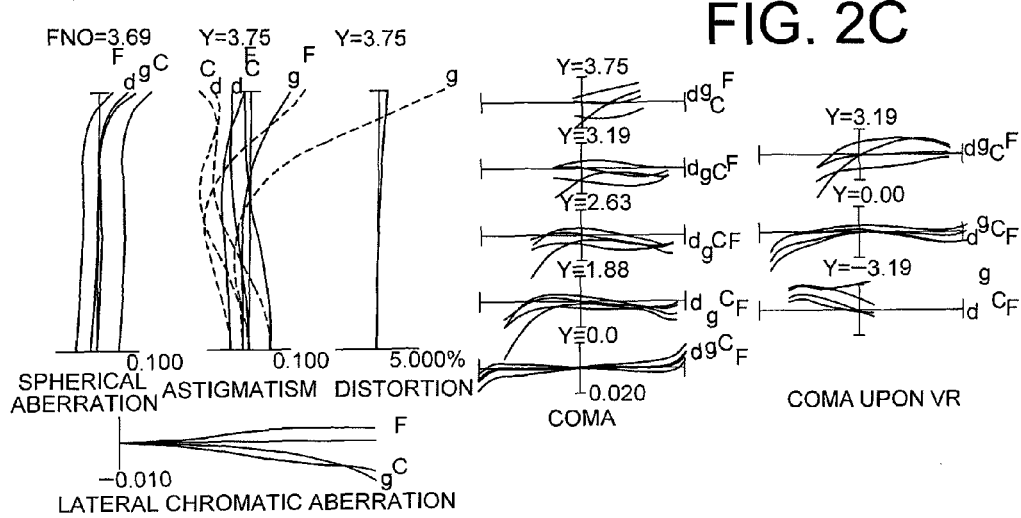
Figure 3A:
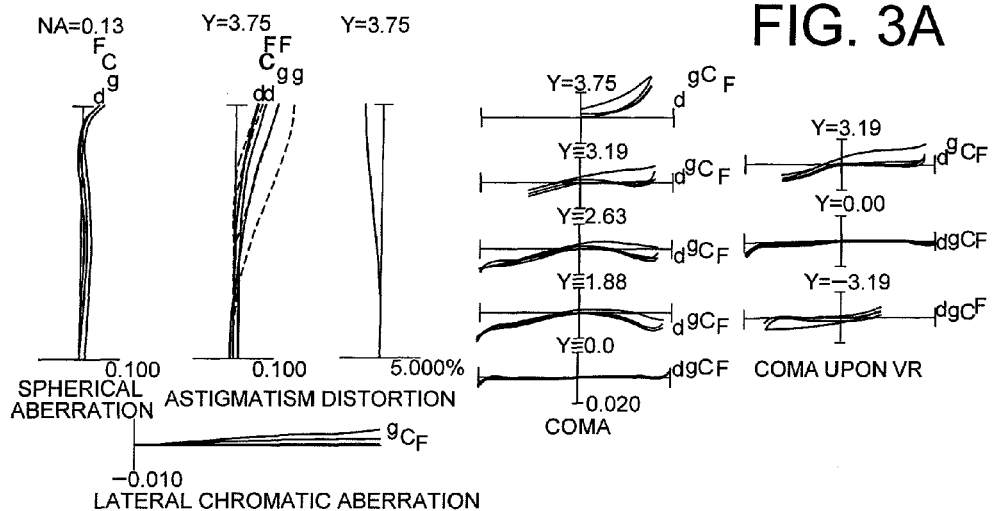
Figure 3B:
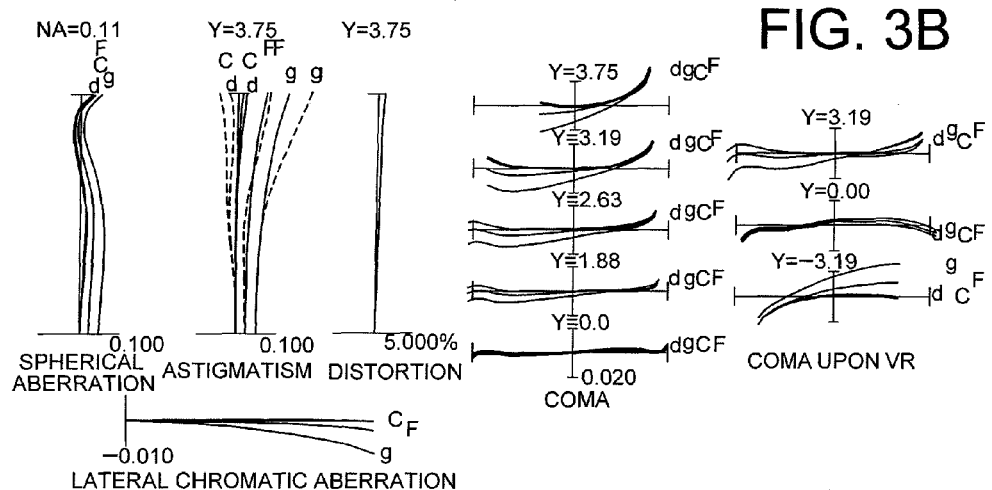
Figure 3C:
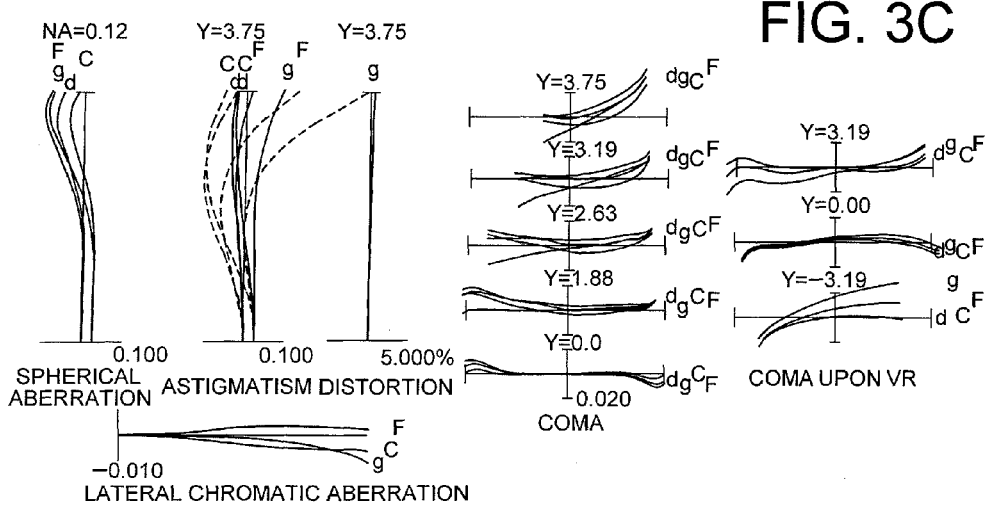

FIGS. 2A, 2B, 2C are graphs showing various aberrations and coma upon vibration reduction upon focusing on infinity of the zoom lens according to Example 1, in which FIG. 2A shows in the wide-angle end state, FIG. 2B shows in the intermediate focal length state, and FIG. 2C shows in the telephoto end state. FIGS. 3A, 3B, 3C are graphs showing various aberrations and coma upon vibration reduction upon focusing on the closest shooting range of the zoom lens according to Example 1, in which FIG. 3A shows the shooting range Rw=205 mm, FIG. 3B shows the shooting range Rm=749 mm, and FIG. 3C shows the shooting range Rt=538 mm.

In respective graphs, Y denotes an image height, NA denotes a numerical aperture, D denotes an aberration curve at d-line (wavelength λ=587.6 nm), and G denotes an aberration curve at g-line (wavelength λ=435.8 nm), C denotes an aberration curve at C-line (wavelength λ=656.3 nm), and F denotes an aberration curve at F-line (wavelength λ=486.1 nm). In the graph showing astigmatism, a solid line indicates a sagittal image plane, and a broken line indicates a meridional image plane. The graph showing lateral chromatic aberration shows d-line as a reference. The above-described explanations regarding various aberration graphs are the same as the other Examples.

As is apparent from the respective graphs, the zoom lens according to Example 1 shows superb optical performance as a result of good corrections to various aberrations from the wide-angle end state through the telephoto end state even upon carrying out vibration reduction.

Example 2

Figure 4:
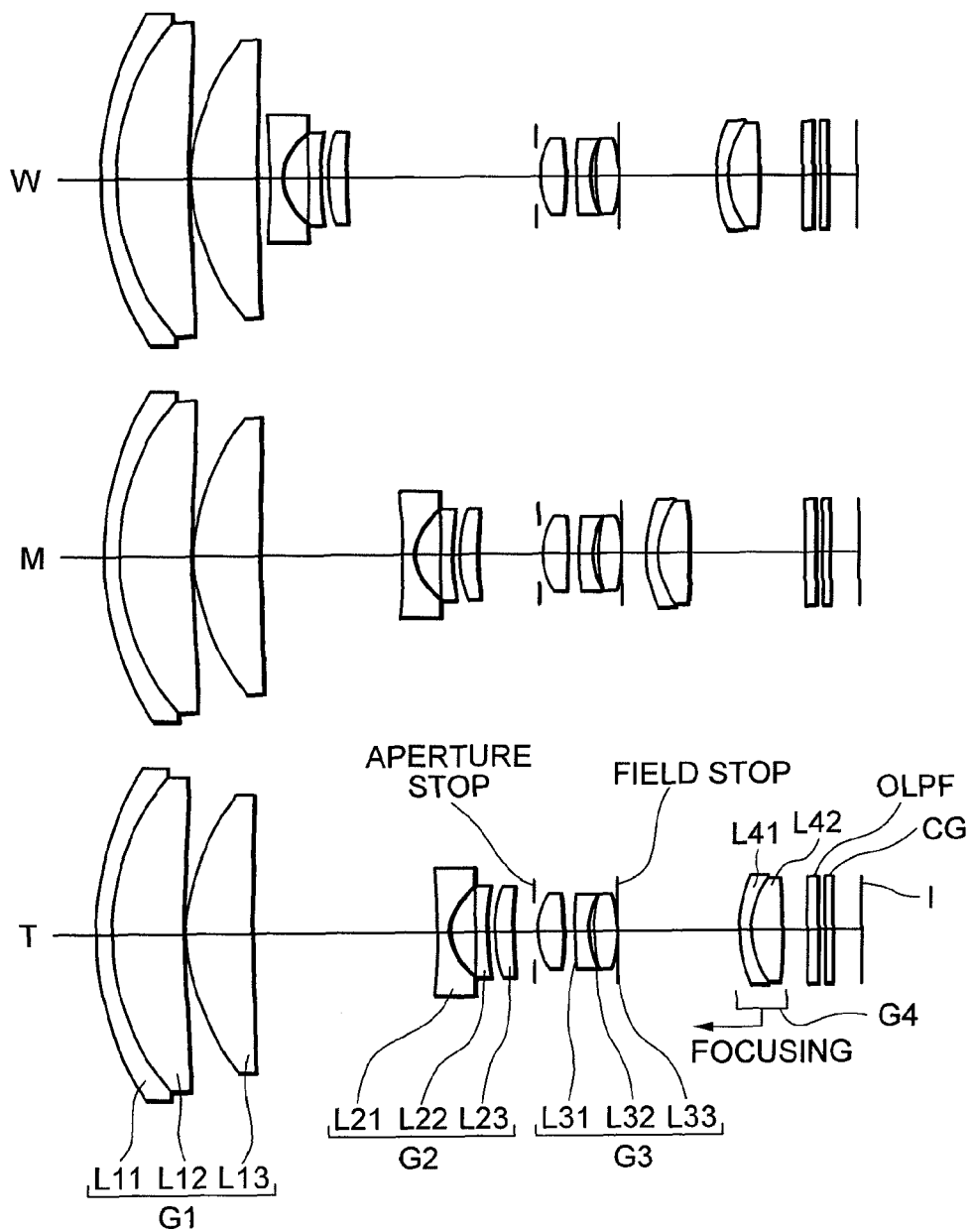
FIG. 4 is a diagram showing a lens configuration of a zoom lens according Example 2 and 10 in which W denotes a wide-angle end state, M denotes an intermediate focal length state, and T denotes a telephoto end state.

FIG. 4 is a diagram showing a lens configuration of a zoom lens according Example 2. Various values associated with the zoom lens according to Example 2 are listed in Table 2.

TABLE 2

[Specifications]

| | W | M | T |
|---|---|---|---|
| f = | 6.55 | 30.00 | 61.00 |
| FNO = | 3.6 | 3.8 | 3.7 |

[Lens Data]

| | r | d | νd | Nd |
|---|---|---|---|---|
| 1) | 25.7235 | 1.4000 | 20.88 | 1.922860 |
| 2) | 20.6571 | 5.9000 | 90.22 | 1.456500 |
| 3) | 212.5954 | 0.1000 | | |
| 4) | 17.1979 | 5.3000 | 90.91 | 1.454570 |
| 5) | 321.2332 | (d5 = var.) | | |
| 6) | −50.6548 | 1.0000 | 40.10 | 1.851350 |
| 7) | 4.2633 | 2.2000 | | |
| 8) | −92.4310 | 1.0000 | 40.77 | 1.883000 |
| 9) | 23.5051 | 0.6000 | | |
| 10) | 11.8678 | 1.5000 | 17.98 | 1.945950 |
| 11) | 55.8154 | (d11 = var.) | | |
| 12) | 0.0000 | 0.3000 | Aperture Stop | |
| 13) | 5.5193 | 2.1000 | 63.97 | 1.514280 |
| 14) | −37.8518 | 0.9000 | | |
| 15) | 49.7862 | 1.0000 | 42.72 | 1.834810 |
| 16) | 6.0285 | 0.5000 | | |
| 17) | 12.6257 | 1.8000 | 91.20 | 1.456000 |
| 18) | −11.7685 | 0.0000 | | |
| 19) | 0.0000 | (d19 = var.) | Field Stop | |
| 20) | 9.8698 | 1.0000 | 25.46 | 2.000690 |
| 21) | 6.7108 | 2.6000 | 91.30 | 1.455590 |
| 22) | −51.2524 | (d22 = var.) | | |
| 23) | 0.0000 | 0.9000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Coefficient]

| surface | K | C 4 | C 6 | C 8 |
|---|---|---|---|---|
| 4: | 0.5000 | 3.64840E−06 | 0.00000E+00 | 0.00000E+00 |
| 7: | −0.8591 | 1.93500E−03 | −2.58040E−05 | 0.00000E+00 |
| 13: | 0.5519 | −3.03330E−04 | 0.00000E+00 | 0.00000E+00 |
| 22: | −99.0000 | −2.56430E−04 | 0.00000E+00 | 0.00000E+00 |

[Variable Distance upon Focusing]

| | W | M | T |
|---|---|---|---|
| | | Infinity | |
| f | 6.55000 | 30.00000 | 60.10000 |
| D0 | ∞ | ∞ | ∞ |
| d5 | 1.02022 | 12.17260 | 15.26469 |
| d11 | 15.97509 | 4.82271 | 1.73062 |
| d19 | 8.08567 | 2.30237 | 9.98218 |
| d22 | 3.99302 | 9.77632 | 2.09651 |
| Bf | 2.37189 | 2.37189 | 2.37189 |
| TL | 62.54589 | 62.54589 | 62.54589 |
| | | Closest Distance | |
| β | −0.04000 | −0.04000 | −0.10000 |
| D0 | 141.5092 | 674.0564 | 452.9397 |
| d5 | 1.02022 | 12.17260 | 15.26469 |
| d11 | 15.97509 | 4.82271 | 1.73062 |
| d19 | 7.63484 | 0.80981 | 1.26412 |
| d22 | 4.44385 | 11.26888 | 10.81457 |
| Bf | 2.37189 | 2.37189 | 2.37189 |
| TL | 62.54589 | 62.54589 | 62.54589 |

[Values for Conditional Expressions]

| | |
|---|---|
| (1) D30 × N3133/Fw = | 1.428 |
| (2) F3/Fw = | 2.185 |
| (3) D30 × Ne/Fe = | 0.297 |
| (4) F3/F32 = | −1.724 |
| (5) N3133 = | 1.485 |
| (6) ν3133 = | 77.59 |

TABLE 2-continued

| | |
|---|---|
| (7) Ne = | 1.46 |
| (8) νe = | 91.20 |

Figure 5A:
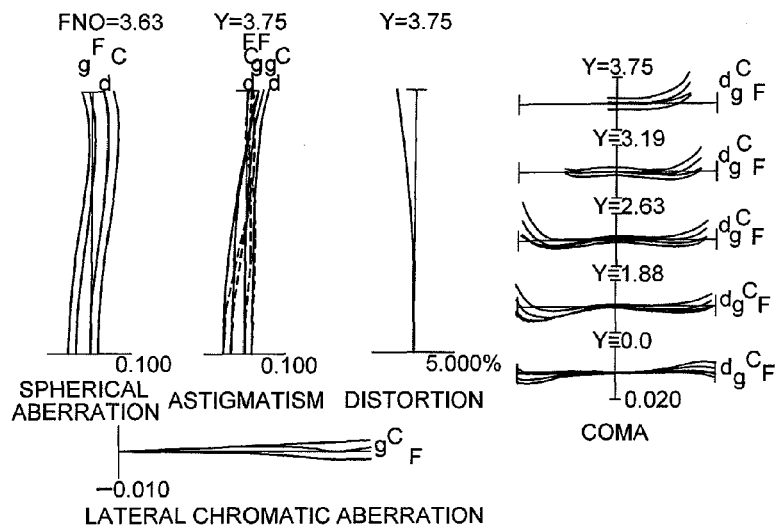
Figure 5B:
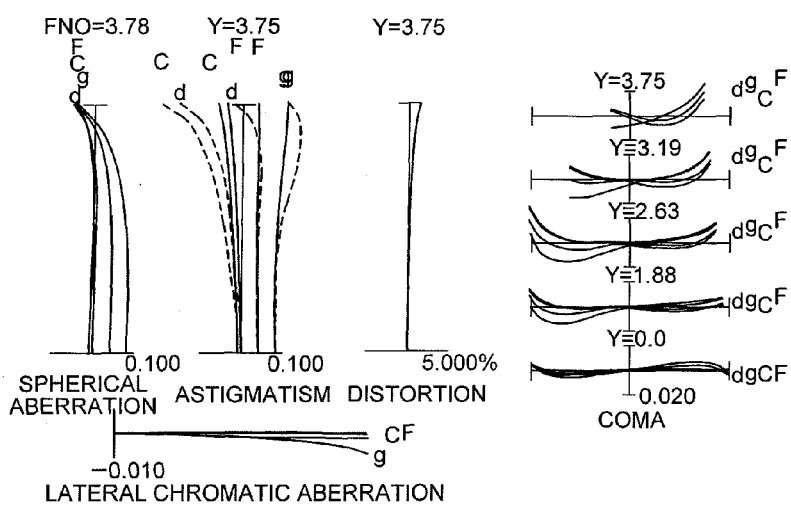
Figure 5C:
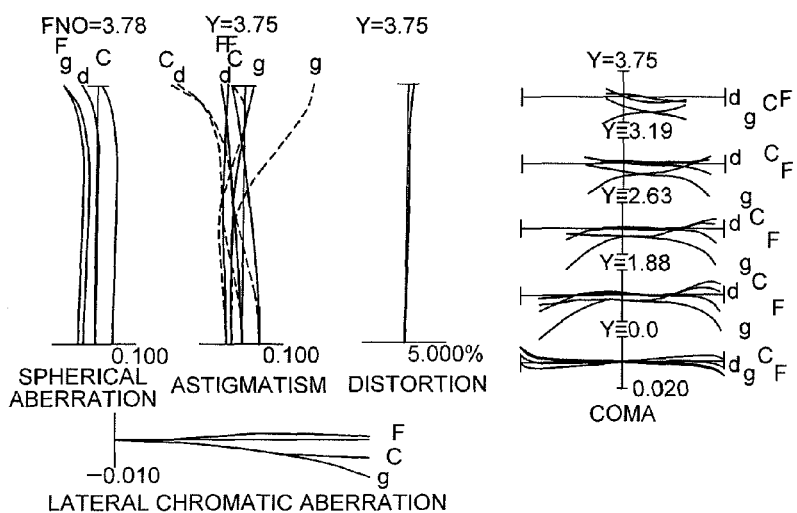
Figure 6A:
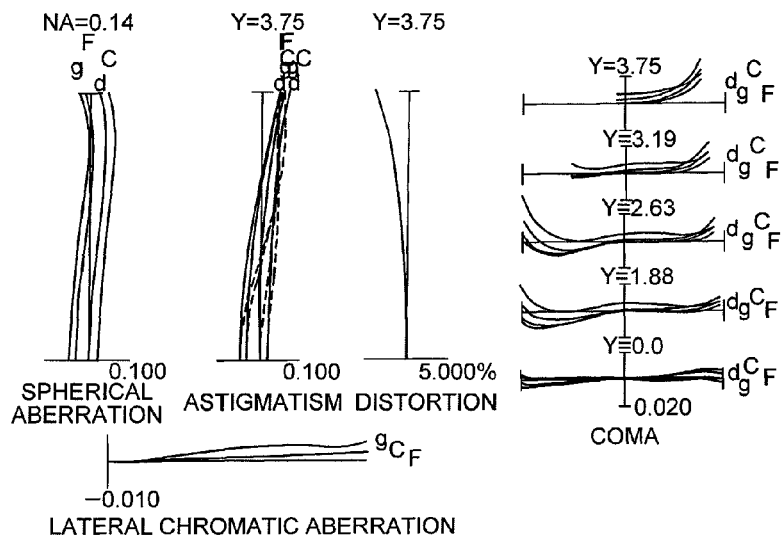
Figure 6B:
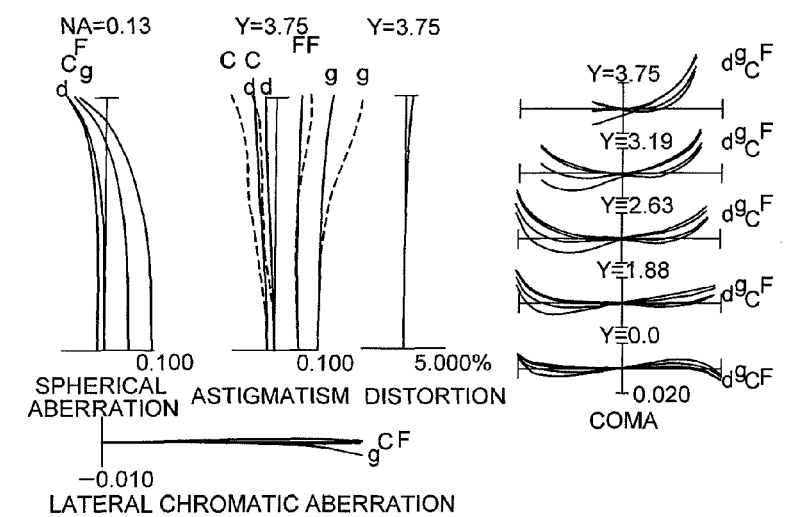
Figure 6C:
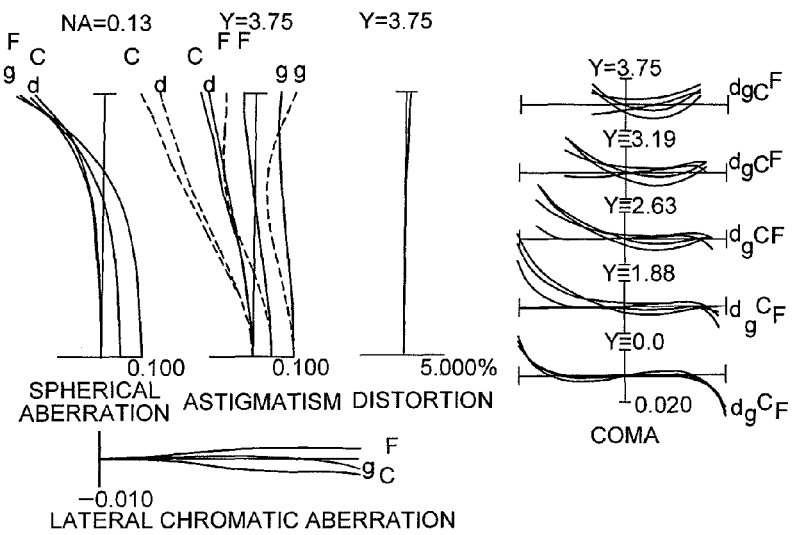

FIGS. 5A, 5B, 5C are graphs showing various aberrations upon focusing on infinity of the zoom lens according to Example 2, in which FIG. 5A shows in the wide-angle end state, FIG. 5B shows in the intermediate focal length state, and FIG. 5C shows in the telephoto end state. FIGS. 6A, 6B, 6C are graphs showing various aberrations upon focusing on the closest shooting range of the zoom lens according to Example 2, in which FIG. 6A shows the shooting range Rw=204 mm, FIG. 6B shows the shooting range Rm=737 mm, and FIG. 6C shows the shooting range Rt=515 mm.

As is apparent from the respective graphs, the zoom lens according to Example 2 shows superb optical performance as a result of good corrections to various aberrations from the wide-angle end state through the telephoto end state.

Example 3

Figure 7:
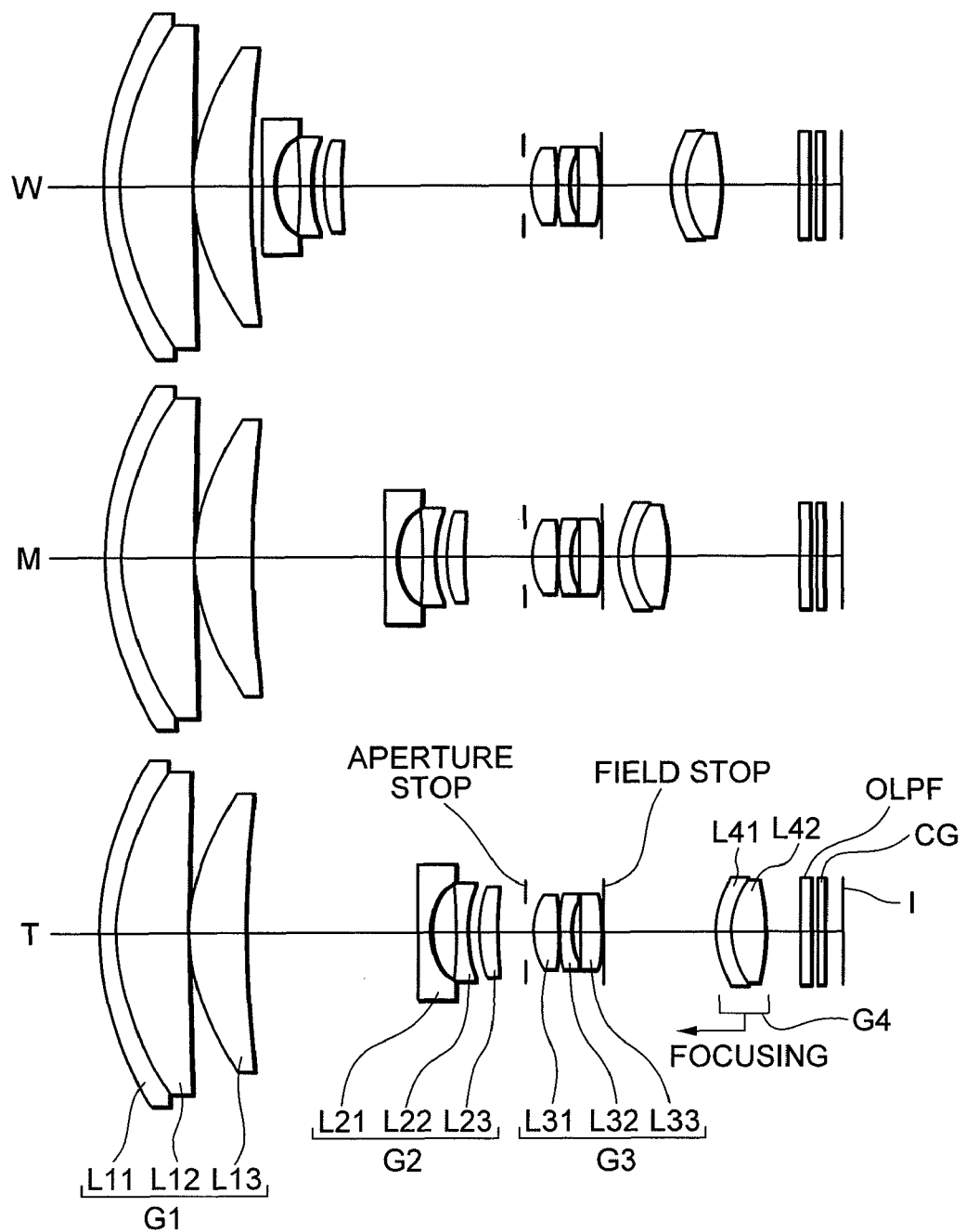
FIG. 7 is a diagram showing a lens configuration of a zoom lens according Example 3 and 11 in which W denotes a wide-angle end state, M denotes an intermediate focal length state, and T denotes a telephoto end state.

FIG. 7 is a diagram showing a lens configuration of a zoom lens according Example 3. Various values associated with the zoom lens according to Example 3 are listed in Table 3.

TABLE 3

[Specifications]

| | W | M | T |
|---|---|---|---|
| f = | 6.50 | 30.00 | 61.00 |
| FNO = | 3.7 | 4.0 | 3.8 |

[Lens Data]

| | r | d | νd | Nd |
|---|---|---|---|---|
| 1) | 25.9116 | 1.4000 | 17.98 | 1.945950 |
| 2) | 21.0025 | 6.1000 | 82.56 | 1.497820 |
| 3) | 347.3024 | 0.1000 | | |
| 4) | 17.1452 | 4.7000 | 82.56 | 1.497820 |
| 5) | 120.0854 | (d5 = var.) | | |
| 6) | 1316.3968 | 1.0000 | 40.19 | 1.850490 |
| 7) | 4.8440 | 2.2000 | | |
| 8) | −38.8019 | 1.0000 | 40.77 | 1.883000 |
| 9) | 11.8322 | 0.9000 | | |
| 10) | 11.4204 | 1.6000 | 17.98 | 1.945950 |
| 11) | 74.3334 | (d11 = var.) | | |
| 12) | 0.0000 | 0.5000 | Aperture Stop | |
| 13) | 5.0459 | 2.1000 | 64.06 | 1.516330 |
| 14) | −15.9483 | 0.1000 | | |
| 15) | 25.7688 | 1.0000 | 42.72 | 1.834810 |
| 16) | 5.4774 | 0.7000 | | |
| 17) | 61.0443 | 2.0000 | 91.20 | 1.456000 |
| 18) | −15.0266 | 0.0000 | | |
| 19) | 0.0000 | (d19 = var.) | Field Stop | |
| 20) | 10.2508 | 1.0000 | 25.46 | 2.000690 |
| 21) | 6.8801 | 3.0000 | 91.20 | 1.456000 |
| 22) | −26.6761 | (d22 = var.) | | |
| 23) | 0.0000 | 1.6000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Coefficient]

| surface | K | C 4 | C 6 | C 8 |
|---|---|---|---|---|
| 4: | 0.4287 | 6.72320E−06 | 8.65870E−09 | 0.00000E+00 |
| 7: | 0.6444 | 1.19890E−05 | 4.36360E−06 | −1.60260E−07 |

TABLE 3-continued

| 13: | 0.1247 | −2.33820E−04 | 9.48600E−06 | −9.89080E−07 |
|---|---|---|---|---|
| 22: | 1.0000 | −1.49710E−04 | 0.00000E+00 | 0.00000E+00 |

[Variable Distance upon Focusing]

| | W | M | T |
|---|---|---|---|
| | Infinity | | |
| f | 6.50000 | 30.00000 | 60.10000 |
| D0 | ∞ | ∞ | ∞ |
| d5 | 0.90000 | 11.04804 | 13.87679 |
| d11 | 15.23960 | 5.09156 | 2.26281 |
| d19 | 5.79062 | 1.55117 | 9.48020 |
| d22 | 6.49556 | 10.73501 | 2.80598 |
| Bf | 1.30180 | 1.30180 | 1.30180 |
| TL | 61.72758 | 61.72758 | 61.72758 |
| | Closest Distance | | |
| β | −0.04000 | −0.04000 | −0.10000 |
| D0 | 140.4928 | 676.3819 | 451.3168 |
| d5 | 0.90000 | 11.04804 | 13.87679 |
| d11 | 15.23960 | 5.09156 | 2.26281 |
| d19 | 5.42736 | 0.18034 | 1.32246 |
| d22 | 6.85882 | 12.10584 | 10.96372 |
| Bf | 1.30180 | 1.30180 | 1.30180 |
| TL | 61.72758 | 61.72758 | 61.72758 |

[Values for Conditional Expressions]

| | |
|---|---|
| (1) D30 × N3133/Fw = | 1.348 |
| (2) F3/Fw = | 2.283 |
| (3) D30 × Ne/Fe = | 0.325 |
| (4) F3/F32 = | −1.741 |
| (5) N3133 = | 1.485 |
| (6) ν3133 = | 77.59 |
| (7) Ne = | 1.46 |
| (8) νe = | 91.20 |

Figure 8A:
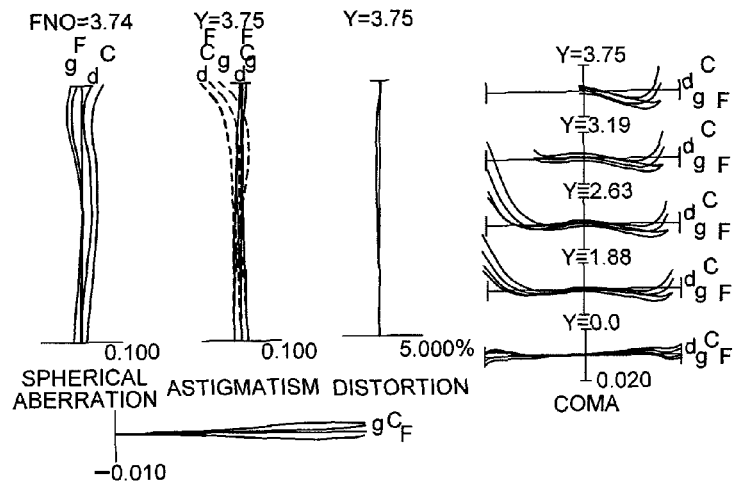
Figure 8B:
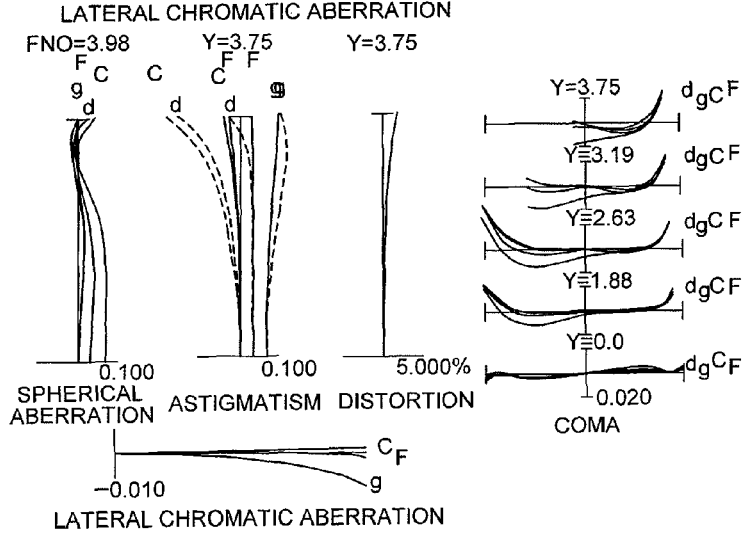
Figure 8C:
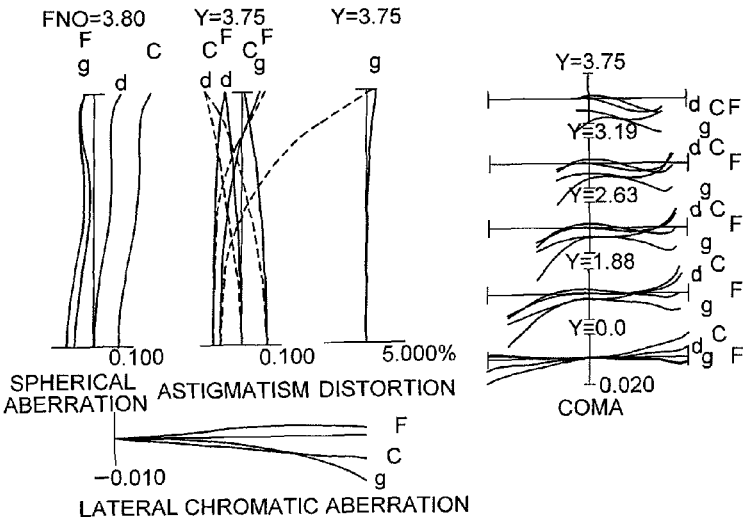
Figure 9A:
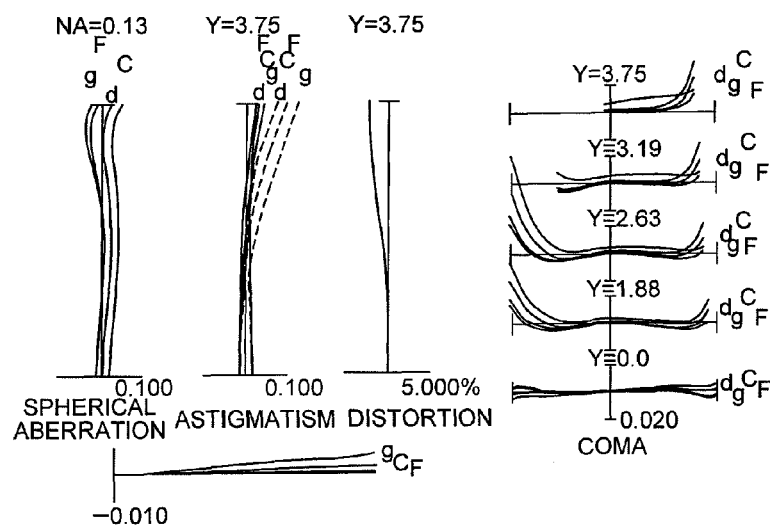
Figure 9B:
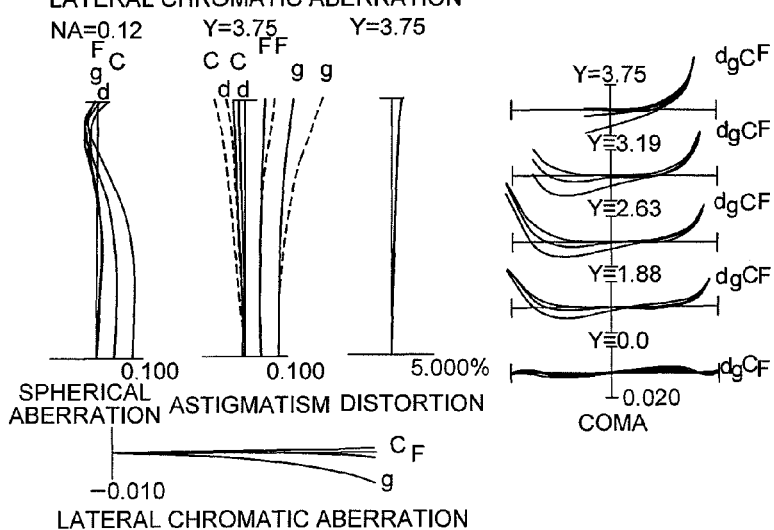
Figure 9C:
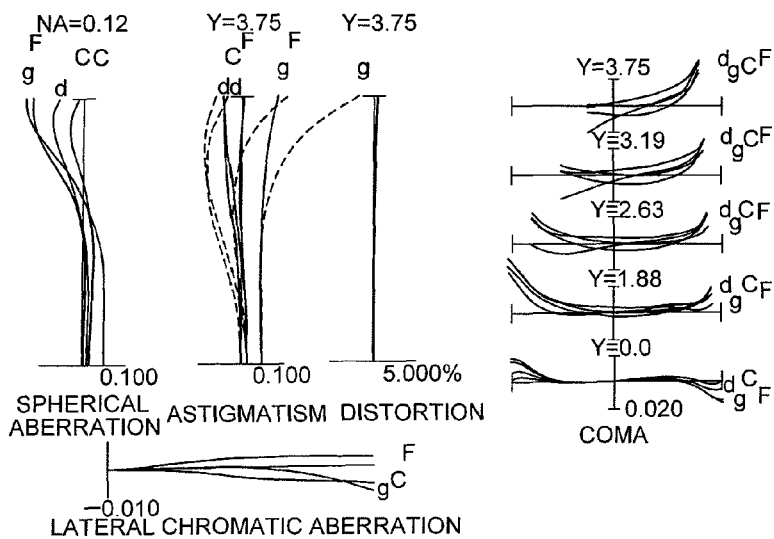

FIGS. 8A, 8B, 8C are graphs showing various aberrations upon focusing on infinity of the zoom lens according to Example 3, in which FIG. 8A shows in the wide-angle end state, FIG. 8B shows in the intermediate focal length state, and FIG. 8C shows in the telephoto end state. FIGS. 9A, 9B, 9C are graphs showing various aberrations upon focusing on the closest shooting range of the zoom lens according to Example 3, in which FIG. 9A shows the shooting range Rw=202 mm, FIG. 9B shows the shooting range Rm=738 mm, and FIG. 9C shows the shooting range Rt=513 mm.

As is apparent from the respective graphs, the zoom lens according to Example 3 shows superb optical performance as a result of good corrections to various aberrations from the wide-angle end state through the telephoto end state.

Example 4

Figure 10:
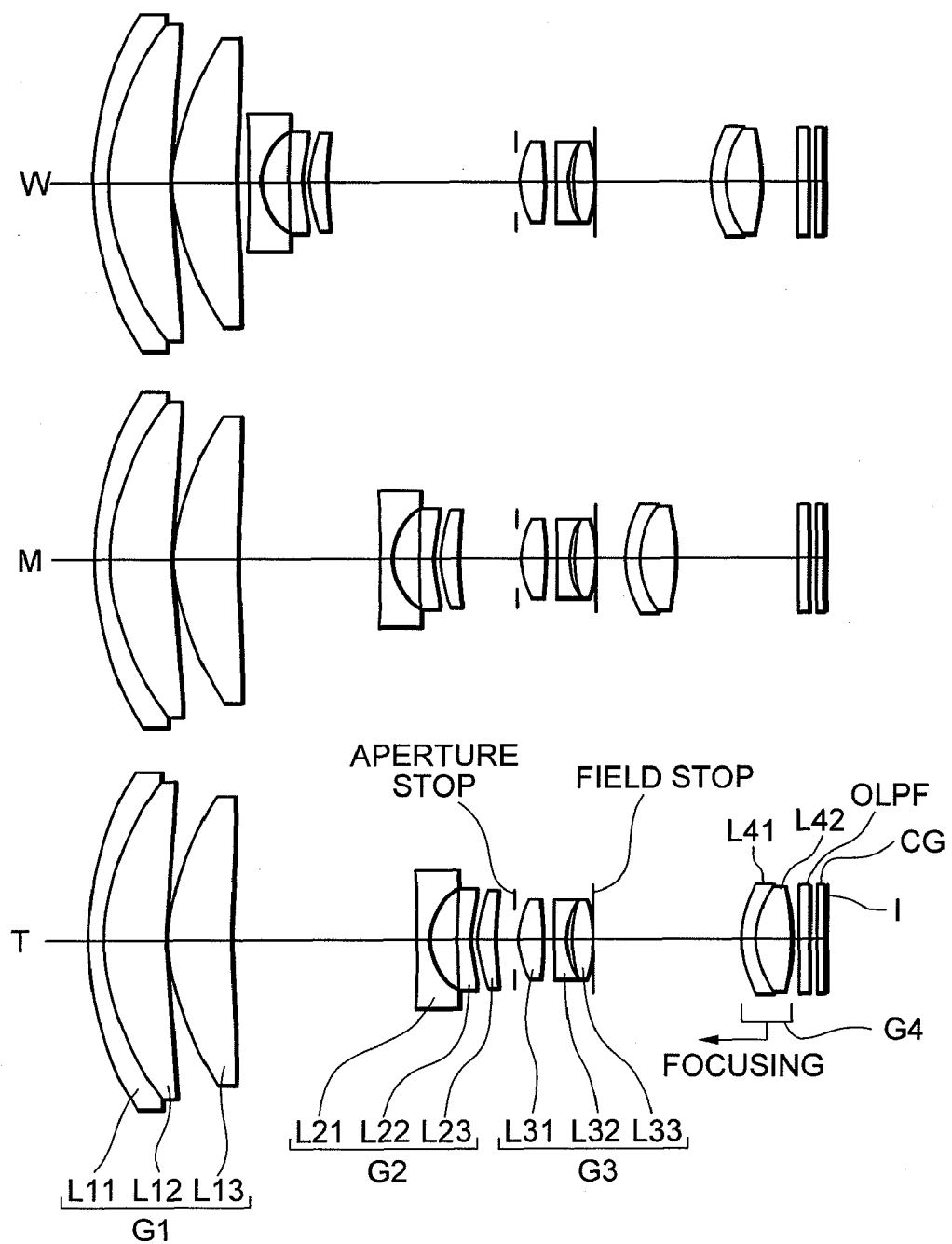
FIG. 10 is a diagram showing a lens configuration of a zoom lens according Example 4 and 12 in which W denotes a wide-angle end state, M denotes an intermediate focal length state, and T denotes a telephoto end state.

FIG. 10 is a diagram showing a lens configuration of a zoom lens according Example 4. Various values associated with the zoom lens according to Example 4 are listed in Table 4.

TABLE 4

[Specifications]

| | W | M | T |
|---|---|---|---|
| f = | 6.55 | 30.00 | 61.00 |
| FNO = | 3.5 | 3.5 | 3.7 |

[Lens Data]

| | r | d | vd | Nd |
|---|---|---|---|---|
| 1) | 24.5909 | 1.4000 | 20.88 | 1.922860 |
| 2) | 19.4777 | 5.2000 | 82.56 | 1.497820 |
| 3) | 115.1591 | 0.1000 | | |
| 4) | 18.4332 | 5.0000 | 82.56 | 1.497820 |
| 5) | 195.1358 | (d5 = var.) | | |
| 6) | −80.2684 | 1.0000 | 40.10 | 1.851350 |
| 7) | 4.3262 | 2.2000 | | |
| 8) | 89.2950 | 1.0000 | 40.77 | 1.883000 |
| 9) | 15.1775 | 0.6000 | | |
| 10) | 10.0334 | 1.5000 | 17.98 | 1.945950 |
| 11) | 28.1713 | (d11 = var.) | | |
| 12) | 0.0000 | 0.3000 | Aperture Stop | |
| 13) | 5.6537 | 2.1000 | 63.97 | 1.514280 |
| 14) | −23.6916 | 0.9000 | | |
| 15) | −327.0168 | 1.0000 | 42.72 | 1.834810 |
| 16) | 6.2930 | 0.4000 | | |
| 17) | 10.6945 | 1.8000 | 91.20 | 1.456000 |
| 18) | −8.9087 | 0.0000 | | |
| 19) | 0.0000 | (d19 = var.) | Field Stop | |
| 20) | 13.0182 | 1.0000 | 25.46 | 2.000690 |
| 21) | 8.7558 | 2.6000 | 91.30 | 1.455590 |
| 22) | −37.1642 | (d22 = var.) | | |
| 23) | 0.0000 | 0.9000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Coefficient]

| surface | K | C 4 | C 6 | C 8 |
|---|---|---|---|---|
| 4: | 0.5000 | 2.43110E−06 | 0.00000E+00 | 0.00000E+00 |
| 7: | −0.8038 | 1.87930E−03 | −1.33170E−05 | 0.00000E+00 |
| 13: | 0.5707 | −4.07580E−04 | 0.00000E+00 | 0.00000E+00 |
| 22: | −99.0000 | −3.32860E−04 | 0.00000E+00 | 0.00000E+00 |

[Variable Distance upon Focusing]

| | W | M | T |
|---|---|---|---|
| | | Infinity | |
| f | 6.55000 | 30.00000 | 60.10000 |
| D0 | ∞ | ∞ | ∞ |
| d5 | 1.02020 | 12.36308 | 15.22189 |
| d11 | 15.63505 | 4.29217 | 1.43336 |
| d19 | 10.13097 | 3.05373 | 12.83541 |
| d22 | 3.47935 | 10.55659 | 0.77491 |
| Bf | 0.15320 | 0.15320 | 0.15320 |
| TL | 60.41878 | 60.41878 | 60.41878 |
| | | Closest Distance | |
| β | −0.04000 | −0.04000 | −0.10000 |
| D0 | 140.5720 | 667.7010 | 426.1274 |
| d5 | 1.02020 | 12.36308 | 15.22189 |
| d11 | 15.63505 | 4.29217 | 1.43336 |
| d19 | 9.46632 | 1.30190 | 1.39860 |
| d22 | 4.14400 | 12.30842 | 12.21172 |
| Bf | 0.15320 | 0.15320 | 0.15320 |
| TL | 60.41878 | 60.41878 | 60.41878 |

[Values for Conditional Expressions]

| | |
|---|---|
| (1) D30 × N3133/Fw = | 1.406 |
| (2) F3/Fw = | 1.985 |
| (3) D30 × Ne/Fe = | 0.257 |
| (4) F3/F32 = | −1.760 |
| (5) N3133 = | 1.485 |
| (6) ν3133 = | 77.59 |

TABLE 4-continued

| | |
|---|---|
| (7) Ne = | 1.46 |
| (8) νe = | 91.20 |

Figure 11A:
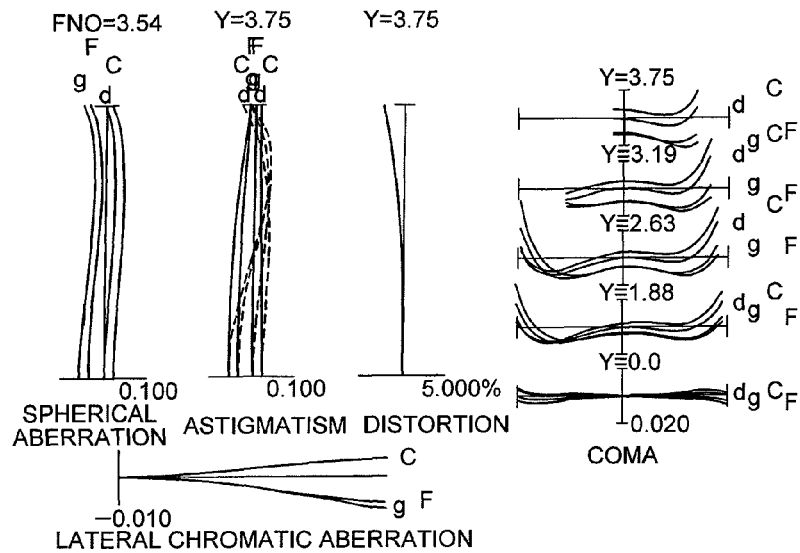
Figure 11B:
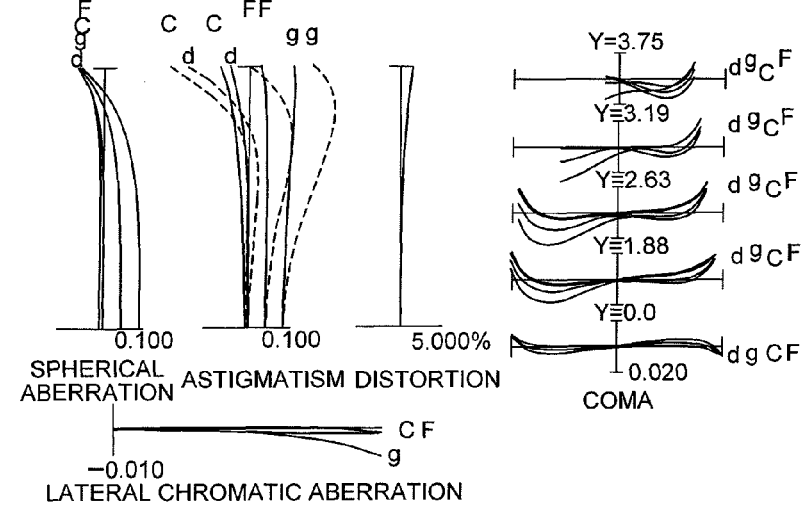
Figure 11C:
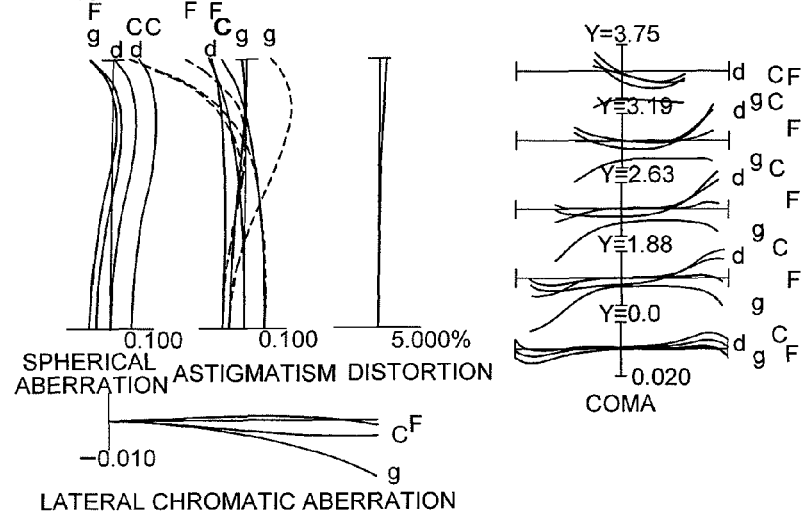
Figure 12A:
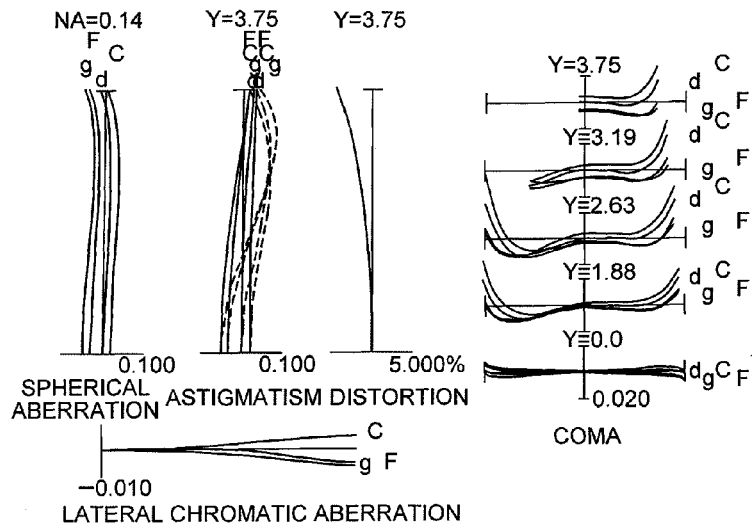
Figure 12B:
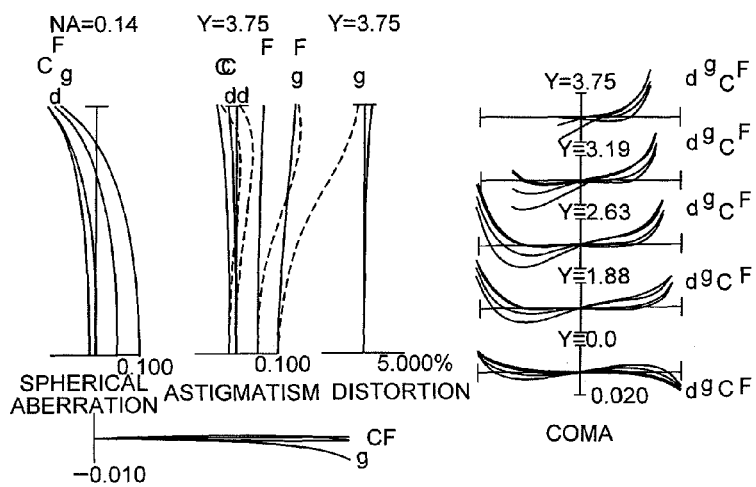
Figure 12C:
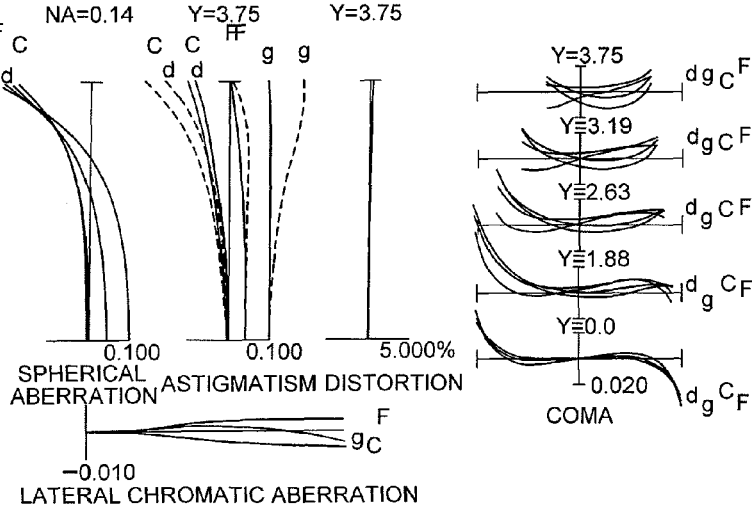

FIGS. 11A, 11B, 11C are graphs showing various aberrations upon focusing on infinity of the zoom lens according to Example 4, in which FIG. 11A shows in the wide-angle end state, FIG. 11B shows in the intermediate focal length state, and FIG. 11C shows in the telephoto end state. FIGS. 12A, 12B, 12C are graphs showing various aberrations upon focusing on the closest shooting range of the zoom lens according to Example 4, in which FIG. 12A shows the shooting range Rw=201 mm, FIG. 12B shows the shooting range Rm=728 mm, and FIG. 12C shows the shooting range Rt=487 mm.

As is apparent from the respective graphs, the zoom lens according to Example 4 shows superb optical performance as a result of good corrections to various aberrations from the wide-angle end state through the telephoto end state.

Example 5

Figure 13:
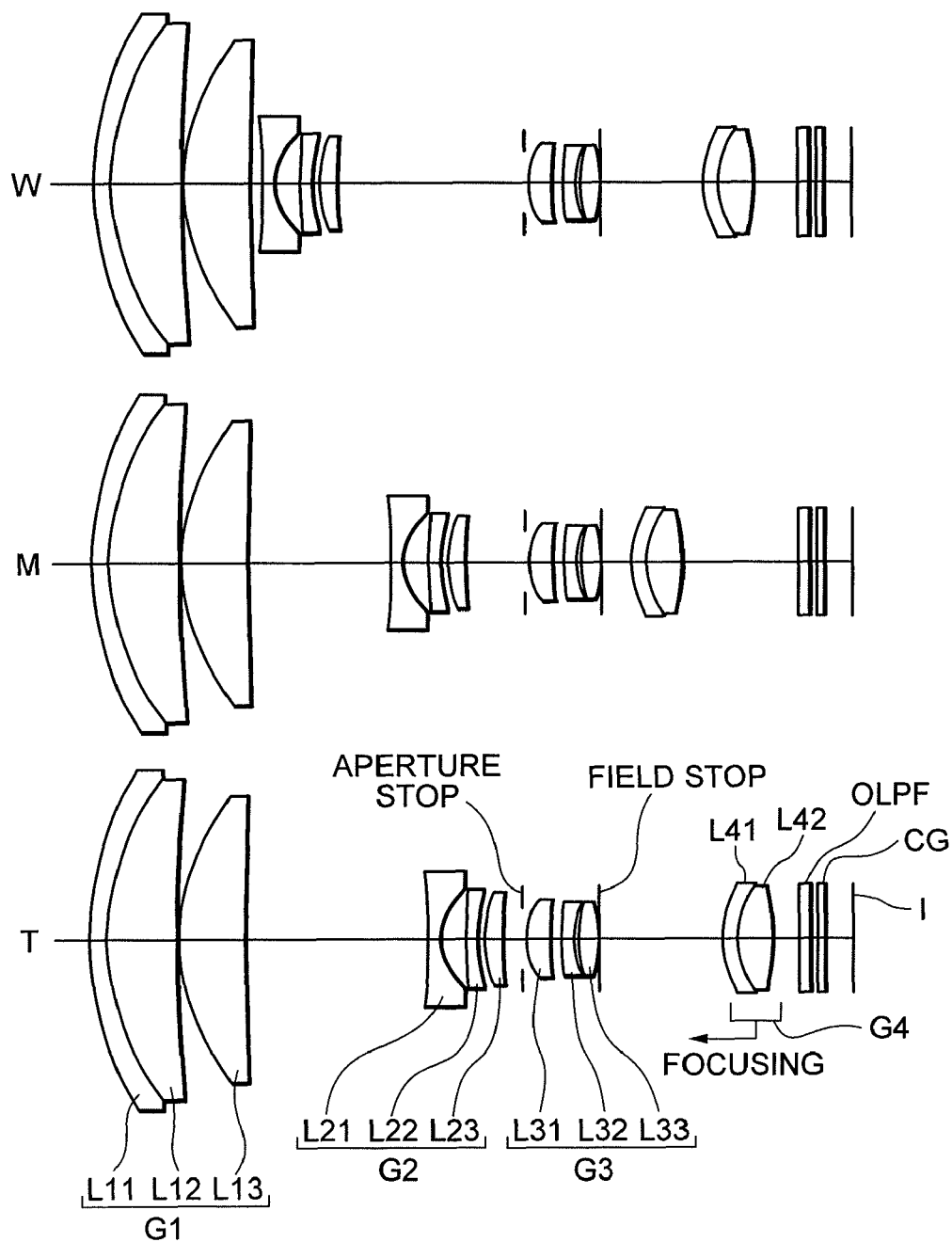
FIG. 13 is a diagram showing a lens configuration of a zoom lens according Example 5 and 13 in which W denotes a wide-angle end state, M denotes an intermediate focal length state, and T denotes a telephoto end state.

FIG. 13 is a diagram showing a lens configuration of a zoom lens according Example 5. Various values associated with the zoom lens according to Example 5 are listed in Table 5.

TABLE 5

[Specifications]

| | W | M | T |
|---|---|---|---|
| f = | 6.55 | 30.00 | 60.10 |
| FNO = | 3.5 | 3.6 | 3.6 |

[Lens Data]

| | r | d | vd | Nd |
|---|---|---|---|---|
| 1) | 26.2824 | 1.4000 | 20.88 | 1.922860 |
| 2) | 21.0438 | 5.9000 | 90.22 | 1.456500 |
| 3) | 228.8413 | 0.1000 | | |
| 4) | 17.1969 | 5.3000 | 90.91 | 1.454570 |
| 5) | 384.2679 | (d5 = var.) | | |
| 6) | −48.0949 | 1.0000 | 40.10 | 1.851350 |
| 7) | 4.3298 | 2.2000 | | |
| 8) | 67.2370 | 1.0000 | 40.77 | 1.883000 |
| 9) | 14.7215 | 0.6000 | | |
| 10) | 10.4892 | 1.5000 | 17.98 | 1.945950 |
| 11) | 35.3651 | (d11 = var.) | | |
| 12) | 0.0000 | 0.3000 | Aperture Stop | |
| 13) | 5.3545 | 2.1000 | 63.97 | 1.514280 |
| 14) | 20.6091 | 0.9000 | | |
| 15) | 22.0033 | 1.0000 | 42.72 | 1.834810 |
| 16) | 6.1272 | 0.4000 | | |
| 17) | 10.2439 | 1.8000 | 91.20 | 1.456000 |
| 18) | −9.5325 | 0.0000 | | |
| 19) | 0.0000 | (d19 = var.) | Field Stop | |
| 20) | 9.9547 | 1.0000 | 25.46 | 2.000690 |
| 21) | 6.7749 | 2.6000 | 91.30 | 1.455590 |
| 22) | −50.2288 | (d22 = var.) | | |
| 23) | 0.0000 | 0.9000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Coefficient]

| surface | K | C 4 | C 6 | C 8 |
|---|---|---|---|---|
| 4: | 0.5000 | 3.76710E−06 | 0.00000E+00 | 0.00000E+00 |
| 7: | −0.7125 | 1.62070E−03 | −2.29890E−05 | 0.00000E+00 |

TABLE 5-continued

| | | | |
|---|---|---|---|
| 13: | 0.6618 | −3.30480E−04 | 0.00000E+00 | 0.00000E+00 |
| 22: | −99.0000 | −2.73180E−04 | 0.00000E+00 | 0.00000E+00 |

[Variable Distance upon Focusing]

| | W | M | T |
|---|---|---|---|
| | | Infinity | |
| f | 6.55000 | 30.00000 | 60.10000 |
| D0 | ∞ | ∞ | ∞ |
| d5 | 1.02020 | 12.17258 | 15.26467 |
| d11 | 15.30818 | 4.15580 | 1.06371 |
| d19 | 8.76585 | 2.98255 | 10.66236 |
| d22 | 4.01583 | 9.79913 | 2.11932 |
| Bf | 2.37189 | 2.37189 | 2.37189 |
| TL | 62.48195 | 62.48195 | 62.48195 |
| | | Closest Distance | |
| β | −0.04000 | −0.04000 | −0.10000 |
| D0 | 141.5092 | 674.0564 | 452.9397 |
| d5 | 1.02020 | 12.17258 | 15.26467 |
| d11 | 15.30818 | 4.15580 | 1.06371 |
| d19 | 8.31502 | 1.48999 | 1.94430 |
| d22 | 4.46666 | 11.29169 | 10.83738 |
| Bf | 2.37189 | 2.37189 | 2.37189 |
| TL | 62.48195 | 62.48195 | 62.48195 |

[Values for Conditional Expressions]

| | |
|---|---|
| (1) D30 × N3133/Fw = | 1.406 |
| (2) F3/Fw = | 2.185 |
| (3) D30 × Ne/Fe = | 0.292 |
| (4) F3/F32 = | −1.367 |
| (5) N3133 = | 1.485 |
| (6) ν3133 = | 77.59 |
| (7) Ne = | 1.46 |
| (8) νe = | 91.20 |

Figure 14A:
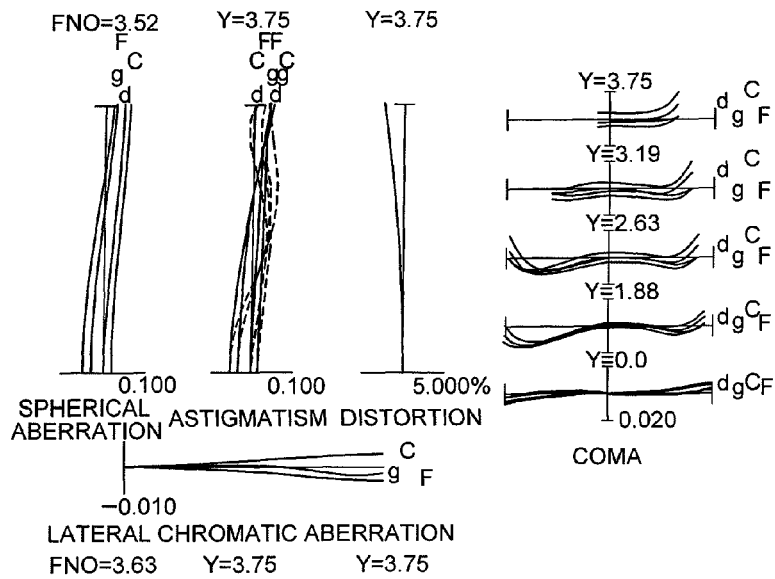
Figure 14B:
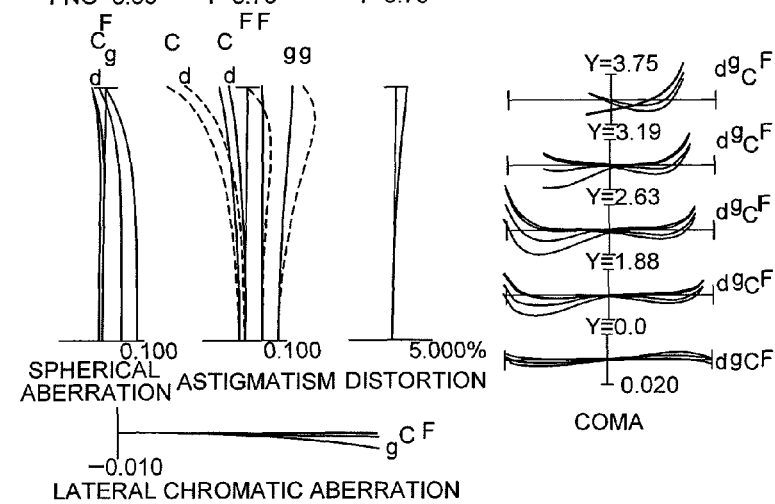
Figure 14C:
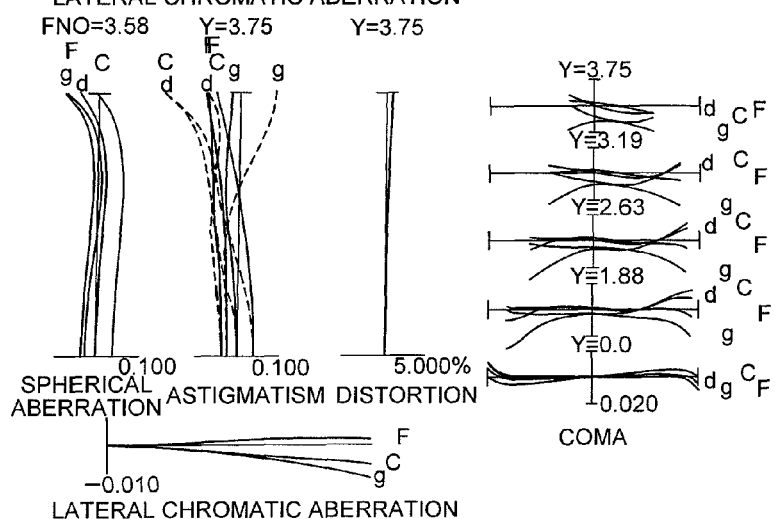
Figure 15A:
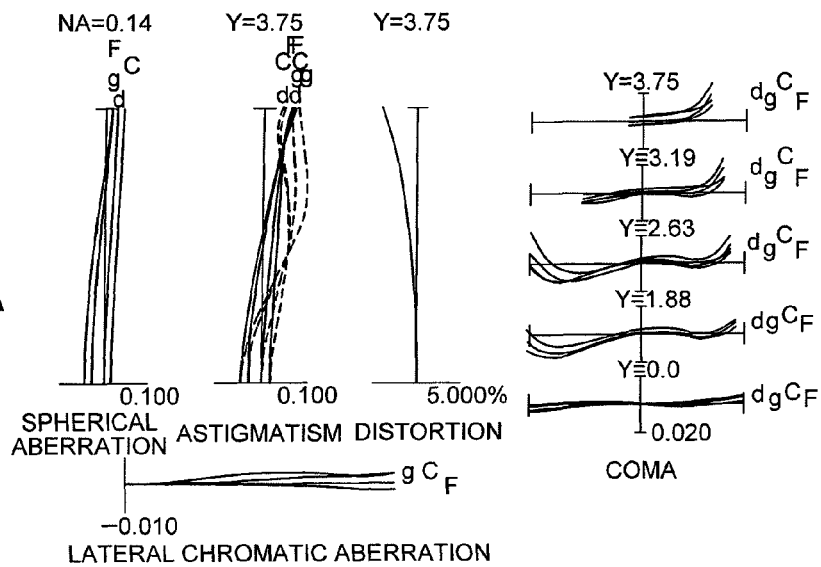
Figure 15B:
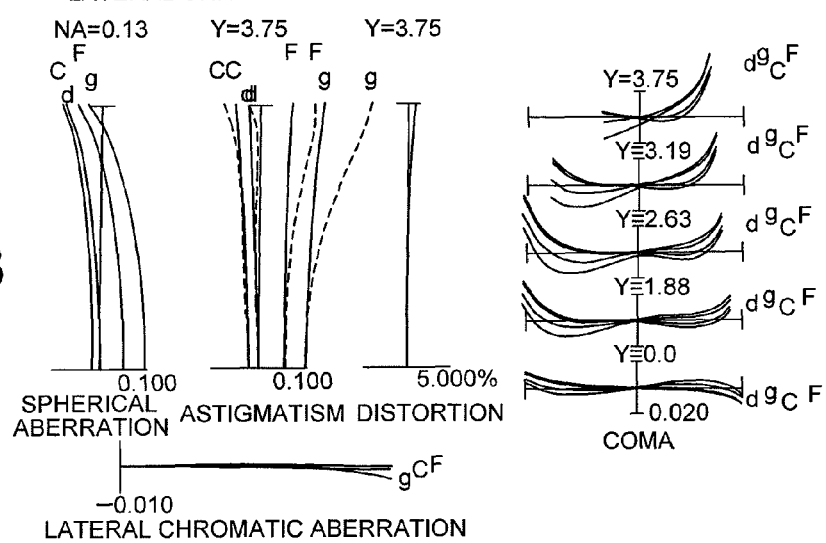
Figure 15C:
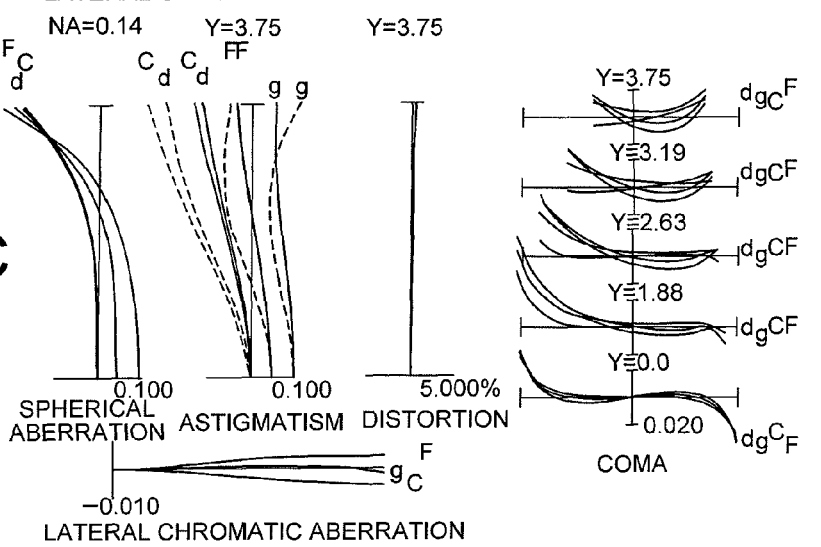

FIGS. 14A, 14B, 14C are graphs showing various aberrations upon focusing on infinity of the zoom lens according to Example 5, in which FIG. 14A shows in the wide-angle end state, FIG. 14B shows in the intermediate focal length state, and FIG. 14C shows in the telephoto end state. FIGS. 15A, 15B, 15C are graphs showing various aberrations upon focusing on the closest shooting range of the zoom lens according to Example 5, in which FIG. 15A shows the shooting range Rw=204 mm, FIG. 15B shows the shooting range Rm=737 mm, and FIG. 15C shows the shooting range Rt=515 mm.

As is apparent from the respective graphs, the zoom lens according to Example 5 shows superb optical performance as a result of good corrections to various aberrations from the wide-angle end state through the telephoto end state.

Example 6

Figure 16:
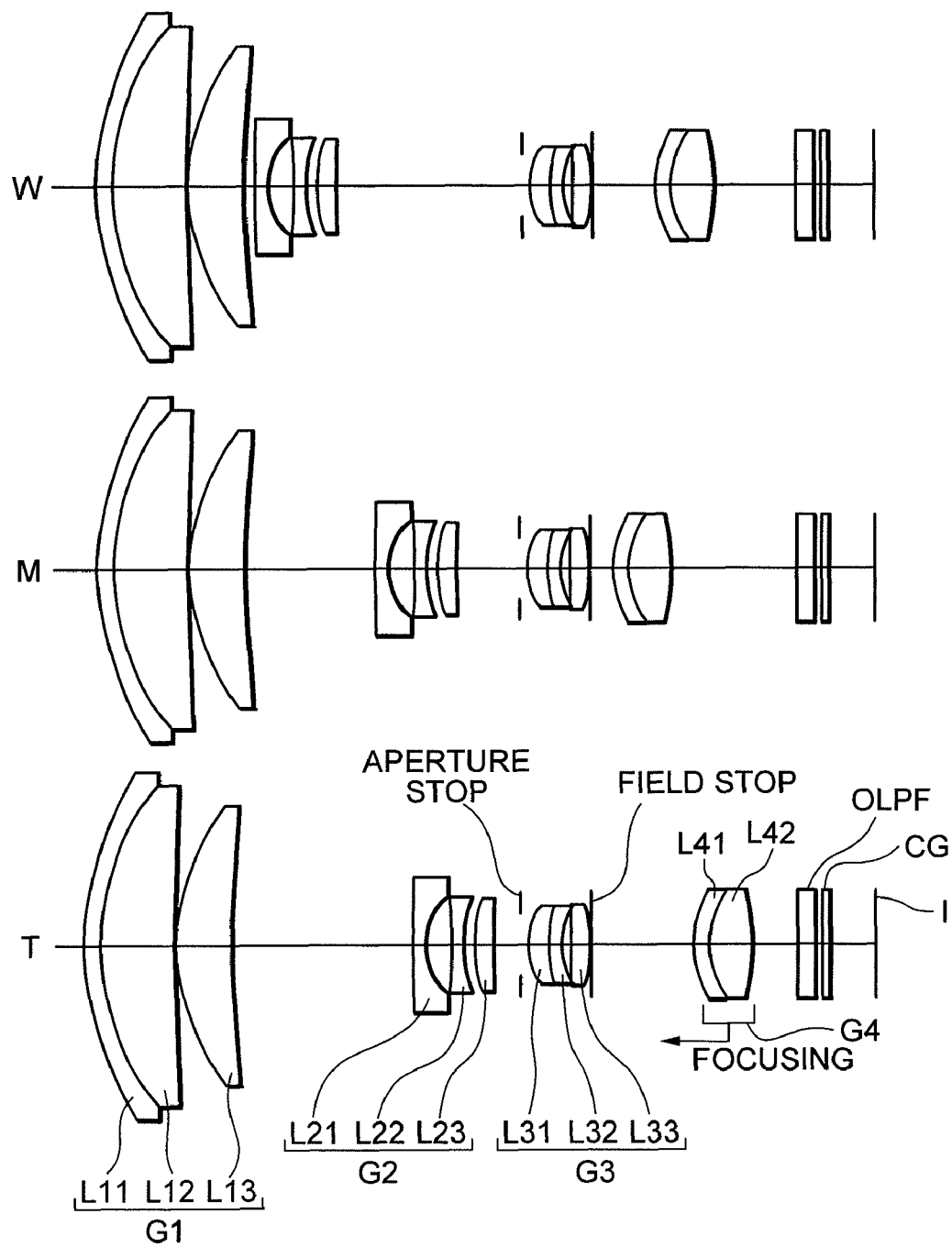
FIG. 16 is a diagram showing a lens configuration of a zoom lens according Example 6 and 14 in which W denotes a wide-angle end state, M denotes an intermediate focal length state, and T denotes a telephoto end state.

FIG. 16 is a diagram showing a lens configuration of a zoom lens according Example 6. Various values associated with the zoom lens according to Example 6 are listed in Table 6.

TABLE 6

[Specifications]

| | W | M | T |
|---|---|---|---|
| f = | 6.50 | 30.00 | 61.00 |
| FNO = | 3.5 | 3.8 | 3.4 |

[Lens Data]

| | r | d | νd | Nd |
|---|---|---|---|---|
| 1) | 25.9678 | 1.4000 | 17.98 | 1.945950 |
| 2) | 21.0210 | 6.1000 | 82.56 | 1.497820 |
| 3) | 339.3220 | 0.1000 | | |
| 4) | 17.2833 | 4.7000 | 82.56 | 1.497820 |
| 5) | 132.3282 | (d5 = var.) | | |
| 6) | −1236.7392 | 1.0000 | 40.19 | 1.850490 |
| 7) | 5.0328 | 2.2000 | | |
| 8) | −38.8019 | 1.0000 | 40.77 | 1.883000 |
| 9) | 11.0291 | 0.9000 | | |
| 10) | 11.6547 | 1.6000 | 17.98 | 1.945950 |
| 11) | 96.0997 | (d11 = var.) | | |
| 12) | 0.0000 | 0.5000 | Aperture Stop | |
| 13) | 4.8302 | 1.8000 | 70.45 | 1.487490 |
| 14) | 11.7906 | 0.1000 | | |
| 15) | 9.0250 | 1.0000 | 42.72 | 1.834810 |
| 16) | 5.3685 | 0.8000 | | |
| 17) | −83.9696 | 1.7000 | 82.56 | 1.497820 |
| 18) | −10.6798 | 0.0000 | | |
| 19) | 0.0000 | (d19 = var.) | Field Stop | |
| 20) | 9.8440 | 1.0000 | 25.46 | 2.000690 |
| 21) | 6.4780 | 3.5000 | 82.56 | 1.497820 |
| 22) | −21.7650 | (d22 = var.) | | |
| 23) | 0.0000 | 1.6000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Coefficient]

| surface | K | C 4 | C 6 | C 8 |
|---|---|---|---|---|
| 4: | 0.4504 | 6.12900E−06 | 4.75680E−09 | 0.00000E+00 |
| 7: | 0.2496 | 3.63880E−04 | 7.00120E−06 | −1.36530E−08 |
| 13: | 0.1671 | 1.54140E−04 | 2.28490E−05 | −9.89080E−07 |
| 22: | 1.0000 | −1.16660E−04 | 0.00000E+00 | 0.00000E+00 |

[Variable Distance upon Focusing]

| | W | M | T |
|---|---|---|---|
| | | Infinity | |
| f | 6.55000 | 30.00000 | 60.10000 |
| D0 | ∞ | ∞ | ∞ |
| d5 | 0.90000 | 10.93565 | 13.96348 |
| d11 | 15.13311 | 5.09746 | 2.06963 |
| d19 | 5.66087 | 2.06239 | 8.70390 |
| d22 | 6.59264 | 10.19112 | 3.54961 |
| Bf | 4.20934 | 4.20934 | 4.20934 |
| TL | 64.49596 | 64.49596 | 64.49596 |
| | | Closest Distance | |
| β | −0.04000 | −0.04000 | −0.10000 |
| D0 | 140.9181 | 683.8795 | 473.4833 |
| d5 | 0.90000 | 10.93565 | 13.96348 |
| d11 | 15.13311 | 5.09746 | 2.06963 |
| d19 | 5.38098 | 0.85734 | 2.30376 |
| d22 | 6.87253 | 11.39617 | 9.94975 |
| Bf | 4.20934 | 4.20934 | 4.20934 |
| TL | 64.49596 | 64.49596 | 64.49596 |

[Values for Conditional Expressions]

| | |
|---|---|
| (1) D30 × N3133/Fw = | 1.240 |
| (2) F3/Fw = | 2.923 |
| (3) D30 × Ne/Fe = | 0.390 |
| (4) F3/F32 = | 1.048 |
| (5) N3133 = | 1.493 |
| (6) ν3133 = | 76.51 |

TABLE 6-continued

| | |
|---|---:|
| (7) Ne = | 1.50 |
| (8) νe = | 82.56 |

Figure 17A:
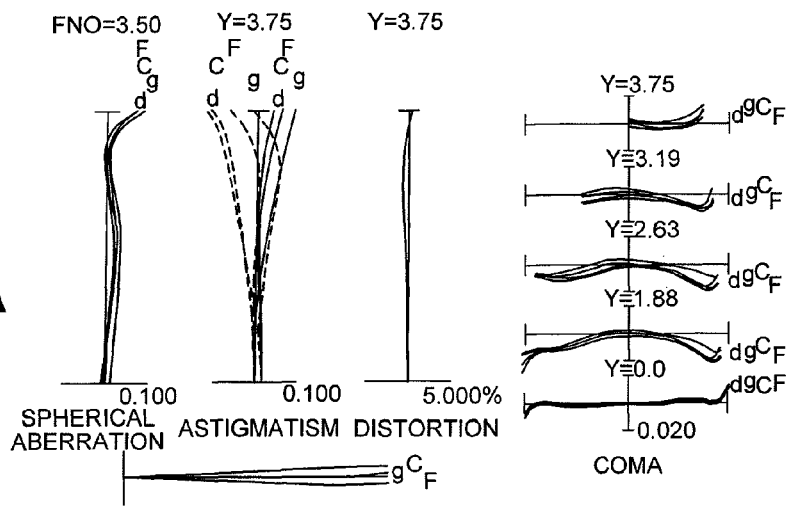
Figure 17B:
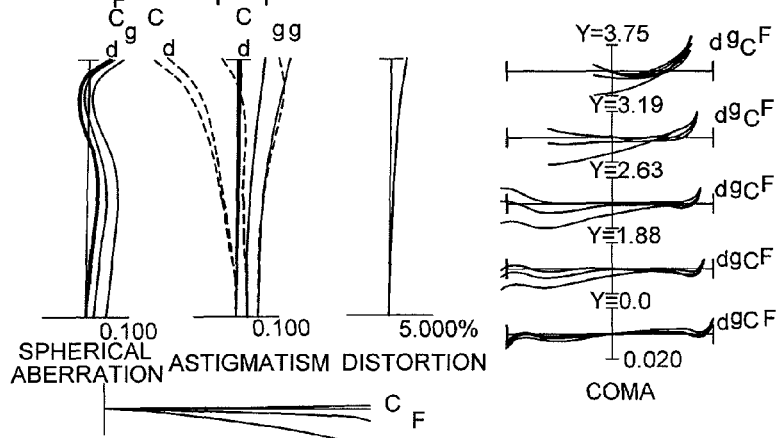
Figure 17C:
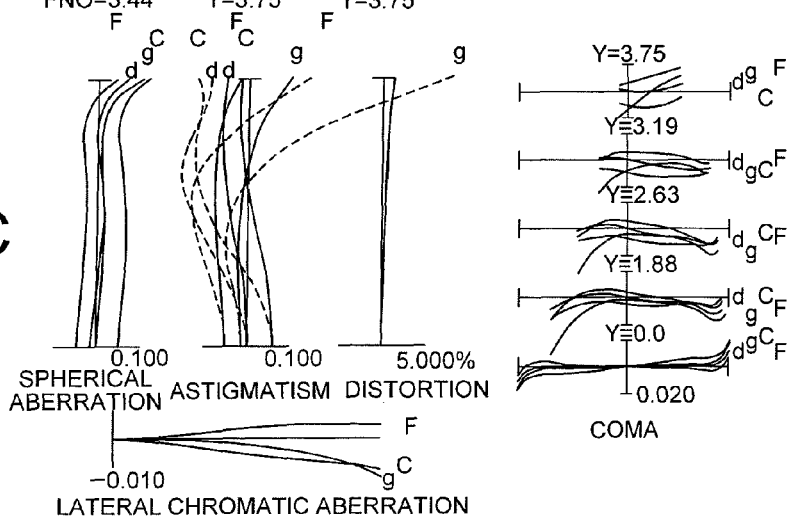
Figure 18A:
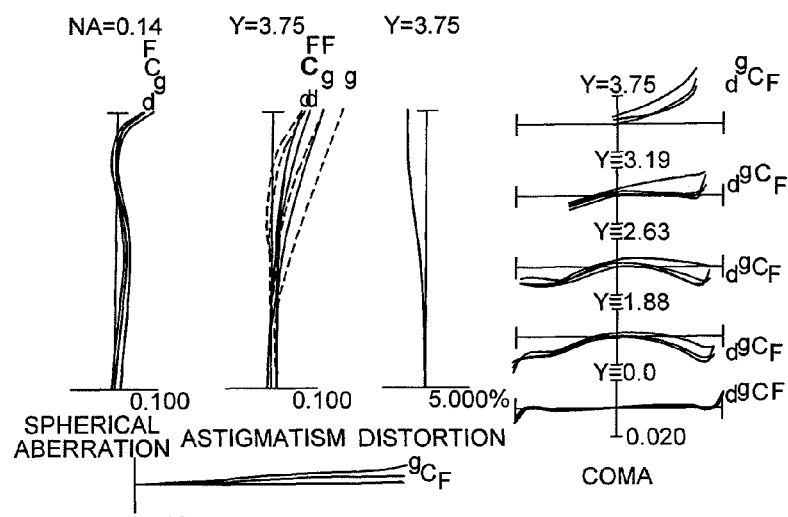
Figure 18B:
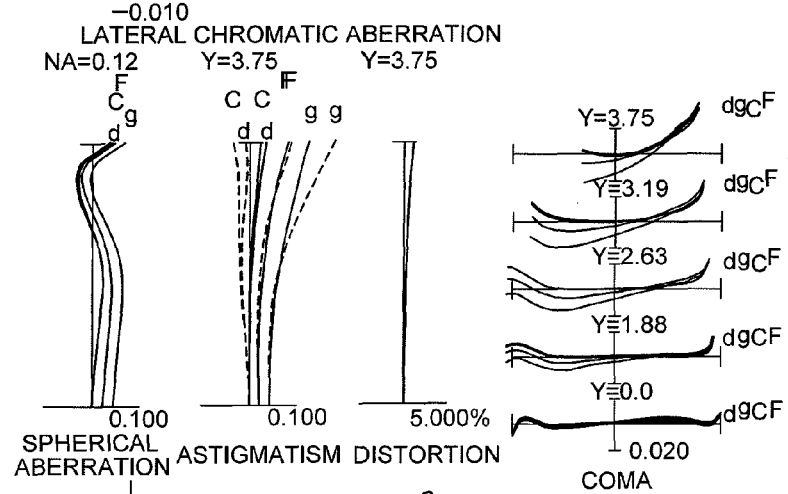
Figure 18C:
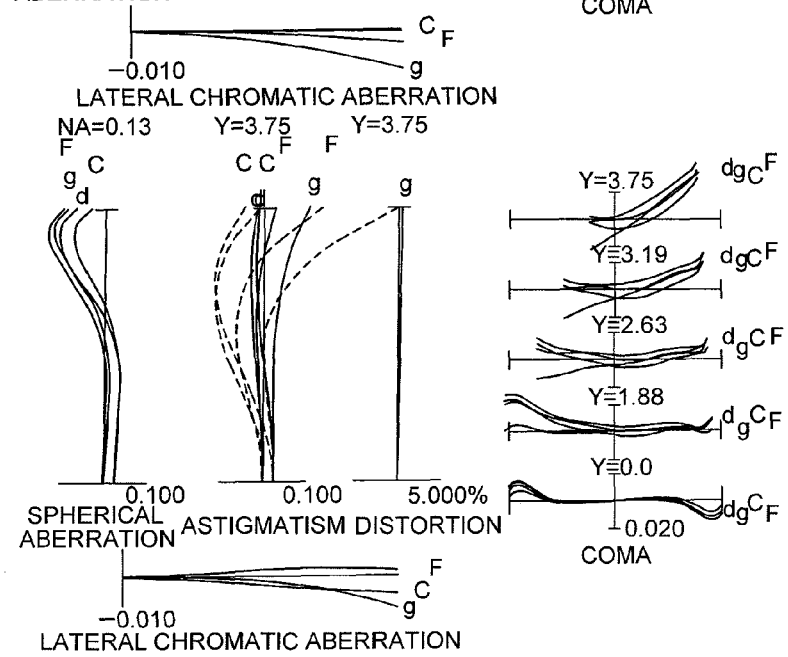

FIGS. 17A, 17B, 17C are graphs showing various aberrations upon focusing on infinity of the zoom lens according to Example 6, in which FIG. 17A shows in the wide-angle end state, FIG. 17B shows in the intermediate focal length state, and FIG. 17C shows in the telephoto end state. FIGS. 18A, 18B, 18C are graphs showing various aberrations upon focusing on the closest shooting range of the zoom lens according to Example 6, in which FIG. 18A shows the shooting range Rw=205 mm, FIG. 18B shows the shooting range Rm=748 mm, and FIG. 18C shows the shooting range Rt=538 mm.

As is apparent from the respective graphs, the zoom lens according to Example 6 shows superb optical performance as a result of good corrections to various aberrations from the wide-angle end state through the telephoto end state.

Example 7

Figure 19:
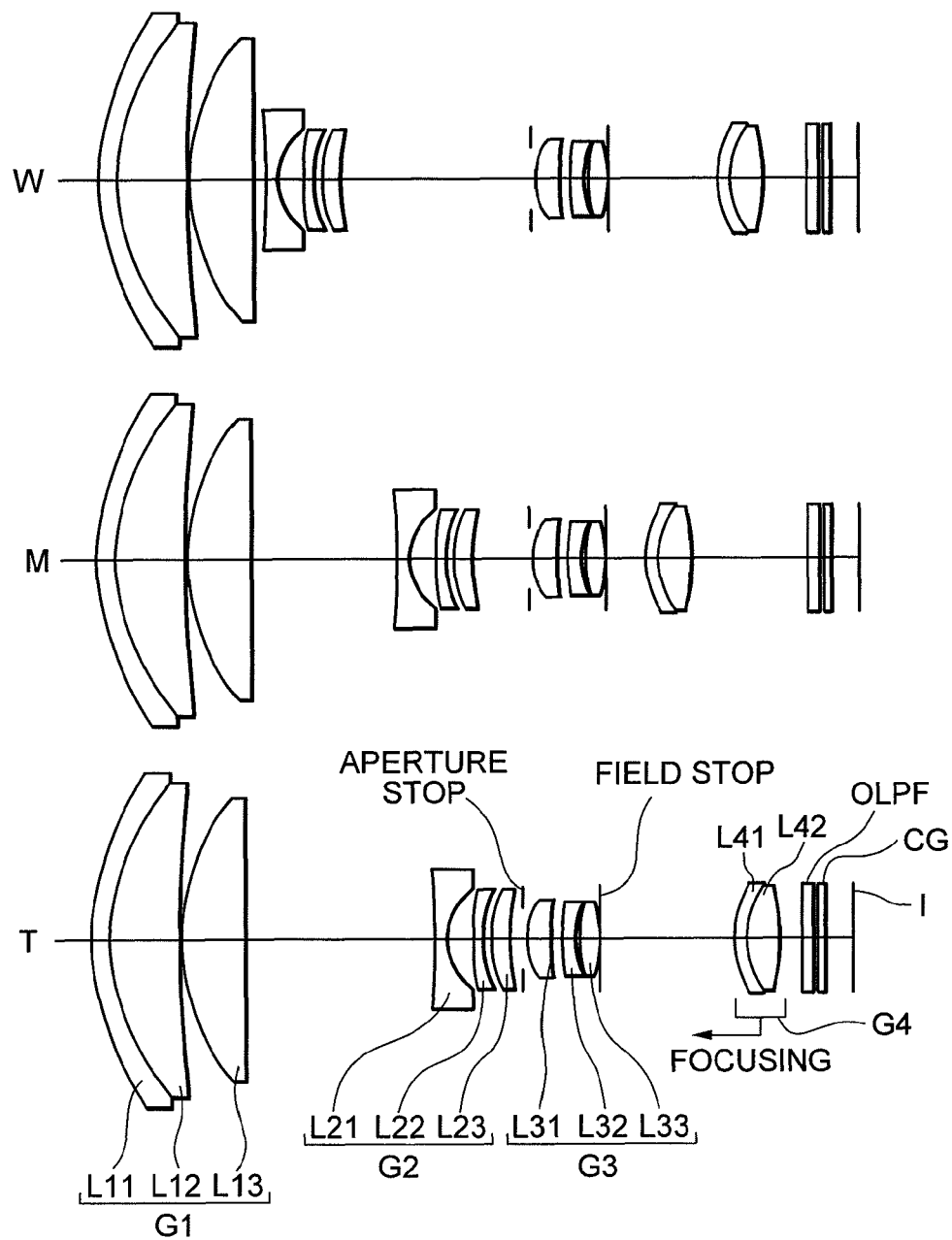
FIG. 19 is a diagram showing a lens configuration of a zoom lens according Example 7 and 15 in which W denotes a wide-angle end state, M denotes an intermediate focal length state, and T denotes a telephoto end state.

FIG. 19 is a diagram showing a lens configuration of a zoom lens according Example 7. Various values associated with the zoom lens according to Example 7 are listed in Table 7.

TABLE 7

[Specifications]

| | W | M | T |
|---|---|---|---|
| f = | 6.55 | 30.00 | 60.10 |
| FNO = | 3.5 | 3.8 | 3.5 |

[Lens Data]

| | r | d | νd | Nd |
|---|---:|---:|---:|---:|
| 1) | 23.8479 | 1.4000 | 25.46 | 2.000690 |
| 2) | 18.7624 | 5.9000 | 95.25 | 1.433852 |
| 3) | 167.9070 | 0.1000 | | |
| 4) | 16.8888 | 5.3000 | 90.91 | 1.454570 |
| 5) | −5137.1460 | (d5 = var.) | | |
| 6) | −46.5253 | 1.0000 | 40.10 | 1.851350 |
| 7) | 4.2808 | 2.2000 | | |
| 8) | 21.5453 | 1.0000 | 46.58 | 1.804000 |
| 9) | 10.8456 | 0.6000 | | |
| 10) | 9.0254 | 1.5000 | 17.98 | 1.945950 |
| 11) | 20.1834 | (d11 = var.) | | |
| 12) | 0.0000 | 0.3000 | Aperture Stop | |
| 13) | 5.4471 | 2.1000 | 63.97 | 1.514280 |
| 14) | 20.0657 | 0.9000 | | |
| 15) | 21.6048 | 1.0000 | 42.72 | 1.834810 |
| 16) | 6.2337 | 0.4000 | | |
| 17) | 10.2439 | 1.8000 | 91.20 | 1.456000 |
| 18) | −9.5325 | 0.0000 | | |
| 19) | 0.0000 | (d19 = var.) | Field Stop | |
| 20) | 9.4629 | 1.0000 | 25.46 | 2.000690 |
| 21) | 6.5553 | 2.6000 | 95.25 | 1.433852 |
| 22) | −46.2338 | (d22 = var.) | | |
| 23) | 0.0000 | 0.9000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Coefficient]

| surface | K | C 4 | C 6 | C 8 |
|---|---:|---:|---:|---:|
| 4: | 0.5000 | 3.36290E−06 | 0.00000E+00 | 0.00000E+00 |
| 7: | −0.4928 | 1.29050E−03 | −1.76320E−05 | 0.00000E+00 |
| 13: | 0.6368 | −2.96970E−04 | 0.00000E+00 | 0.00000E+00 |
| 22: | −99.0000 | −3.01210E−04 | 0.00000E+00 | 0.00000E+00 |

[Variable Distance upon Focusing]

| | W | M | T |
|---|---:|---:|---:|
| | | Infinity | |
| f | 6.55000 | 30.00000 | 60.10000 |
| D0 | ∞ | ∞ | ∞ |
| d5 | 1.02020 | 12.17258 | 15.26467 |
| d11 | 15.43955 | 4.28717 | 1.19508 |
| d19 | 8.90776 | 3.12446 | 10.80427 |
| d22 | 3.92934 | 9.71264 | 2.03283 |
| Bf | 2.37189 | 2.37189 | 2.37189 |
| TL | 62.66873 | 62.66873 | 62.66873 |
| | | Closest Distance | |
| β | −0.04000 | −0.04000 | −0.10000 |
| D0 | 141.5092 | 674.0564 | 452.9397 |
| d5 | 1.02020 | 12.17258 | 15.26467 |
| d11 | 15.43955 | 4.28717 | 1.19508 |
| d19 | 8.45693 | 1.63190 | 2.08621 |
| d22 | 4.38017 | 11.20520 | 10.75089 |
| Bf | 2.37189 | 2.37189 | 2.37189 |
| TL | 62.66873 | 62.66873 | 62.66873 |

[Values for Conditional Expressions]

| | |
|---|---:|
| (1) D30 × N3133/Fw = | 1.428 |
| (2) F3/Fw = | 2.185 |
| (3) D30 × Ne/Fe = | 0.292 |
| (4) F3/F32 = | −1.323 |
| (5) N3133 = | 1.485 |
| (6) ν3133 = | 77.59 |
| (7) Ne = | 1.43 |
| (8) νe = | 95.25 |

Figure 20A:
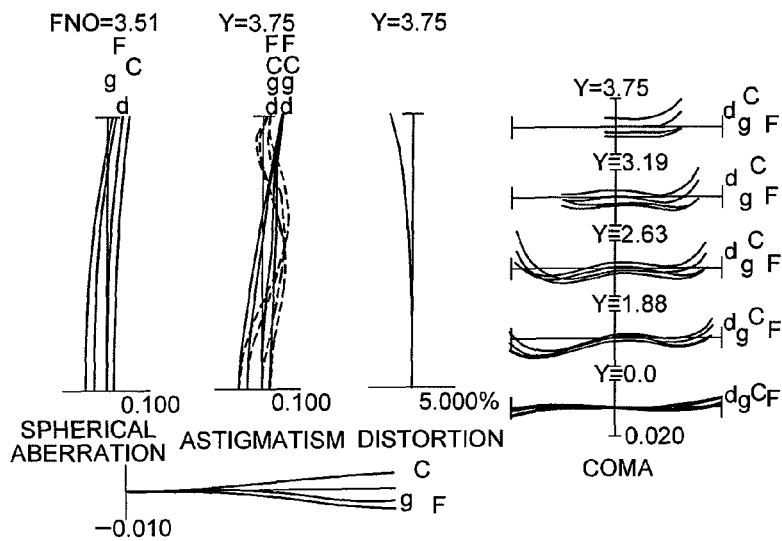
Figure 20B:
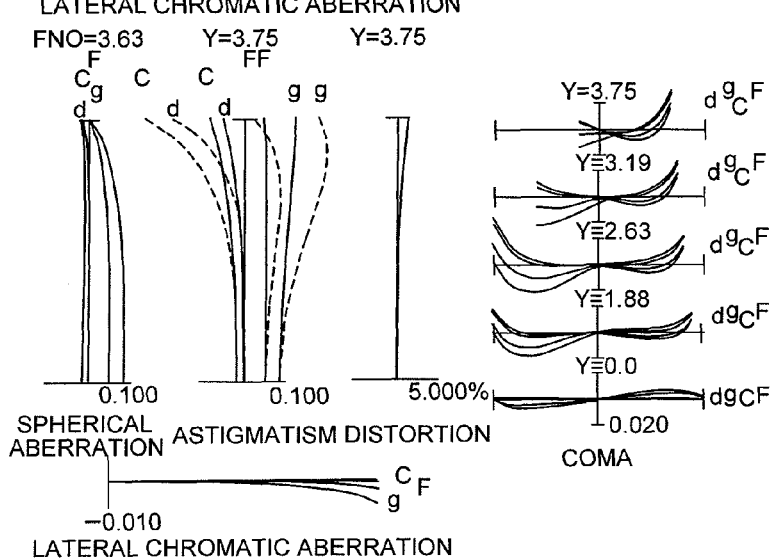
Figure 20C:
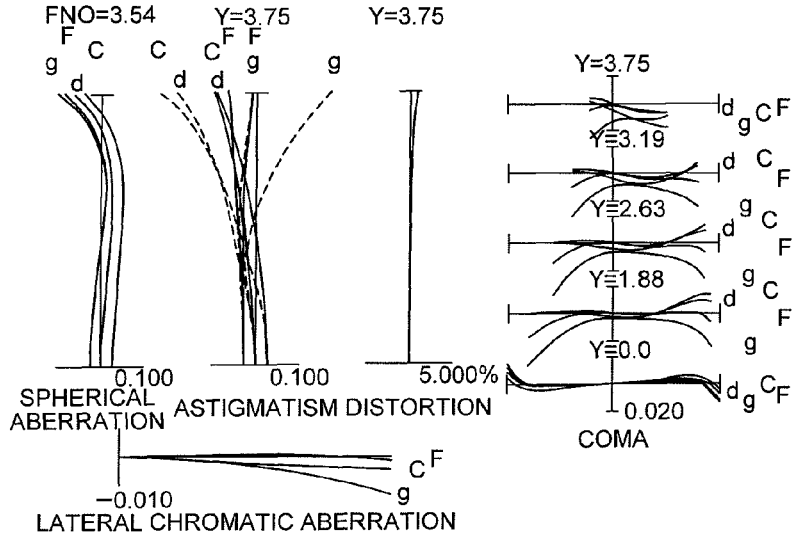
Figure 21A:
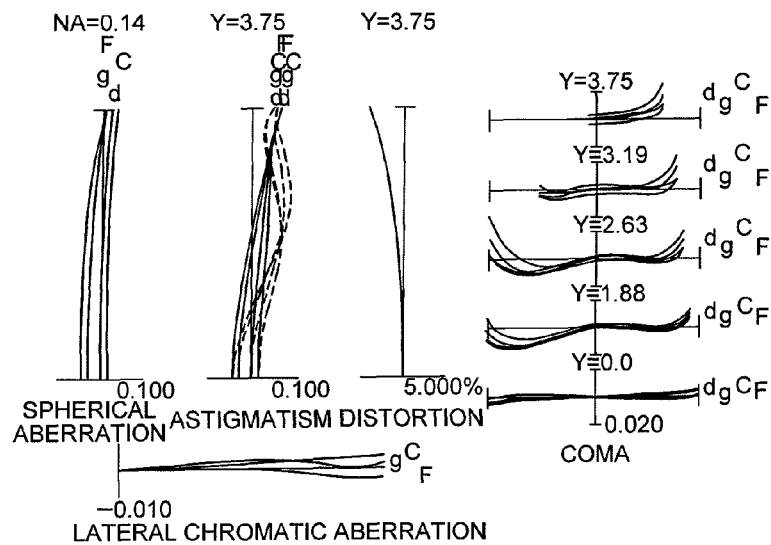
Figure 21B:
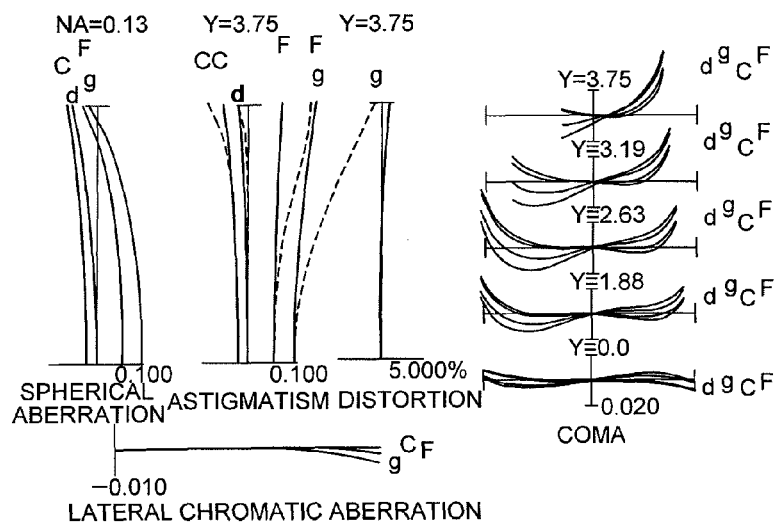
Figure 21C:
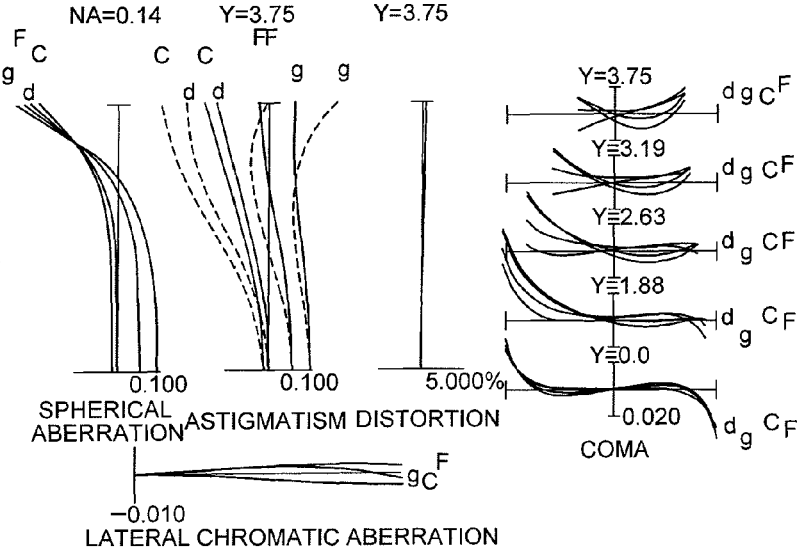

FIGS. 20A, 20B, 20C are graphs showing various aberrations upon focusing on infinity of the zoom lens according to Example 7, in which FIG. 20A shows in the wide-angle end state, FIG. 20B shows in the intermediate focal length state, and FIG. 20C shows in the telephoto end state. FIGS. 21A, 21B, 21C are graphs showing various aberrations upon focusing on the closest shooting range of the zoom lens according to Example 7, in which FIG. 21A shows the shooting range Rw=204 mm, FIG. 21B shows the shooting range Rm=737 mm, and FIG. 21C shows the shooting range Rt=516 mm.

As is apparent from the respective graphs, the zoom lens according to Example 7 shows superb optical performance as a result of good corrections to various aberrations from the wide-angle end state through the telephoto end state.

Example 8

FIG. 22 is a diagram showing a lens configuration of a zoom lens according Example 8.

The zoom lens according to Example 8 is composed of, in order from an object, a first lens group G1 having positive refractive power, a second lens group G2 having negative refractive power, an aperture stop, a third lens group G3 having positive refractive power, a field stop, a fourth lens group G4 having positive refractive power, a fifth lens group G5 having positive refractive power, an optical low-pass filter OLPF, and a cover glass CG for a solid-state imaging device disposed on an image plane I.

The first lens group G1 is composed of, in order from the object side, a cemented lens constructed by a negative meniscus lens L11 having a convex surface facing the object side cemented with a positive meniscus lens L12 having a convex surface facing the object side, and a positive lens L13 having a radius of curvature of the object side surface being 1/6 or less of the absolute value of a radius of curvature of the image side surface.

The second lens group G2 is composed of, in order from the object side, a negative lens L21 having a concave surface facing the image side, a negative lens L22 having a concave surface facing the image side, and a positive meniscus lens L23 having a convex surface facing the object side.

The third lens group G3 is composed of, in order from the object side, a positive lens L31 having a convex surface facing the object side, a negative lens L32 having a concave surface facing the image side, and a positive lens L33 having a convex surface facing the image side.

The fourth lens group G4 is composed of a positive lens L41 having a convex surface facing the object side.

The fifth lens group G5 is composed of a cemented lens constructed by, in order from the object, a negative meniscus lens L51 having a convex surface facing the object side cemented with a double convex positive lens L52.

An aspherical surface is formed on each of the object side surface of the positive meniscus lens L13, the image side surface of the negative lens L21 having a concave surface facing the image side, the object side surface of the positive lens L31 having a convex surface facing the object side, the object side surface of the positive lens L41 having a convex surface facing the object side, and the image side surface of the double convex positive lens L52.

Upon zooming from a wide-angle end state W to a telephoto end state T, the first lens group G1 is fixed, the second lens group G2 is moved to the image plane I side, the third lens group G3 is fixed, the fourth lens group G4 is moved to the object side, and the fifth lens group G5 is moved along the optical axis with a trajectory having convex shape facing the object side.

Upon focusing on an object to be shot locating at a finite distance, the fifth lens group G5 is moved along the optical axis. In the solid-state imaging device according to Example 8, a diagonal length IH that is a distance between the center and a corner is 3.75 mm.

Various values associated with the zoom lens according to Example 8 are listed in Table 8.

TABLE 8

[Specifications]

|  | W | M | T |
|---|---|---|---|
| f = | 6.55 | 30.00 | 61.00 |
| FNO = | 3.9 | 4.0 | 4.0 |

[Lens Data]

| | r | d | vd | Nd |
|---|---|---|---|---|
| 1) | 25.9550 | 1.4000 | 20.88 | 1.922860 |
| 2) | 20.8100 | 5.9000 | 90.22 | 1.456500 |
| 3) | 222.0859 | 0.1000 | | |
| 4) | 17.1799 | 5.3000 | 90.91 | 1.454570 |
| 5) | 331.1581 | (d5 = var.) | | |
| 6) | −55.2024 | 1.0000 | 40.10 | 1.851350 |
| 7) | 4.0941 | 2.5000 | | |
| 8) | −52.5834 | 1.0000 | 40.77 | 1.883000 |
| 9) | 36.3122 | 0.1000 | | |
| 10) | 10.8248 | 1.5000 | 17.98 | 1.945950 |
| 11) | 42.0827 | (d11 = var.) | | |
| 12) | 0.0000 | 0.3000 | Aperture Stop | |
| 13) | 5.3590 | 2.1000 | 63.97 | 1.514280 |
| 14) | −18.4083 | 0.9000 | | |
| 15) | −105.1597 | 1.0000 | 42.72 | 1.834810 |
| 16) | 6.1759 | 0.5000 | | |

TABLE 8-continued

| 17) | 14.0411 | 1.8000 | 91.20 | 1.456000 |
|---|---|---|---|---|
| 18) | −12.8987 | 0.0000 | | |
| 19) | 0.0000 | (d19 = var.) | Field Stop | |
| 20) | 7.6567 | 1.0000 | 82.56 | 1.497820 |
| 21) | 7.8294 | (d21 = var.) | | |
| 22) | 9.4449 | 1.0000 | 25.46 | 2.000690 |
| 23) | 6.5133 | 2.6000 | 91.30 | 1.455590 |
| 24) | −46.4002 | (d24 = var.) | | |
| 25) | 0.0000 | 0.9000 | 70.51 | 1.544370 |
| 26) | 0.0000 | 0.5000 | | |
| 27) | 0.0000 | 0.5000 | 64.12 | 1.516800 |
| 28) | 0.0000 | Bf | | |

[Aspherical Coefficient]

| surface | K | C 4 | C 6 | C 8 |
|---|---|---|---|---|
| 4: | 0.5000 | 3.64110E−06 | 0.00000E+00 | 0.00000E+00 |
| 7: | −0.8224 | 2.14650E−03 | −2.55770E−05 | 0.00000E+00 |
| 13: | 0.3073 | −1.33760E−04 | 0.00000E+00 | 0.00000E+00 |
| 20: | 0.4401 | 0.00000E+00 | 0.00000E+00 | 0.00000E+00 |
| 24: | −99.0000 | −3.15800E−04 | 0.00000E+00 | 0.00000E+00 |

[Variable Distance upon Focusing]

| | W | M | T |
|---|---|---|---|
| | | Infinity | |
| f | 6.55000 | 30.00000 | 60.10000 |
| D0 | ∞ | ∞ | ∞ |
| d5 | 0.74690 | 12.21974 | 15.17127 |
| d11 | 17.63827 | 6.16543 | 3.21390 |
| d19 | 1.99764 | 0.85035 | 0.55520 |
| d21 | 7.68233 | 2.90191 | 10.59213 |
| d24 | 2.87011 | 8.79782 | 1.40275 |
| Bf | 2.04158 | 2.04158 | 2.04158 |
| TL | 64.87683 | 64.87683 | 64.87683 |
| | | Closest Distance | |
| β | −0.04000 | −0.04000 | −0.10000 |
| D0 | 140.7636 | 667.4376 | 435.3158 |
| d5 | 0.65678 | 12.21974 | 15.17127 |
| d11 | 17.72839 | 6.16543 | 3.21390 |
| d19 | 2.00665 | 0.85035 | 0.55520 |
| d21 | 7.26838 | 1.41864 | 1.84668 |
| d24 | 3.27505 | 10.28109 | 10.14820 |
| Bf | 2.04158 | 2.04158 | 2.04158 |
| TL | 64.87683 | 64.87683 | 64.87683 |

[Values for Conditional Expressions]

| (1) D30 × N3133/Fw = | 1.428 |
|---|---|
| (2) F3/Fw = | 2.359 |
| (3) D30 × Ne/Fe = | 0.326 |
| (4) F3/F32 = | −2.220 |
| (5) N3133 = | 1.485 |
| (6) ν3133 = | 77.59 |
| (7) Ne = | 1.46 |
| (8) νe = | 91.20 |

Figure 23A:
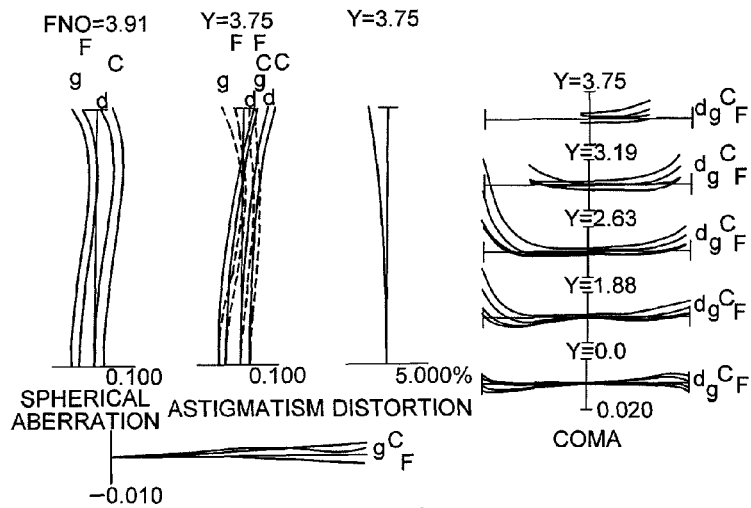
Figure 23B:
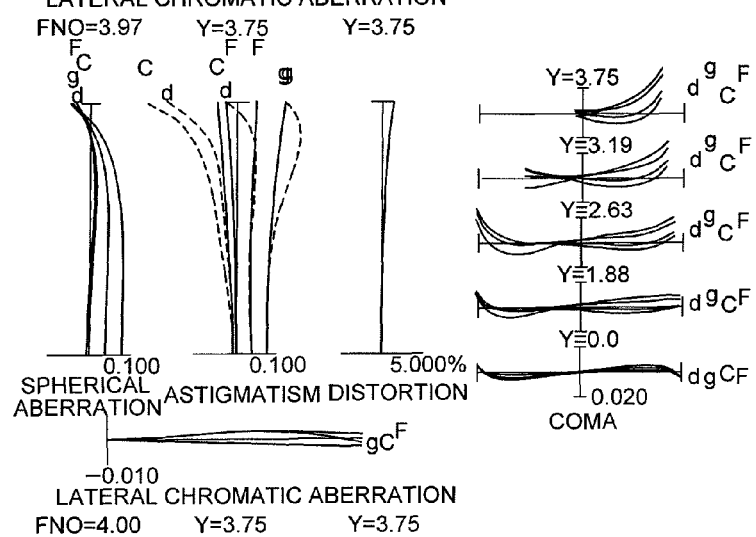
Figure 23C:
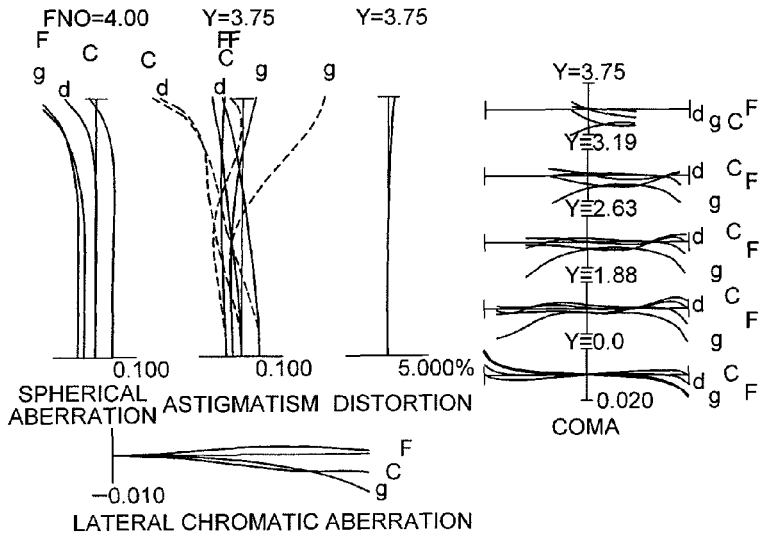
Figure 24A:
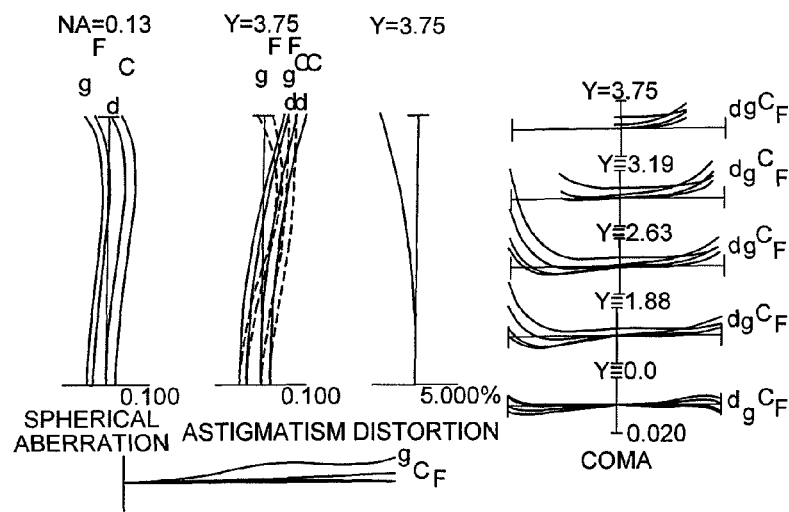
Figure 24B:
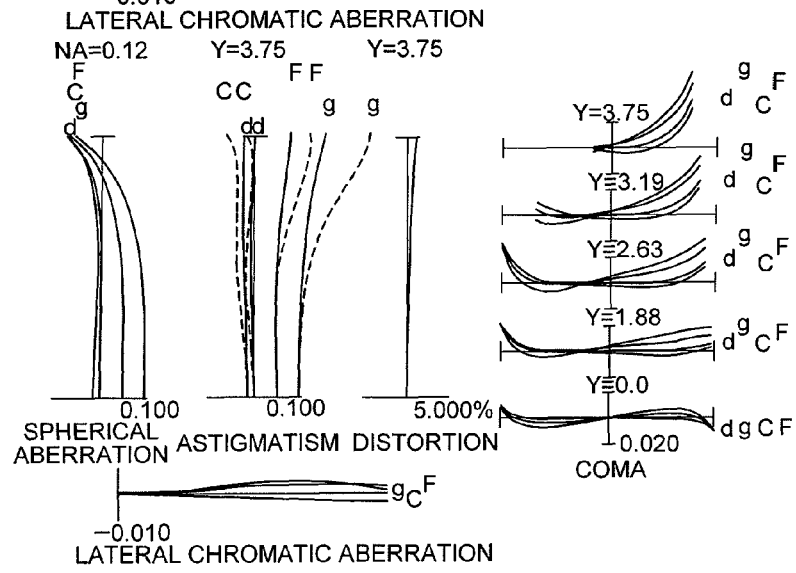
Figure 24C:
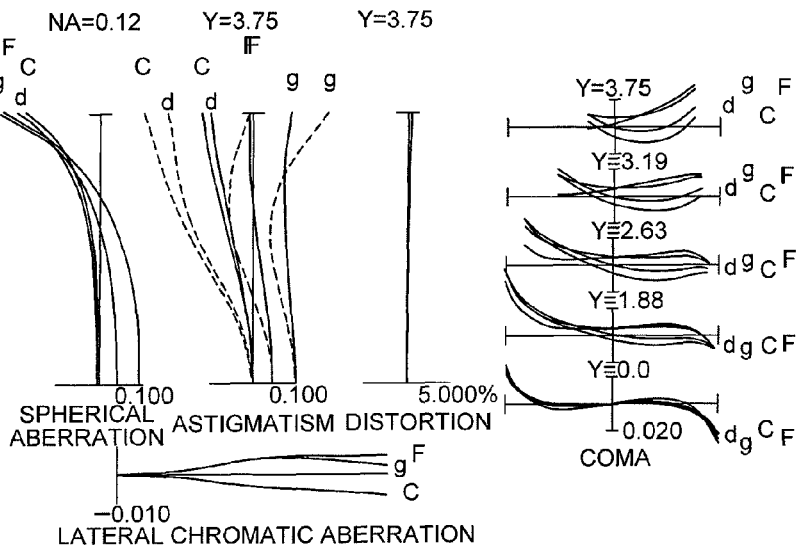

FIGS. 23A, 23B, 23C are graphs showing various aberrations upon focusing on infinity of the zoom lens according to Example 8, in which FIG. 23A shows in the wide-angle end state, FIG. 23B shows in the intermediate focal length state, and FIG. 23C shows in the telephoto end state. FIGS. 24A, 24B, 24C are graphs showing various aberrations upon focusing on the closest shooting range of the zoom lens according to Example 8, in which FIG. 24A shows the shooting range Rw=206 mm, FIG. 24B shows the shooting range Rm=732 mm, and FIG. 24C shows the shooting range Rt=500 mm.

As is apparent from the respective graphs, the zoom lens according to Example 8 shows superb optical performance as a result of good corrections to various aberrations from the wide-angle end state through the telephoto end state.

Second Embodiment

A zoom lens according to a second embodiment of the present invention is explained.

A zoom lens according to the second embodiment includes a plurality of lens groups including, in order from an object, a first lens group having positive refractive power, a second lens group having negative refractive power, a third lens group, and a fourth lens group.

When the lens configuration is explained from an optical viewpoint, the first lens group is a converging lens group, the second lens group is a zooming lens group, the third lens group is an imaging lens group, and the most image side lens group is a field lens group.

Since the height of incident light and the angle of incident light vary largely upon zooming, the first lens group and the second lens group largely contribute to variations in spherical aberration and curvature of field upon zooming.

An aperture stop is preferably disposed in the third lens group or in the vicinity of the third lens group. In the third lens group, since variations in the angle of incident light and the height of incident light are small, so that the third lens group has small contribution to variations in various aberrations. However, since the third lens group further converges bundle of rays converged by the first lens group, the third lens group has to have strong refractive power to become lens configuration with small radii of curvature. Accordingly, high order spherical aberration tends to be excessively generated.

The diameter of the bundle of rays incident on the most image side lens group with respect to each image height is small, so that the lens group largely contributes to variation in rather curvature of field than spherical aberration. Moreover, the lens group has a function that keeps the exit pupil away from the image plane to the object side in order to make the imaging optical system match the solid-state imaging device, which is typical of shading.

Vibration reduction is carried out by moving at least a portion of the third lens group in a direction perpendicular to an optical axis. In the third lens group, since variations in the height of incident ray and the angle of incident ray upon zooming are small, aberration correction upon vibration reduction can be effectively carried out. Moreover, when the third lens group, which is fixed upon zooming and focusing, is used as a vibration reduction lens group, the third lens group can be attached to a vibration reduction drive mechanism independent from a focusing drive mechanism. Since both of the drive mechanisms can be disposed independently, the outer diameter of the optical system can be small.

In order to obtain excellent optical performance with keeping compactness, the following conditional expression (9) is satisfied:

$$0.098 < \{Fw \times (N32 - N3133)\}/F3 < 0.200 \quad (9)$$

where Fw denotes a focal length of the zoom lens in the wide-angle end state, F3 denotes a focal length of the third lens group, N3133 denotes an average refractive index of the first positive lens of the third lens group and the second positive lens of the third lens group, and N32 denotes a refractive index of the negative lens of the third lens group.

When the value of conditional expression (9) is equal to or falls below the lower limit thereof, refractive indices of the positive lens and the negative lens become too small, so that spherical aberration is excessively generated, therefore it is undesirable. On the other hand, when the value of conditional expression (9) is equal to or exceeds the upper limit thereof, an Abbe number of the negative lens has to be small, and lateral chromatic aberration is excessively generated, so that it is undesirable.

In order to secure the effect of the present embodiment, it is preferable to set the lower limit of conditional expression (9) to 1.105. In order to secure the effect of the present embodiment, it is preferable to set the upper limit of conditional expression (9) to 0.190.

In a zoom lens according to the second embodiment, each lens of the first positive lens of the third lens group, the negative lens of the third lens group, and the second positive lens of the third lens group is preferably disposed between air spaces.

With this lens configuration, it becomes possible to further excellently correct various aberrations and to accomplish a compact zoom lens having high optical performance.

In a zoom lens according to the second embodiment, it is preferable that the third lens group is composed of, in order from the object side, the first positive lens of the third lens group, the negative lens of the third lens group, and the second positive lens of the third lens group, the first positive lens of the third lens group has a convex surface facing the object side, the negative lens of the third lens group has an absolute value of a radius of curvature of the image side surface smaller than that of the object side surface, the second positive lens of the third lens group has an absolute value of a radius of curvature of the image side surface smaller than that of the object side surface.

With this lens configuration, it becomes possible to excellently correct various aberrations, so that a compact zoom lens having high optical performance is accomplished.

In a zoom lens according to the second embodiment, upon zooming from the wide-angle end state to the telephoto end state upon focusing on infinity, it is preferable that a distance between the first lens group and the second lens group increases, a distance between the second lens group and the third lens group decreases, and the most image side lens group among the plurality of lens groups moves along an optical axis with a trajectory having a convex shape facing the object side.

When the first lens group is fixed upon zooming, deterioration in flatness of the image plane caused by decentering is hardly generated, so that it is preferable.

In a zoom lens according to the second embodiment, in order to obtain excellent optical performance, the following conditional expression (10) is preferably satisfied:

$$-2.000 < F3/F32 < -1.030 \quad (10)$$

where F32 denotes a focal length of the negative lens of the third lens group.

When the value of conditional expression (10) is equal to or falls below the lower limit thereof, spherical aberration is excessively generated, so that it is undesirable. When the value of conditional expression (10) is equal to or exceeds the upper limit thereof, coma becomes large, so that it is undesirable.

In order to secure the effect of the present embodiment, it is preferable to set the lower limit of conditional expression (10) to −1.80. In order to secure the effect of the present embodiment, it is preferable to set the upper limit of conditional expression (10) to −1.04.

In a zoom lens according to the second embodiment, upon zooming from the wide-angle end state to the telephoto end state, the third lens group is preferably fixed. In this manner, when the third lens group is fixed upon zooming, even if the third lens group is made to be a vibration reduction lens group, since zooming mechanism for the third lens group is not required, vibration reduction mechanism can be independent from the zooming mechanism. Moreover, an outer diameter of the optical system can be smaller.

In order to obtain excellent optical performance with keeping compact the third lens group, which is a vibration reduction lens group, a zoom lens according to the second embodiment has an aspherical surface on the object side surface of the first positive lens of the third lens group, and the following conditional expression (11) is preferably satisfied:

$$0.340 < \{Fw \times (N32-N3133)\}/D30 < 0.500 \quad (11)$$

where D30 denotes a thickness of the third lens group.

With disposing an aspherical surface on the object side surface of the first positive lens of the third lens group, it becomes possible to excellently correct spherical aberration.

When the value of conditional expression (11) is equal to or falls below the lower limit thereof, the lens length of the third lens group becomes large. In this state, when the focal length of the fourth lens group is made to be short, the back focal length becomes short so as to be able to shorten the total lens length. However, variation in image plane upon zooming becomes large, so that it is undesirable. When the value of conditional expression (11) is equal to or exceeds the upper limit thereof, coma in the wide-angle end state is excessively generated, so that it is undesirable.

In order to secure the effect of the present embodiment, it is preferable to set the lower limit of conditional expression (11) to 0.350. In order to secure the effect of the present embodiment, it is preferable to set the upper limit of conditional expression (11) to 0.460.

In order to accomplish high optical performance with excellently correcting aberrations and realizing compactness, in a zoom lens according to the second embodiment, the most image side lens group among the plurality of lens groups preferably includes, in order from the object side, a negative meniscus lens having a convex surface facing the object side, and a double convex positive lens.

In order to obtain excellent chromatic aberration state with accomplishing compactness, a zoom lens according to the second embodiment preferably satisfies the following conditional expression (12):

$$0.10 < Fw/\{Fex(Nen-Nep)\} < 0.85 \quad (12)$$

where Fe denotes a focal length of the most image side lens group among the plurality of lens groups, Nen denotes a refractive index of the negative meniscus lens, and Nep denotes a refractive index of the double convex positive lens.

When the value of conditional expression (12) is equal to or falls below the lower limit thereof, variation in lateral chromatic aberration upon zooming is excessively generated, so that it is undesirable. When the value of conditional expression (12) is equal to or exceeds the upper limit thereof, curvature of field upon zooming becomes large, so that it is undesirable.

In order to secure the effect of the present embodiment, it is preferable to set the lower limit of conditional expression (12) to 0.20. In order to secure the effect of the present embodiment, it is preferable to set the upper limit of conditional expression (12) to 0.700.

In order to excellently correct aberrations with accomplishing compactness, in a zoom lens according to the second embodiment, the double convex positive lens of the most image side lens group has an aspherical surface facing to the image side, and focusing on an object locating at a finite distance is preferably carried out by moving the most image side lens group among the plurality of lens groups along the optical axis to the object side.

With using the most image side lens group as a focusing lens group, it becomes possible to accomplish compactness and excellently correct aberrations to realize a zoom lens having high optical performance.

In order to excellently correct chromatic aberration, in a zoom lens according to the second embodiment, the following conditional expression (13) is preferably satisfied:

$$0.0005 < Fw/\{Fex(vep-ven)\} < 0.0063 \quad (13)$$

where ven denotes an Abbe number of the negative meniscus lens of the most image side lens group, and vep denotes an Abbe number of the double convex positive lens of the most image side lens group.

When the value of conditional expression (13) is equal to or falls below the lower limit thereof, variation in lateral chromatic aberration upon zooming is excessively generated, so that it is undesirable. When the value of conditional expression (13) is equal to or exceeds the upper limit thereof, variation in image plane upon zooming becomes large, so that it is undesirable.

In order to secure the effect of the present embodiment, it is preferable to set the lower limit of conditional expression (13) to 0.0010. In order to secure the effect of the present embodiment, it is preferable to set the upper limit of conditional expression (13) to 0.006.

Examples

Each example of a zoom lens according to the second embodiment is explained below with reference to drawings.

Each of zoom lenses according to Example 9 through 15 of the second embodiment is composed of, in order from an object side, a first lens group G1 having positive refractive power, a second lens group G2 having negative refractive power, an aperture stop, a third lens group G3 having positive refractive power, a field stop, a fourth lens group G4 having positive refractive power, an optical low-pass filter OLPF, and a cover glass CG for a solid-state imaging device disposed on an image plane I.

The first lens group G1 is composed of, in order from the object side, a cemented lens constructed by a negative meniscus lens L11 having a convex surface facing the object side cemented with a positive meniscus lens L12 having a convex surface facing the object side, and a positive lens L13 having a radius of curvature of the object side surface being ⅙ or less of the absolute value of a radius of curvature of the image side surface.

The second lens group G2 is composed of, in order from the object side, a negative lens L21 having a concave surface facing the image side, a negative lens L22 having a concave surface facing the image side, and a positive meniscus lens L23 having a convex surface facing the object side.

The third lens group G3 is composed of, in order from the object side, a positive lens L31 having a convex surface facing the object side, a negative lens L32 having a concave surface facing the image side, and a positive lens L33 having a convex surface facing the image side.

The fourth lens group G4 is composed of a cemented lens constructed by, in order from the object side, a negative meniscus lens L41 having a convex surface facing the object side cemented with a double convex positive lens L42.

An aspherical surface is formed on each of the object side surface of the positive meniscus lens L13, the image side surface of the negative lens L21 having a concave surface facing the image side, the object side surface of the positive lens L31 having a convex surface facing the object side, and the image side surface of the double convex positive lens L42.

Upon zooming from a wide-angle end state W to a telephoto end state T, the first lens group G1 is fixed, the second lens group G2 is moved to the image plane I side, the third lens group G3 is fixed, and the fourth lens group G4 is moved along an optical axis with a trajectory having convex shape facing the object side.

Upon focusing on an object to be shot locating at a finite distance, the fourth lens group G4 is moved along the optical axis. In the solid-state imaging device according to the second embodiment, a diagonal length IH that is a distance between the center and a corner is 3.75 mm.

Example 9

FIG. 1 is a diagram showing a lens configuration of a zoom lens according Example 9, in which W denotes a wide-angle end state, M denotes an intermediate focal length state, and T denotes a telephoto end state.

In the zoom lens according to Example 9, the third lens group G3 carries out vibration reduction by moving in a direction perpendicular to the optical axis.

Various values associated with the zoom lens according to Example 9 are listed in Table 9.

TABLE 9

[Specifications]

|   | W | M | T |
|---|---|---|---|
| f = | 6.50 | 30.00 | 61.00 |
| FNO = | 3.8 | 4.1 | 3.7 |

[Lens Data]

|  | r | d | vd | Nd |
|---|---|---|---|---|
| 1) | 25.9603 | 1.4000 | 17.98 | 1.945950 |
| 2) | 21.0289 | 6.1000 | 82.56 | 1.497820 |
| 3) | 327.6951 | 0.1000 | | |
| 4) | 17.2279 | 4.7000 | 82.56 | 1.497820 |
| 5) | 129.9432 | (d5 = var.) | | |
| 6) | −2681.7744 | 1.0000 | 40.19 | 1.850490 |
| 7) | 4.9916 | 2.2000 | | |
| 8) | −38.8019 | 1.0000 | 40.77 | 1.883000 |
| 9) | 11.1696 | 0.9000 | | |
| 10) | 11.6255 | 1.6000 | 17.98 | 1.945950 |
| 11) | 92.2561 | (d11 = var.) | | |
| 12) | 0.0000 | 0.5000 | Aperture Stop | |
| 13) | 5.3318 | 2.1000 | 64.06 | 1.516330 |
| 14) | 41.8200 | 0.1000 | | |
| 15) | 12.6924 | 1.0000 | 42.72 | 1.834810 |
| 16) | 5.7137 | 0.8000 | | |
| 17) | −114.0651 | 2.0000 | 91.20 | 1.456000 |
| 18) | −12.1743 | 0.0000 | | |
| 19) | 0.0000 | (d19 = var.) | Field Stop | |
| 20) | 9.2880 | 1.0000 | 25.46 | 2.000690 |
| 21) | 6.4169 | 3.5000 | 91.20 | 1.456000 |
| 22) | −19.3341 | (d22 = var.) | | |
| 23) | 0.0000 | 1.6000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Coefficient]

| surface | K | C 4 | C 6 | C 8 |
|---|---|---|---|---|
| 4: | 0.4808 | 5.42353E−06 | 3.74245E−09 | 0.00000E+00 |
| 7: | 0.2537 | 3.70121E−04 | 8.82513E−06 | 6.13778E−10 |

TABLE 9-continued

| 13: | 0.1321 | 1.00826E−04 | 1.60307E−05 | −9.89080E−07 |
| 22: | 1.0000 | −8.66901E−05 | 0.00000E+00 | 0.00000E+00 |

[Variable Distance upon Focusing]

|  | W | M | T |
|---|---|---|---|
| | | Infinity | |
| f | 6.50000 | 30.00000 | 61.00000 |
| D0 | ∞ | ∞ | ∞ |
| d5 | 0.90000 | 10.93565 | 13.96348 |
| d11 | 15.40831 | 5.37266 | 2.34483 |
| d20 | 5.02154 | 1.42306 | 8.06457 |
| d22 | 6.51775 | 10.11623 | 3.47472 |
| Bf | 4.20934 | 4.20934 | 4.20934 |
| TL | 64.65693 | 64.65693 | 64.65693 |
| | | Closest Distance | |
| β | −0.04000 | −0.04000 | −0.10000 |
| D0 | 140.9181 | 683.8795 | 473.4833 |
| d5 | 0.90000 | 10.93565 | 13.96348 |
| d11 | 15.40831 | 5.37266 | 2.34483 |
| d20 | 4.74165 | 0.21801 | 1.66443 |
| d22 | 6.79764 | 11.32128 | 9.87486 |
| Bf | 4.20934 | 4.20934 | 4.20914 |
| TL | 64.65693 | 64.65693 | 64.65693 |

[Moving Amounts of VR Lens Group and Image Plane]

|  | W | M | T |
|---|---|---|---|
| | | Infinity | |
| f | 6.50000 | 30.00000 | 61.00000 |
| VR Lens | ±0.124 | ±0.248 | ±0.383 |
| Image Plane | ±0.118 | ±0.253 | ±0.361 |
| | | Closest Distance | |
| β | −0.04000 | −0.04000 | −0.10000 |
| VR Lens | ±0.123 | ±0.239 | ±0.355 |
| Image Plane | ±0.118 | ±0.253 | ±0.361 |

[Values for Conditional Expressions]

| (9) {Fw × (N32 − N3133)}/F3 = | 0.119 |
| (10) F3/F32 = | −1.427 |
| (11) {Fw × (N32 − N3133)}/D30 = | 0.378 |
| (12) Fw/{Fe × (Nen − Nep)} = | 0.575 |
| (13) Fw/{Fe × (vep − ven)} = | 0.0048 |

FIGS. 2A, 2B, 2C are graphs showing various aberrations and coma upon vibration reduction upon focusing on infinity of the zoom lens according to Example 9, in which FIG. 2A shows in the wide-angle end state, FIG. 2B shows in the intermediate focal length state, and FIG. 2C shows in the telephoto end state. FIGS. 3A, 3B, 3C are graphs showing various aberrations and coma upon vibration reduction upon focusing on the closest shooting range of the zoom lens according to Example 9, in which FIG. 3A shows the shooting range Rw=205 mm, FIG. 3B shows the shooting range Rm=749 mm, and FIG. 3C shows the shooting range Rt=538 mm.

As is apparent from the respective graphs, the zoom lens according to Example 9 shows superb optical performance as a result of good corrections to various aberrations from the wide-angle end state through the telephoto end state even upon carrying out vibration reduction.

Example 10

FIG. 4 is a diagram showing a lens configuration of a zoom lens according Example 10. Various values associated with the zoom lens according to Example 10 are listed in Table 10.

TABLE 10

[Specifications]

| | W | M | T |
|---|---|---|---|
| f = | 6.55 | 30.00 | 61.00 |
| FNO = | 3.6 | 3.8 | 3.7 |

[Lens Data]

| | r | d | vd | Nd |
|---|---|---|---|---|
| 1) | 25.7235 | 1.4000 | 20.88 | 1.922860 |
| 2) | 20.6571 | 5.9000 | 90.22 | 1.456500 |
| 3) | 212.5954 | 0.1000 | | |
| 4) | 17.1979 | 5.3000 | 90.91 | 1.454570 |
| 5) | 321.2332 | (d5 = var.) | | |
| 6) | −50.6548 | 1.0000 | 40.10 | 1.851350 |
| 7) | 4.2633 | 2.2000 | | |
| 8) | −92.4310 | 1.0000 | 40.77 | 1.883000 |
| 9) | 23.5051 | 0.6000 | | |
| 10) | 11.8678 | 1.5000 | 17.98 | 1.945950 |
| 11) | 55.8154 | (d11 = var.) | | |
| 12) | 0.0000 | 0.3000 | Aperture Stop | |
| 13) | 5.5193 | 2.1000 | 63.97 | 1.514280 |
| 14) | −37.8518 | 0.9000 | | |
| 15) | 49.7862 | 1.0000 | 42.72 | 1.834810 |
| 16) | 6.0285 | 0.5000 | | |
| 17) | 12.6257 | 1.8000 | 91.20 | 1.456000 |
| 18) | −11.7685 | 0.0000 | | |
| 19) | 0.0000 | (d19 = var.) | Field Stop | |
| 20) | 9.8698 | 1.0000 | 25.46 | 2.000690 |
| 21) | 6.7108 | 2.6000 | 91.30 | 1.455590 |
| 22) | −51.2524 | (d22 = var.) | | |
| 23) | 0.0000 | 0.9000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Coefficient]

| surface | K | C 4 | C 6 | C 8 |
|---|---|---|---|---|
| 4: | 0.5000 | 3.64840E−06 | 0.00000E+00 | 0.00000E+00 |
| 7: | −0.8591 | 1.93500E−03 | −2.58040E−05 | 0.00000E+00 |
| 13: | 0.5519 | −3.03330E−04 | 0.00000E+00 | 0.00000E+00 |
| 22: | −99.0000 | −2.56430E−04 | 0.00000E+00 | 0.00000E+00 |

[Variable Distance upon Focusing]

| | W | M | T |
|---|---|---|---|
| | | Infinity | |
| f | 6.55000 | 30.00000 | 60.10000 |
| D0 | ∞ | ∞ | ∞ |
| d5 | 1.02022 | 12.17260 | 15.26469 |
| d11 | 15.97509 | 4.82271 | 1.73062 |
| d19 | 8.08567 | 2.30237 | 9.98218 |
| d22 | 3.99302 | 9.77632 | 2.09651 |
| Bf | 2.37189 | 2.37189 | 2.37189 |
| TL | 62.54589 | 62.54589 | 62.54589 |
| | | Closest Distance | |
| β | −0.04000 | −0.04000 | −0.10000 |
| D0 | 141.5092 | 674.0564 | 452.9397 |
| d5 | 1.02022 | 12.17260 | 15.26469 |
| d11 | 15.97509 | 4.82271 | 1.73062 |
| d19 | 7.63484 | 0.80981 | 1.26412 |
| d22 | 4.44385 | 11.26888 | 10.81457 |
| Bf | 2.37189 | 2.37189 | 2.37189 |
| TL | 62.54589 | 62.54589 | 62.54589 |

[Values for Conditional Expressions]

| | |
|---|---|
| (9) {Fw × (N32 − N3133)}/F3 = | 0.160 |
| (10) F3/F32 = | −1.724 |
| (11) {Fw × (N32 − N3133)}/D30 = | 0.364 |
| (12) Fw/{Fe × (Nen − Nep)} = | 0.389 |
| (13) Fw/{Fe × (vep − ven)} = | 0.0032 |

FIGS. 5A, 5B, 5C are graphs showing various aberrations upon focusing on infinity of the zoom lens according to Example 10, in which FIG. 5A shows in the wide-angle end state, FIG. 5B shows in the intermediate focal length state, and FIG. 5C shows in the telephoto end state. FIGS. 6A, 6B, 6C are graphs showing various aberrations upon focusing on the closest shooting range of the zoom lens according to Example 10, in which FIG. 6A shows the shooting range Rw=204 mm, FIG. 6B shows the shooting range Rm=737 mm, and FIG. 6C shows the shooting range Rt=515 mm.

As is apparent from the respective graphs, the zoom lens according to Example 10 shows superb optical performance as a result of good corrections to various aberrations from the wide-angle end state through the telephoto end state.

Example 11

FIG. 7 is a diagram showing a lens configuration of a zoom lens according Example 11. Various values associated with the zoom lens according to Example 11 are listed in Table 11.

TABLE 11

[Specifications]

| | W | M | T |
|---|---|---|---|
| f = | 6.50 | 30.00 | 61.00 |
| FNO = | 3.7 | 4.0 | 3.8 |

[Lens Data]

| | r | d | vd | Nd |
|---|---|---|---|---|
| 1) | 25.9116 | 1.4000 | 17.98 | 1.945950 |
| 2) | 21.0025 | 6.1000 | 82.56 | 1.497820 |
| 3) | 347.3024 | 0.1000 | | |
| 4) | 17.1452 | 4.7000 | 82.56 | 1.497820 |
| 5) | 120.0854 | (d5 = var.) | | |
| 6) | 1316.3968 | 1.0000 | 40.19 | 1.850490 |
| 7) | 4.8440 | 2.2000 | | |
| 8) | −38.8019 | 1.0000 | 40.77 | 1.883000 |
| 9) | 11.8322 | 0.9000 | | |
| 10) | 11.4204 | 1.6000 | 17.98 | 1.945950 |
| 11) | 74.3334 | (d11 = var.) | | |
| 12) | 0.0000 | 0.5000 | Aperture Stop | |
| 13) | 5.0459 | 2.1000 | 64.06 | 1.516330 |
| 14) | −15.9483 | 0.1000 | | |
| 15) | 25.7688 | 1.0000 | 42.72 | 1.834810 |
| 16) | 5.4774 | 0.7000 | | |
| 17) | 61.0443 | 2.0000 | 91.20 | 1.456000 |
| 18) | −15.0266 | 0.0000 | | |
| 19) | 0.0000 | (d19 = var.) | Field Stop | |
| 20) | 10.2508 | 1.0000 | 25.46 | 2.000690 |
| 21) | 6.8801 | 3.0000 | 91.20 | 1.456000 |
| 22) | −26.6761 | (d22 = var.) | | |
| 23) | 0.0000 | 1.6000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Coefficient]

| surface | K | C 4 | C 6 | C 8 |
|---|---|---|---|---|
| 4: | 0.4287 | 6.72320E−06 | 8.65870E−09 | 0.00000E+00 |
| 7: | 0.6444 | 1.19890E−05 | 4.36360E−06 | −1.60260E−07 |

TABLE 11-continued

| 13: | 0.1247 | −2.33820E−04 | 9.48600E−06 | −9.89080E−07 |
| 22: | 1.0000 | −1.49710E−04 | 0.00000E−00 | 0.00000E+00 |

[Variable Distance upon Focusing]

| | W | M | T |
|---|---|---|---|
| | | Infinity | |
| f | 6.50000 | 30.00000 | 60.10000 |
| D0 | ∞ | ∞ | ∞ |
| d5 | 0.90000 | 11.04804 | 13.87679 |
| d11 | 15.23960 | 5.09156 | 2.26281 |
| d19 | 5.79062 | 1.55117 | 9.48020 |
| d22 | 6.49556 | 10.73501 | 2.30598 |
| Bf | 1.30180 | 1.30180 | 1.30180 |
| TL | 61.72758 | 61.72758 | 61.72758 |
| | | Closest Distance | |
| β | −0.04000 | −0.04000 | −0.10000 |
| D0 | 140.4928 | 676.3819 | 451.3168 |
| d5 | 0.90000 | 11.04804 | 13.87679 |
| d11 | 15.23960 | 5.09156 | 2.26281 |
| d19 | 5.42736 | 0.18034 | 1.32246 |
| d22 | 6.85882 | 12.10584 | 10.96372 |
| Bf | 1.30180 | 1.30180 | 1.30180 |
| TL | 61.72758 | 61.72758 | 61.72758 |

[Values for Conditional Expressions]

| (9) {Fw × (N32 − N3133)}/F3 = | 0.153 |
| (10) F3/F32 = | −1.741 |
| (11) {Fw × (N32 − N3133)}/D30 = | 0.384 |
| (12) Fw/{Fe × (Nen − Nep)} = | 0.451 |
| (13) Fw/{Fe × (vep − ven)} = | 0.0037 |

FIGS. 8A, 8B, 8C are graphs showing various aberrations upon focusing on infinity of the zoom lens according to Example 11, in which FIG. 8A shows in the wide-angle end state, FIG. 8B shows in the intermediate focal length state, and FIG. 8C shows in the telephoto end state. FIGS. 9A, 9B, 9C are graphs showing various aberrations upon focusing on the closest shooting range of the zoom lens according to Example 11, in which FIG. 9A shows the shooting range Rw=202 mm, FIG. 9B shows the shooting range Rm=738 mm, and FIG. 9C shows the shooting range Rt=513 mm.

As is apparent from the respective graphs, the zoom lens according to Example 11 shows superb optical performance as a result of good corrections to various aberrations from the wide-angle end state through the telephoto end state.

Example 12

FIG. 10 is a diagram showing a lens configuration of a zoom lens according Example 12. Various values associated with the zoom lens according to Example 12 are listed in Table 12.

TABLE 12

[Specifications]

| | W | M | T |
|---|---|---|---|
| f = | 6.55 | 30.00 | 61.00 |
| FNO = | 3.5 | 3.5 | 3.7 |

[Lens Data]

| | r | d | vd | Nd |
|---|---|---|---|---|
| 1) | 24.5909 | 1.4000 | 20.88 | 1.922860 |
| 2) | 19.4777 | 5.2000 | 82.56 | 1.497820 |

TABLE 12-continued

| 3) | 115.1591 | 0.1000 | | |
| 4) | 18.4332 | 5.0000 | 82.56 | 1.497820 |
| 5) | 195.1358 | (d5 = var.) | | |
| 6) | −80.2684 | 1.0000 | 40.10 | 1.851350 |
| 7) | 4.3262 | 2.2000 | | |
| 8) | 89.2950 | 1.0000 | 40.77 | 1.883000 |
| 9) | 15.1775 | 0.6000 | | |
| 10) | 10.0334 | 1.5000 | 17.98 | 1.945950 |
| 11) | 28.1713 | (d11 = var.) | | |
| 12) | 0.0000 | 0.3000 | Aperture Stop | |
| 13) | 5.6537 | 2.1000 | 63.97 | 1.514280 |
| 14) | −23.6916 | 0.9000 | | |
| 15) | −327.0168 | 1.0000 | 42.72 | 1.834810 |
| 16) | 6.2930 | 0.4000 | | |
| 17) | 10.6945 | 1.8000 | 91.20 | 1.456000 |
| 18) | −8.9087 | 0.0000 | | |
| 19) | 0.0000 | (d19 = var.) | Field Stop | |
| 20) | 13.0182 | 1.0000 | 25.46 | 2.000690 |
| 21) | 8.7558 | 2.6000 | 91.30 | 1.455590 |
| 22) | −37.1642 | (d22 = var.) | | |
| 23) | 0.0000 | 0.9000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Coefficient]

| surface | K | C4 | C6 | C8 |
|---|---|---|---|---|
| 4: | 0.5000 | 2.43110E−06 | 0.00000E+00 | 0.00000E+00 |
| 7: | −0.8038 | 1.87930E−03 | −1.33170E−05 | 0.00000E+00 |
| 13: | 0.5707 | −4.07580E−04 | 0.00000E+00 | 0.00000E+00 |
| 22: | −99.0000 | −3.32860E−04 | 0.00000E+00 | 0.00000E+00 |

[Variable Distance upon Focusing]

| | W | M | T |
|---|---|---|---|
| | | Infinity | |
| f | 6.55000 | 30.00000 | 60.10000 |
| D0 | ∞ | ∞ | ∞ |
| d5 | 1.02020 | 12.36308 | 15.22189 |
| d11 | 15.63505 | 4.29217 | 1.43336 |
| d19 | 10.13097 | 3.05373 | 12.83541 |
| d22 | 3.47935 | 10.55659 | 0.77491 |
| Bf | 0.15320 | 0.15320 | 0.15320 |
| TL | 60.41878 | 60.41878 | 60.41878 |
| | | Closest Distance | |
| β | −0.04000 | −0.04000 | −0.10000 |
| D0 | 140.5720 | 667.7010 | 426.1274 |
| d5 | 1.02020 | 12.36308 | 15.22189 |
| d11 | 15.63505 | 4.29217 | 1.43336 |
| d19 | 9.46632 | 1.30190 | 1.39860 |
| d22 | 4.14400 | 12.30842 | 12.21172 |
| Bf | 0.15320 | 0.15320 | 0.15320 |
| TL | 60.41878 | 60.41878 | 60.41878 |

[Values for Conditional Expressions]

| (9) {Fw × (N32 − N3133)}/F3 = | 0.176 |
| (10) F3/F32 = | −1.760 |
| (11) {Fw × (N32 − N3133)}/D30 = | 0.369 |
| (12) Fw/{Fe × (Nen − Nep)} = | 0.342 |
| (13) Fw/{Fe × (vep − ven)} = | 0.0028 |

FIGS. 11A, 11B, 11C are graphs showing various aberrations upon focusing on infinity of the zoom lens according to Example 12, in which FIG. 11A shows in the wide-angle end state, FIG. 11B shows in the intermediate focal length state, and FIG. 11C shows in the telephoto end state. FIGS. 12A, 12B, 12C are graphs showing various aberrations upon focusing on the closest shooting range of the zoom lens according to Example 12, in which FIG. 12A shows the shooting range Rw=201 mm, FIG. 12B shows the shooting range Rm=728 mm, and FIG. 12C shows the shooting range Rt=487 mm.

As is apparent from the respective graphs, the zoom lens according to Example 12 shows superb optical performance as a result of good corrections to various aberrations from the wide-angle end state through the telephoto end state.

Example 13

FIG. 13 is a diagram showing a lens configuration of a zoom lens according Example 13. Various values associated with the zoom lens according to Example 13 are listed in Table 13.

TABLE 13

[Specifications]

|  | W | M | T |
|---|---|---|---|
| f = | 6.55 | 30.00 | 60.10 |
| FNO = | 3.5 | 3.6 | 3.6 |

[Lens Data]

|  | r | d | vd | Nd |
|---|---|---|---|---|
| 1) | 26.2824 | 1.4000 | 20.88 | 1.922860 |
| 2) | 21.0438 | 5.9000 | 90.22 | 1.456500 |
| 3) | 228.8413 | 0.1000 |  |  |
| 4) | 17.1969 | 5.3000 | 90.91 | 1.454570 |
| 5) | 384.2679 | (d5 = var.) |  |  |
| 6) | −48.0949 | 1.0000 | 40.10 | 1.851350 |
| 7) | 4.3298 | 2.2000 |  |  |
| 8) | 67.2370 | 1.0000 | 40.77 | 1.883000 |
| 9) | 14.7215 | 0.6000 |  |  |
| 10) | 10.4892 | 1.5000 | 17.98 | 1.945950 |
| 11) | 35.3651 | (d11 = var.) |  |  |
| 12) | 0.0000 | 0.3000 | Aperture Stop |  |
| 13) | 5.3545 | 2.1000 | 63.97 | 1.514280 |
| 14) | 20.6091 | 0.9000 |  |  |
| 15) | 22.0033 | 1.0000 | 42.72 | 1.834810 |
| 16) | 6.1272 | 0.4000 |  |  |
| 17) | 10.2439 | 1.8000 | 91.20 | 1.456000 |
| 18) | −9.5325 | 0.0000 |  |  |
| 19) | 0.0000 | (d19 = var.) | Field Stop |  |
| 20) | 9.9547 | 1.0000 | 25.46 | 2.000690 |
| 21) | 6.7749 | 2.6000 | 91.30 | 1.455590 |
| 22) | −50.2288 | (d22 = var.) |  |  |
| 23) | 0.0000 | 0.9000 | 70.51 | 1.544370 |
| 24) | 0.0000 | 0.5000 |  |  |
| 25) | 0.0000 | 0.5000 | 64.12 | 1.516800 |
| 26) | 0.0000 | Bf |  |  |

[Aspherical Coefficient]

| surface | K | C 4 | C 6 | C 8 |
|---|---|---|---|---|
| 4: | 0.5000 | 3.76710E−06 | 0.00000E+00 | 0.00000E+00 |
| 7: | −0.7125 | 1.62070E−03 | −2.29890E−05 | 0.00000E+00 |
| 13: | 0.6618 | −3.30480E−04 | 0.00000E+00 | 0.00000E+00 |
| 22: | −99.0000 | −2.73180E−04 | 0.00000E+00 | 0.00000E+00 |

[Variable Distance upon Focusing]

|  | W | M | T |
|---|---|---|---|
|  | Infinity | | |
| f | 6.55000 | 30.00000 | 60.10000 |
| D0 | ∞ | ∞ | ∞ |
| d5 | 1.02020 | 12.17258 | 15.26467 |
| d11 | 15.30818 | 4.15580 | 1.06371 |
| d19 | 8.76585 | 2.98255 | 10.66236 |
| d22 | 4.01583 | 9.79913 | 2.11932 |
| Bf | 2.37189 | 2.37189 | 2.37189 |
| TL | 62.48195 | 62.48195 | 62.48195 |
|  | Closest Distance | | |
| β | −0.04000 | −0.04000 | −0.10000 |
| D0 | 141.5092 | 674.0564 | 452.9397 |

TABLE 13-continued

| d5 | 1.02020 | 12.17258 | 15.26467 |
|---|---|---|---|
| d11 | 15.30818 | 4.15580 | 1.06371 |
| d19 | 8.31502 | 1.48999 | 1.94430 |
| d22 | 4.46666 | 11.29169 | 10.83738 |
| Bf | 2.37189 | 2.37189 | 2.37189 |
| TL | 62.48195 | 62.48195 | 62.48195 |

[Values for Conditional Expressions]

| (9) {Fw × (N32 − N3133)}/F3 = | 0.160 |
|---|---|
| (10) F3/F32 = | −1.367 |
| (11) {Fw × (N32 − N3133)}/D30 = | 0.369 |
| (12) Fw/{Fe × (Nen − Nep)} = | 0.389 |
| (13) Fw/{Fe × (vep − ven)} = | 0.0032 |

FIGS. 14A, 14B, 14C are graphs showing various aberrations upon focusing on infinity of the zoom lens according to Example 13, in which FIG. 14A shows in the wide-angle end state, FIG. 14B shows in the intermediate focal length state, and FIG. 14C shows in the telephoto end state. FIGS. 15A, 15B, 15C are graphs showing various aberrations upon focusing on the closest shooting range of the zoom lens according to Example 13, in which FIG. 15A shows the shooting range Rw=204 mm, FIG. 15B shows the shooting range Rm=737 mm, and FIG. 15C shows the shooting range Rt=515 mm.

As is apparent from the respective graphs, the zoom lens according to Example 13 shows superb optical performance as a result of good corrections to various aberrations from the wide-angle end state through the telephoto end state.

Example 14

FIG. 16 is a diagram showing a lens configuration of a zoom lens according Example 14. Various values associated with the zoom lens according to Example 14 are listed in Table 14.

TABLE 14

[Specifications]

|  | W | M | T |
|---|---|---|---|
| f = | 6.50 | 30.00 | 61.00 |
| FNO = | 3.5 | 3.8 | 3.4 |

[Lens Data]

|  | r | d | vd | Nd |
|---|---|---|---|---|
| 1) | 25.9678 | 1.4000 | 17.98 | 1.945950 |
| 2) | 21.0210 | 6.1000 | 82.56 | 1.497820 |
| 3) | 339.3220 | 0.1000 |  |  |
| 4) | 17.2833 | 4.7000 | 82.56 | 1.497820 |
| 5) | 132.3282 | (d5 = var.) |  |  |
| 6) | −1236.7392 | 1.0000 | 40.19 | 1.850490 |
| 7) | 5.0328 | 2.2000 |  |  |
| 8) | −38.8019 | 1.0000 | 40.77 | 1.883000 |
| 9) | 11.0291 | 0.9000 |  |  |
| 10) | 11.6547 | 1.6000 | 17.98 | 1.945950 |
| 11) | 96.0997 | (d11 = var.) |  |  |
| 12) | 0.0000 | 0.5000 | Aperture Stop |  |
| 13) | 4.8302 | 1.8000 | 70.45 | 1.487490 |
| 14) | 11.7906 | 0.1000 |  |  |
| 15) | 9.0250 | 1.0000 | 42.72 | 1.834810 |
| 16) | 5.3685 | 0.8000 |  |  |
| 17) | −83.9696 | 1.7000 | 82.56 | 1.497820 |
| 18) | −10.6798 | 0.0000 |  |  |
| 19) | 0.0000 | (d19 = var.) | Field Stop |  |
| 20) | 9.8440 | 1.0000 | 25.46 | 2.000690 |
| 21) | 6.4780 | 3.5000 | 82.56 | 1.497820 |
| 22) | −21.7650 | (d22 = var.) |  |  |
| 23) | 0.0000 | 1.6000 | 70.51 | 1.544370 |

TABLE 14-continued

| | | | | |
|---|---|---|---|---|
| 24) | 0.0000 | 0.5000 | | |
| 25) | 0.0000 | 0.5000 | 64.12 | 1.516800 |
| 26) | 0.0000 | Bf | | |

[Aspherical Coefficient]

| surface | K | C 4 | C 6 | C 8 |
|---|---|---|---|---|
| 4: | 0.4504 | 6.12900E−06 | 4.75680E−09 | 0.00000E+00 |
| 7: | 0.2496 | 3.63880E−04 | 7.00120E−06 | −1.36530E−08 |
| 13: | 0.1671 | 1.54140E−04 | 2.28490E−05 | −9.89080E−07 |
| 22: | 1.0000 | −1.16660E−04 | 0.00000E+00 | 0.00000E+00 |

[Variable Distance upon Focusing]

| | W | M | T |
|---|---|---|---|
| | | Infinity | |
| f | 6.55000 | 30.00000 | 60.10000 |
| D0 | ∞ | ∞ | ∞ |
| d5 | 0.90000 | 10.93565 | 13.96348 |
| d11 | 15.13311 | 5.09746 | 2.06963 |
| d19 | 5.66087 | 2.06239 | 8.70390 |
| d22 | 6.59264 | 10.19112 | 3.54961 |
| Bf | 4.20934 | 4.20934 | 4.20934 |
| TL | 64.49596 | 64.49596 | 64.49596 |
| | | Closest Distance | |
| β | −0.04000 | −0.04000 | −0.10000 |
| D0 | 140.9181 | 683.8795 | 473.4833 |
| d5 | 0.90000 | 10.93565 | 13.96348 |
| d11 | 15.13311 | 5.09746 | 2.06963 |
| d19 | 5.38098 | 0.85734 | 2.30376 |
| d22 | 6.87253 | 11.39617 | 9.94975 |
| Bf | 4.20934 | 4.20934 | 4.20934 |
| TL | 64.49596 | 64.49596 | 64.49596 |

[Values for Conditional Expressions]

| | |
|---|---|
| (9) {Fw × (N32 − N3133)}/F3 = | 0.117 |
| (10) F3/F32 = | −1.048 |
| (11) {Fw × (N32 − N3133)}/D30 = | 0.412 |
| (12) Fw/{Fe × (Nen − Nep)} = | 0.623 |
| (13) Fw/{Fe × (vep − ven)} = | 0.0055 |

FIGS. 17A, 17B, 17C are graphs showing various aberrations upon focusing on infinity of the zoom lens according to Example 14, in which FIG. 17A shows in the wide-angle end state, FIG. 17B shows in the intermediate focal length state, and FIG. 17C shows in the telephoto end state. FIGS. 18A, 18B, 18C are graphs showing various aberrations upon focusing on the closest shooting range of the zoom lens according to Example 14, in which FIG. 18A shows the shooting range Rw=205 mm, FIG. 18B shows the shooting range Rm=748 mm, and FIG. 18C shows the shooting range Rt=538 mm.

As is apparent from the respective graphs, the zoom lens according to Example 14 shows superb optical performance as a result of good corrections to various aberrations from the wide-angle end state through the telephoto end state.

Example 15

FIG. 19 is a diagram showing a lens configuration of a zoom lens according Example 15. Various values associated with the zoom lens according to Example 15 are listed in Table 15.

TABLE 15

[Specifications]

| | W | M | T |
|---|---|---|---|
| f = | 6.55 | 30.00 | 60.10 |
| FNO = | 3.5 | 3.8 | 3.5 |

[Lens Data]

| | r | d | vd | Nd |
|---|---|---|---|---|
| 1) | 23.8479 | 1.4000 | 25.46 | 2.000690 |
| 2) | 18.7624 | 5.9000 | 95.25 | 1.433852 |
| 3) | 167.9070 | 0.1000 | | |
| 4) | 16.8888 | 5.3000 | 90.91 | 1.454570 |
| 5) | −5137.1460 | (d5 = var.) | | |
| 6) | −46.5253 | 1.0000 | 40.10 | 1.851350 |
| 7) | 4.2808 | 2.2000 | | |
| 8) | 21.5453 | 1.0000 | 46.58 | 1.804000 |
| 9) | 10.8456 | 0.6000 | | |
| 10) | 9.0254 | 1.5000 | 17.98 | 1.945950 |
| 11) | 20.1834 | (d11 = var.) | | |
| 12) | 0.0000 | 0.3000 | Aperture Stop | |
| 13) | 5.4471 | 2.1000 | 63.97 | 1.514280 |
| 14) | 20.0657 | 0.9000 | | |
| 15) | 21.6048 | 1.0000 | 42.72 | 1.834810 |
| 16) | 6.2337 | 0.4000 | | |
| 17) | 10.2439 | 1.8000 | 91.20 | 1.456000 |
| 18) | −9.5325 | 0.0000 | | |
| 19) | 0.0000 | (d19 = var.) | Field Stop | |
| 20) | 9.4629 | 1.0000 | 25.46 | 2.000690 |
| 21) | 6.5553 | 2.6000 | 95.25 | 1.433852 |
| 22) | −46.2338 | (d22 = var.) | | |
| 23) | 0.0000 | 0.9000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Coefficient]

| surface | K | C 4 | C 6 | C 8 |
|---|---|---|---|---|
| 4: | 0.5000 | 3.36290E−06 | 0.00000E+00 | 0.00000E+00 |
| 7 | −0.4928 | 1.29050E−03 | −1.76320E−05 | 0.00000E+00 |
| 13: | 0.6368 | −2.96970E−04 | 0.00000E+00 | 0.00000E+00 |
| 22: | −99.0000 | −3.01210E−04 | 0.00000E+00 | 0.00000E+00 |

[Variable Distance upon Focusing]

| | W | M | T |
|---|---|---|---|
| | | Infinity | |
| f | 6.55000 | 30.00000 | 60.10000 |
| D0 | ∞ | ∞ | ∞ |
| d5 | 1.02020 | 12.17258 | 15.26467 |
| d11 | 15.43955 | 4.28717 | 1.19508 |
| d19 | 8.90776 | 3.12446 | 10.80427 |
| d22 | 3.92934 | 9.71264 | 2.03283 |
| Bf | 2.37189 | 2.37189 | 2.37189 |
| TL | 62.66873 | 62.66873 | 62.66873 |
| | | Closest Distance | |
| β | −0.04000 | −0.04000 | −0.10000 |
| D0 | 141.5092 | 674.0564 | 452.9397 |
| d5 | 1.02020 | 12.17258 | 15.26467 |
| d11 | 15.43955 | 4.28717 | 1.19508 |
| d19 | 8.45693 | 1.63190 | 2.08621 |
| d22 | 4.38017 | 11.20520 | 10.75089 |
| Bf | 2.37189 | 2.37189 | 2.37189 |
| TL | 62.66873 | 62.66873 | 62.66873 |

[Values for Conditional Expressions]

| | |
|---|---|
| (9) {Fw × (N32 − N3133)}/F3 = | 0.160 |
| (10) F3/F32 = | −1.323 |
| (11) {Fw × (N32 − N3133)}/D30 = | 0.364 |
| (12) Fw/{Fe × (Nen − Nep)} = | 0.374 |
| (13) Fw/{Fe × (vep − ven)} = | 0.0030 |

FIGS. 20A, 20B, 20C are graphs showing various aberrations upon focusing on infinity of the zoom lens according to Example 15, in which FIG. 20A shows in the wide-angle end state, FIG. 20B shows in the intermediate focal length state, and FIG. 20C shows in the telephoto end state. FIGS. 21A, 21B, 21C are graphs showing various aberrations upon focusing on the closest shooting range of the zoom lens according to Example 15, in which FIG. 21A shows the shooting range Rw=204 mm, FIG. 21B shows the shooting range Rm=737 mm, and FIG. 21C shows the shooting range Rt=516 mm.

As is apparent from the respective graphs, the zoom lens according to Example 15 shows superb optical performance as a result of good corrections to various aberrations from the wide-angle end state through the telephoto end state.

Example 16

FIG. 22 is a diagram showing a lens configuration of a zoom lens according Example 16.

The zoom lens according to Example 16 is composed of, in order from an object, a first lens group G1 having positive refractive power, a second lens group G2 having negative refractive power, an aperture stop, a third lens group G3 having positive refractive power, a field stop, a fourth lens group G4 having positive refractive power, a fifth lens group G5 having positive refractive power, an optical low-pass filter OLPF, and a cover glass CG for a solid-state imaging device disposed on an image plane I.

The first lens group G1 is composed of, in order from the object side, a cemented lens constructed by a negative meniscus lens L11 having a convex surface facing the object side cemented with a positive meniscus lens L12 having a convex surface facing the object side, and a positive lens L13 having a radius of curvature of the object side surface being ⅙ or less of the absolute value of a radius of curvature of the image side surface.

The second lens group G2 is composed of, in order from the object side, a negative lens L21 having a concave surface facing the image side, a negative lens L22 having a concave surface facing the image side, and a positive meniscus lens L23 having a convex surface facing the object side.

The third lens group G3 is composed of, in order from the object side, a positive lens L31 having a convex surface facing the object side, a negative lens L32 having a concave surface facing the image side, and a positive lens L33 having a convex surface facing the image side.

The fourth lens group G4 is composed of a positive lens L41 having a convex surface facing the object side.

The fifth lens group G5 is composed of a cemented lens constructed by, in order from the object, a negative meniscus lens L51 having a convex surface facing the object side cemented with a double convex positive lens L52.

An aspherical surface is formed each of the object side surface of the positive meniscus lens L13, the image side surface of the negative lens L21 having a concave surface facing the image side, the object side surface of the positive lens L31 having a convex surface facing the object side, the object side surface of the positive lens L41 having a convex surface facing the object side, and the image side surface of the double convex positive lens L52.

Upon zooming from a wide-angle end state W to a telephoto end state T, the first lens group G1 is fixed, the second lens group G2 is moved to the image plane I side, the third lens group G3 is fixed, the fourth lens group G4 is moved to the object side, and the fifth lens group G5 is moved along the optical axis with a trajectory having convex shape facing the object side.

Upon focusing on an object to be shot locating at a finite distance, the fifth lens group G5 is moved along the optical axis. In the solid-state imaging device according to Example 16, a diagonal length IH that is a distance between the center and a corner is 3.75 mm.

Various values associated with the zoom lens according to Example 16 are listed in Table 16.

TABLE 16

| [Specifications] | | | |
| --- | --- | --- | --- |
| | W | M | T |
| f = | 6.55 | 30.00 | 61.00 |
| FNO = | 3.9 | 4.0 | 4.0 |

| [LensData] | | | | |
| --- | --- | --- | --- | --- |
| | r | d | νd | Nd |
| 1) | 25.9550 | 1.4000 | 20.88 | 1.922860 |
| 2) | 20.8100 | 5.9000 | 90.22 | 1.456500 |
| 3) | 222.0859 | 0.1000 | | |
| 4) | 17.1799 | 5.3000 | 90.91 | 1.454570 |
| 5) | 331.1581 | (d5 = var.) | | |
| 6) | −55.2024 | 1.0000 | 40.10 | 1.851350 |
| 7) | 4.0941 | 2.5000 | | |
| 8) | −52.5834 | 1.0000 | 40.77 | 1.883000 |
| 9) | 36.3122 | 0.1000 | | |
| 10) | 10.8248 | 1.5000 | 17.98 | 1.945950 |
| 11) | 42.0827 | (d11 = var.) | | |
| 12) | 0.0000 | 0.3000 | Aperture Stop | |
| 13) | 5.3590 | 2.1000 | 63.97 | 1.514280 |
| 14) | −18.4083 | 0.9000 | | |
| 15) | −105.1597 | 1.0000 | 42.72 | 1.834810 |
| 16) | 6.1759 | 0.5000 | | |
| 17) | 14.0411 | 1.8000 | 91.20 | 1.456000 |
| 18) | −12.8987 | 0.0000 | | |
| 19) | 0.0000 | (d19 = var.) | Field Stop | |
| 20) | 7.6567 | 1.0000 | 82.56 | 1.497820 |
| 21) | 7.8294 | (d21 = var.) | | |
| 22) | 9.4449 | 1.0000 | 25.46 | 2.000690 |
| 23) | 6.5133 | 2.6000 | 91.30 | 1.455590 |
| 24) | −46.4002 | (d24 = var.) | | |
| 25) | 0.0000 | 0.9000 | 70.51 | 1.544370 |
| 26) | 0.0000 | 0.5000 | | |
| 27) | 0.0000 | 0.5000 | 64.12 | 1.516800 |
| 28) | 0.0000 | Bf | | |

| [Aspherical Coefficient] | | | | |
| --- | --- | --- | --- | --- |
| surface | K | C 4 | C 6 | C 8 |
| 4: | 0.5000 | 3.64110E−06 | 0.00000E+00 | 0.00000E+00 |
| 7: | −0.8224 | 2.14650E−03 | −2.55770E−05 | 0.00000E+00 |
| 13: | 0.3073 | −1.33760E−04 | 0.00000E+00 | 0.00000E+00 |
| 20: | 0.4401 | 0.00000E+00 | 0.00000E+00 | 0.00000E+00 |
| 24: | −99.0000 | −3.15800E−04 | 0.00000E+00 | 0.00000E+00 |

| [Variable Distance upon Focusing] | | | |
| --- | --- | --- | --- |
| | W | M | T |
| | Infinity | | |
| f | 6.55000 | 30.00000 | 60.10000 |
| D0 | ∞ | ∞ | ∞ |
| d5 | 0.74690 | 12.21974 | 15.17127 |
| d11 | 17.63827 | 6.16543 | 3.21390 |
| d19 | 1.99764 | 0.85035 | 0.55520 |
| d21 | 7.68233 | 2.90191 | 10.59213 |
| d24 | 2.87011 | 8.79782 | 1.40275 |
| Bf | 2.04158 | 2.04158 | 2.04158 |
| TL | 64.87683 | 64.87683 | 64.87683 |
| | Closest Distance | | |
| β | −0.04000 | −0.04000 | −0.10000 |
| D0 | 140.7636 | 667.4376 | 435.3158 |
| d5 | 0.65678 | 12.21974 | 15.17127 |

TABLE 16-continued

| d11 | 17.72839 | 6.16543 | 3.21390 |
|---|---|---|---|
| d19 | 2.00665 | 0.85035 | 0.55520 |
| d21 | 7.26838 | 1.41864 | 1.84668 |
| d24 | 3.27505 | 10.28109 | 10.14820 |
| Bf | 2.04158 | 2.04158 | 2.04158 |
| TL | 64.87683 | 64.87683 | 64.87683 |

[Values for Conditional Expressions]

| (9) $\{Fw \times (N32 - N3133)\}/F3 =$ | 0.148 |
|---|---|
| (10) $F3/F32 =$ | −2.220 |
| (11) $\{Fw \times (N32 - N3133)\}/D30 =$ | 0.364 |
| (12) $Fw/\{Fe \times (Nen - Nep)\} =$ | 0.427 |
| (13) $Fw/\{Fe \times (vep - ven)\} =$ | 0.0035 |

FIGS. 23A, 23B, 23C are graphs showing various aberrations upon focusing on infinity of the zoom lens according to Example 16, in which FIG. 23A shows in the wide-angle end state, FIG. 23B shows in the intermediate focal length state, and FIG. 23C shows in the telephoto end state. FIGS. 24A, 24B, 24C are graphs showing various aberrations upon focusing on the closest shooting range of the zoom lens according to Example 16, in which FIG. 24A shows the shooting range Rw=206 mm, FIG. 24B shows the shooting range Rm=732 mm, and FIG. 24C shows the shooting range Rt=500 mm.

As is apparent from the respective graphs, the zoom lens according to Example 16 shows superb optical performance as a result of good corrections to various aberrations from the wide-angle end state through the telephoto end state.

Then, a camera equipped with the zoom lens according to the present embodiment is explained.

Figure 25A:
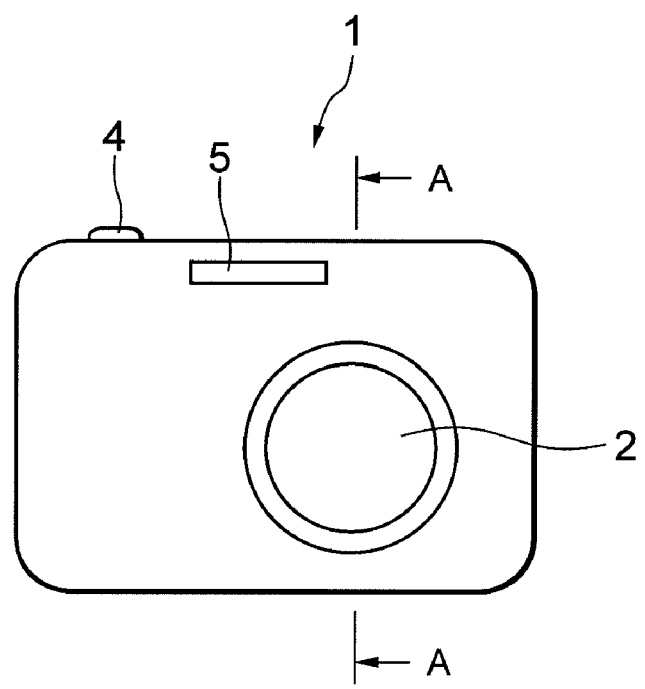
Figure 25B:
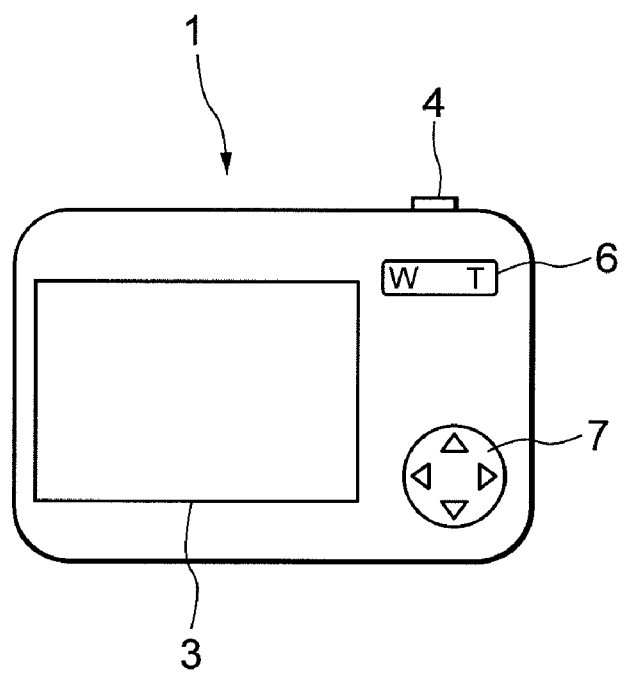
Figure 26:
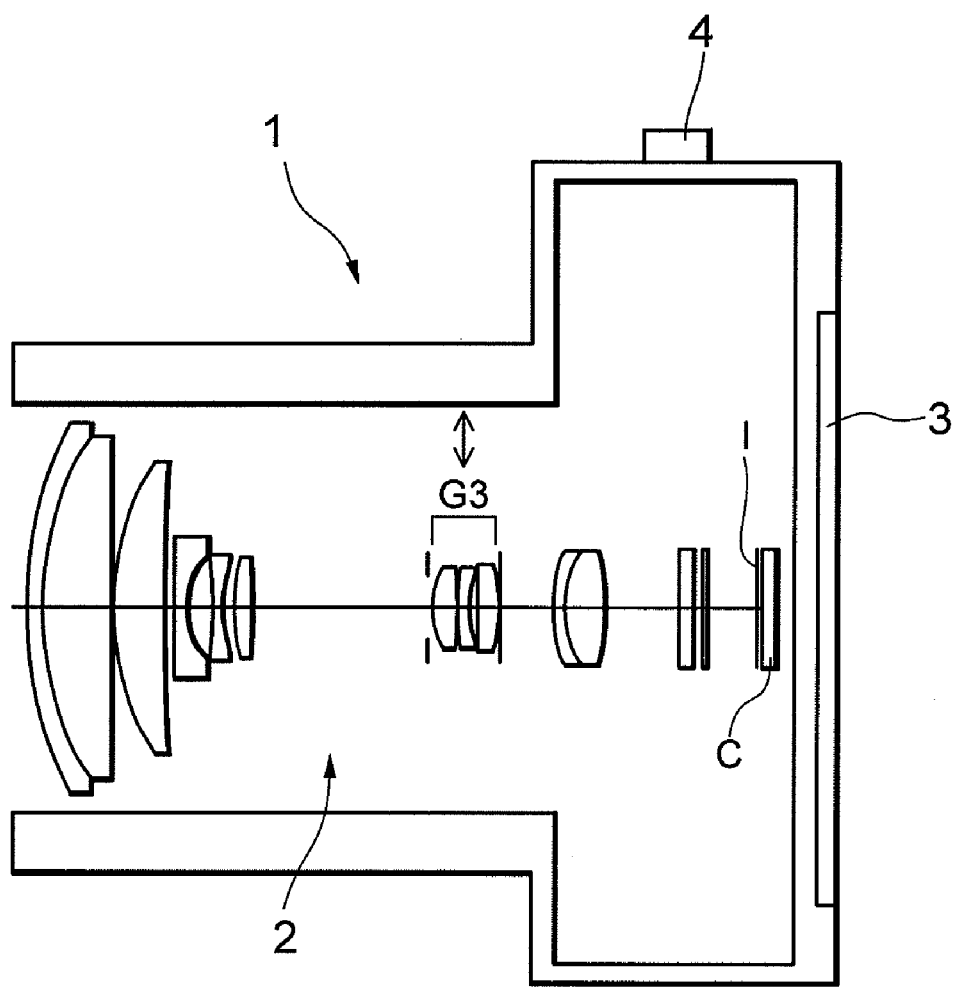
FIG. 26 is a sectional view sectioned along A-A line in FIG. 25A.

FIGS. 25A and 25B are diagrams showing an electronic still camera equipped with the zoom lens system according to the first or second embodiment, in which FIG. 25A is a front view, and FIG. 25B is a rear view. FIG. 26 is a sectional view along A-A line in FIG. 25A.

As shown in FIGS. 25A, 25B, and 26, in an electronic still camera 1 (hereinafter simply called as a camera), when a power switch button (not shown) is pressed, a shutter (not shown) of an image-taking lens 2 is opened. Accordingly, light from an object (not shown) is converged by the image-taking lens 2, and an image is formed on an imaging device C (such as a CCD, or CMOS) disposed on the image plane I. The object image formed on the imaging device C is captured and displayed on a liquid crystal monitor 3 disposed backside of the camera 1. After fixing the composition of the object image with observing the liquid crystal monitor 3, a photographer depresses a release button 4 to take a picture of the object image by the imaging device C, and stores in a memory (not shown). On this occasion, a camera 1 shake caused by an unintentional movement of hands is detected by an angular velocity sensor (not shown) installed in the camera 1, and the vibration reduction lens G3 disposed in the image-taking lens 2 is shifted in a direction perpendicular to the optical axis by a vibration reduction mechanism (not shown), thereby correcting an image blur generated on the image plane I caused by the camera 1 shake.

The image-taking lens 2 is configured by the zoom lens according to the above-described first or second embodiment. Moreover, in the camera 1, the following members are disposed such as an auxiliary light emitter 5 that emits auxiliary light when the object is dark, a W-T button 6 that makes the zoom lens system carry out zooming between a wide-angle end state (W) and a telephoto end state (T), and a function button 7 that is used for setting various conditions of the camera 1.

In this manner, the camera 1 equipped with the zoom lens according to the present embodiment is constructed.

As described above, the present embodiment makes it possible to provide a compact zoom lens excellently correcting various aberrations, having a half angle of view in the telephoto end state of 3.0 degrees or less, a zoom ratio of about 10 or more, and an FNO in the telephoto end state of 5 or less.

In the above-described Examples, although the first lens group and the third lens group are fixed upon zooming, what the present application intends is not limited to the manner of this way of zooming. For example, it may be such that the distance between the first lens group and the second lens group increases, the distance between the second lens group and the third lens group decreases, and the most image side lens group among the plurality of lens groups moves along the optical axis with a trajectory having convex shape facing the object side.

When the vibration reduction mechanism can coexist with zooming mechanism in the third lens group, it may be such that the first lens group is fixed, the second lens group is moved to the image side, the third lens group is moved to the object side, and the most image side lens group is moved with a trajectory having convex shape facing the object.

Moreover, when a zooming mechanism of the first lens group has a hardly-decentered mechanism, and the vibration reduction mechanism can coexist with zooming mechanism in the third lens group, it may be such that the first lens group is moved to the object side, the scone lens group is moved to the image side, the third lens group is moved to the object side, and the most image side lens group is moved with a trajectory having convex shape facing the object.

In Examples, although the third lens group has positive refractive power, the third lens group may have negative refractive power.

In Examples, although the fourth lens group has positive refractive power, the third lens group may have negative refractive power.

In Examples 1 and 9, although vibration reduction is carried out by decentering the third lens group as a whole in a direction perpendicular to the optical axis, any other Examples may carry out vibration reduction. Moreover, it may be carried out not only by the third lens group as a whole, but also by any lens or lens group by moving in a direction perpendicular to the optical axis. For the purpose of cost reduction, the fourth lens group may be constructed by a single positive lens.

In each Example, although focusing on a close object is carried out by the fourth lens group or the fifth lens group which is the most image side lens group, when the zooming mechanism can coexist with the focusing mechanism in the first lens group, it may be carried out by the first lens group as a whole or a portion thereof.

In each Example, although a zoom lens with a four-lens-group configuration or a five-lens-group configuration is shown, the present application is applicable to the other lens configurations such as a three-lens-group configuration or a six-lens-group configuration.

Moreover, any lens surface may be an aspherical surface. The aspherical surface may be fabricated by a fine grinding process, a glass molding process that a glass material is formed into an aspherical shape by a mold, or a compound type process that a resin material is formed into an aspherical shape on a glass surface.

Although an aperture stop is preferably disposed in the vicinity of the third lens group, the function may be substituted by a lens frame without disposing a member as an aperture stop.

An antireflection coating having high transmittance over a broad wavelength range may be applied to each lens surface of a zoom lens system according to the present application to reduce flare or ghost images, so that high optical performance with a high contrast can be attained.

The present embodiment only shows a specific example for the purpose of better understanding of the present invention. Accordingly, it is needless to say that the invention in its broader aspect is not limited to the specific details and representative devices.

What is claimed is:

1. A zoom lens comprising a plurality of lens groups including, in order from an object side:
   a first lens group having positive refractive power;
   a second lens group having negative refractive power;
   a third lens group; and
   a fourth lens group;
   the third lens group including, in order from the object side, a first positive lens of the third lens group, a negative lens of the third lens group, and a second positive lens of the third lens group, and
   the following conditional expressions being satisfied:

$$1.00 < F3/Fw < 3.40$$

$$0.700 < D30 \times N3133/Fw < 1.435$$

where F3 denotes a focal length of the third lens group, Fw denotes a focal length of the zoom lens in a wide-angle end state, D30 denotes a thickness of the third lens group, and N3133 denotes an average refractive index of the first positive lens of the third lens group and the second positive lens of the third lens group.

2. The zoom lens according to claim 1, wherein the third lens group has positive refractive power, and the fourth lens group has positive refractive power.

3. The zoom lens according to claim 1, wherein upon zooming from the wide-angle end state to a telephoto end state, a distance between the first lens group and the second lens group increases, a distance between the second lens group and the third lens group decreases, and the most image side lens group among the plurality of lens groups is moved along an optical axis with a trajectory having a convex shape facing the object side.

4. The zoom lens according to claim 1, wherein the third lens group is fixed upon zooming from the wide-angle end state to the telephoto end state.

5. The zoom lens according to claim 1, wherein the first positive lens of the third lens group has a convex surface facing the object side, the negative lens of the third lens group has an absolute value of a radius of curvature of the image side surface smaller than that of the object side surface, and the second positive lens of the third lens group has an absolute value of a radius of curvature of the image side surface smaller than that of the object side surface.

6. The zoom lens according to claim 1, wherein an aspherical surface is formed on at least one lens surface of the third lens group.

7. The zoom lens according to claim 1, wherein each of lenses in the third lens group is disposed between air spaces.

8. The zoom lens according to claim 1, wherein the following conditional expression is satisfied:

$$-2.00 < F3/F32 < -0.98$$

where F32 denotes a focal length of the negative lens of the third lens group.

9. The zoom lens according to claim 1, wherein the first positive lens of the third lens group has an aspherical surface on the object side surface thereof.

10. The zoom lens according to claim 1, wherein the following conditional expressions are satisfied:

$$N3133 < 1.500$$

$$70.00 < v3133$$

where N3133 denotes an average refractive index of the first positive lens of the third lens group and the second positive lens of the third lens group, and v3133 denotes an average Abbe number of the first positive lens of the third lens group and the second positive lens of the third lens group.

11. The zoom lens according to claim 1, wherein at least one portion of the third lens group is moved in a direction perpendicular to an optical axis.

12. The zoom lens according to claim 1, wherein the most image side lens group among the plurality of lens groups includes a positive lens element.

13. The zoom lens according to claim 12, wherein the following conditional expression is satisfied:

$$0.10 < D30 \times Ne/Fe < 0.50$$

where Fe denotes a focal length of the most image side lens group among the plurality of lens groups, and Ne denotes a refractive index of the positive lens element.

14. The zoom lens according to claim 12, wherein the positive lens element has an aspherical surface on the image side surface, and the following conditional expressions are satisfied:

$$Ne < 1.550$$

$$75.00 < ve$$

where Ne denotes a refractive index of the positive lens element, and ve denotes an Abbe number of the positive lens element.

15. A method for forming an image by a zoom lens that comprises a plurality of lens groups including, in order from an object side, a first lens group having positive refractive power, a second lens group having negative refractive power, a third lens group, and a fourth lens group, the method comprising steps of:
    providing the third lens group including, in order from the object side, a first positive lens of the third lens group, a negative lens of the third lens group, and a second positive lens of the third lens group;
    satisfying the following conditional expressions:

$$1.00 < F3/Fw < 3.40$$

$$0.700 < D30 \times N3133/Fw < 1.435$$

where F3 denotes a focal length of the third lens group, Fw denotes a focal length of the zoom lens in a wide-angle end state, D30 denotes a thickness of the third lens group, and N3133 denotes an average refractive index of the first positive lens of the third lens group and the second positive lens of the third lens group; and
    forming an image of the object by the zoom lens.

16. A zoom lens comprising a plurality of lens groups including, in order from an object side:
    a first lens group having positive refractive power;
    a second lens group having negative refractive power;
    a third lens group; and
    a fourth lens group;

the third lens group including a first positive lens of the third lens group, a negative lens of the third lens group, and a second positive lens of the third lens group, and the following conditional expression being satisfied:

$$0.098<\{Fw\times(N32-N3133)\}/F3<0.200$$

where Fw denotes a focal length of the zoom lens in a wide-angle end state, F3 denotes a focal length of the third lens group, N3133 denotes an average refractive index of the first positive lens of the third lens group and the second positive lens of the third lens group, and N32 denotes a refractive index of the negative lens of the third lens group.

17. The zoom lens according to claim 16, wherein the following conditional expression is satisfied:

$$0.340<\{Fw\times(N32-N3133)\}/D30<0.500$$

where D30 denotes a thickness of the third lens group.

18. The zoom lens according to claim 16, wherein upon focusing on an object locating at a finite distance, the most image side lens group among the plurality of lens groups is moved along an optical axis to the object side.

19. The zoom lens according to claim 16, wherein the most image side lens group among the plurality of lens groups includes, in order from the object side, a negative meniscus lens having a convex surface facing the object side, and a double convex positive lens.

20. The zoom lens according to claim 19, wherein the following conditional expression is satisfied:

$$0.10<Fw/\{Fe\times(Nen-Nep)\}<0.85$$

where Fe denotes a focal length of the most image side lens group among the plurality of lens groups, Nen denotes a refractive index of the negative meniscus lens, and Nep denotes a refractive index of the double convex positive lens.

21. The zoom lens according to claim 19, wherein the following conditional expression is satisfied:

$$0.0005<Fw/\{Fe\times(vep-ven)\}<0.0063$$

where ven denotes an Abbe number of the negative meniscus lens, and vep denotes an Abbe number of the double convex positive lens.

22. A method for forming an image by a zoom lens that comprises a plurality of lens groups including, in order from an object side, a first lens group having positive refractive power, a second lens group having negative refractive power, a third lens group, and a fourth lens group, the method comprising steps of:
providing the third lens group with a first positive lens of the third lens group, a negative lens of the third lens group, and a second positive lens of the third lens group;
satisfying the following conditional expression:

$$0.098<Fw\times(N32-N3133)/F3<0.200$$

where Fw denotes a focal length of the zoom lens in a wide-angle end state, F3 denotes a focal length of the third lens group, N3133 denotes an average refractive index of the first positive lens of the third lens group and the second positive lens of the third lens group, and N32 denotes a refractive index of the negative lens of the third lens group; and
forming the image of the object by the zoom lens.

23. A zoom lens comprising a plurality of lens groups including, in order from an object side:
a first lens group having positive refractive power;
a second lens group having negative refractive power;
a third lens group; and
a fourth lens group;
the third lens group including, in order from the object side, a first positive lens of the third lens group, a negative lens of the third lens group, and a second positive lens of the third lens group;
the most image side lens group among the plurality of lens groups including a positive lens element, and the following conditional expressions being satisfied:

$$0.700<D30\times N3133/Fw<1.435$$

$$0.10<D30\times Ne/Fe<0.50$$

where Fw denotes a focal length of the zoom lens in a wide-angle end state, D30 denotes a thickness of the third lens group, and N3133 denotes an average refractive index of the first positive lens of the third lens group and the second positive lens of the third lens group, Fe denotes a focal length of the most image side lens group among the plurality of lens groups, and Ne denotes a refractive index of the positive lens element.

24. A zoom lens comprising a plurality of lens groups including, in order from an object side:
a first lens group having positive refractive power;
a second lens group having negative refractive power;
a third lens group; and
a fourth lens group;
the third lens group including, in order from the object side, a first positive lens of the third lens group, a negative lens of the third lens group, and a second positive lens of the third lens group;
the most image side lens group among the plurality of lens groups including a positive lens element having an aspherical surface on the image side surface, and the following conditional expressions being satisfied:

$$Ne<1.550$$

$$75.00<ve$$

$$0.700<D30\times N3133/Fw<1.435$$

where Ne denotes a refractive index of the positive lens element, and ve denotes an Abbe number of the positive lens element, Fw denotes a focal length of the zoom lens in a wide-angle end state, D30 denotes a thickness of the third lens group, and N3133 denotes an average refractive index of the first positive lens of the third lens group and the second positive lens of the third lens group.

25. A zoom lens comprising a plurality of lens groups including, in order from an object side:
a first lens group having positive refractive power;
a second lens group having negative refractive power;
a third lens group; and
a fourth lens group;
the third lens group including, in order from the object side, a first positive lens of the third lens group, a negative lens of the third lens group, and a second positive lens of the third lens group, wherein the first positive lens of the third lens group has a convex surface facing the object side, the negative lens of the third lens group has an absolute value of a radius of curvature of the image side surface smaller than that of the object side surface, and the second positive lens of the third lens group has an absolute value of a radius of curvature of the image side surface smaller than that of the object side surface, and the following conditional expression being satisfied:

$$0.700<D30\times N3133/Fw<1.435$$

where Fw denotes a focal length of the zoom lens in a wide-angle end state, D30 denotes a thickness of the third lens group, and N3133 denotes an average refractive index of the first positive lens of the third lens group and the second positive lens of the third lens group.

26. A zoom lens comprising a plurality of lens groups including, in order from an object side:
   a first lens group having positive refractive power;
   a second lens group having negative refractive power;
   a third lens group; and
   a fourth lens group;
   the third lens group including, in order from the object side, a first positive lens of the third lens group, a negative lens of the third lens group, and a second positive lens of the third lens group, and
   the following conditional expressions being satisfied:

$-2.00 < F3/F32 < -0.98$ $0.700 < D30 \times N3133/Fw < 1.435$ where F3 denotes a focal length of the third lens group, F32 denotes a focal length of the negative lens of the third lens group, Fw denotes a focal length of the zoom lens in a wide-angle end state, D30 denotes a thickness of the third lens group, and N3133 denotes an average refractive index of the first positive lens of the third lens group and the second positive lens of the third lens group.

27. A zoom lens comprising a plurality of lens groups including, in order from an object side:
   a first lens group having positive refractive power;
   a second lens group having negative refractive power;
   a third lens group; and
   a fourth lens group;
   the third lens group including, in order from the object side, a first positive lens of the third lens group, a negative lens of the third lens group, and a second positive lens of the third lens group, and
   the following conditional expressions being satisfied:

$0.700 < D30 \times N3133/Fw < 1.435$ $N3133 < 1.500$ $70.00 < \nu3133$ where Fw denotes a focal length of the zoom lens in a wide-angle end state, D30 denotes a thickness of the third lens group, N3133 denotes an average refractive index of the first positive lens of the third lens group and the second positive lens of the third lens group and ν3133 denotes an average Abbe number of the first positive lens of the third lens group and the second positive lens of the third lens group.

* * * * *